(12) United States Patent
Muchtar et al.

(10) Patent No.: US 10,946,465 B2
(45) Date of Patent: Mar. 16, 2021

(54) CARBIDE-BASED HARDFACING

(71) Applicant: VERMEER MANUFACTURING COMPANY, Pella, IA (US)

(72) Inventors: Wanti Muchtar, Pella, IA (US); David Landon, Pella, IA (US); Bjorn Johnson, Altoona, IA (US)

(73) Assignee: Vermeer Manufacturing Company, Pella, IA (US)

( * ) Notice: Subject to any disclaimer, the term of this patent is extended or adjusted under 35 U.S.C. 154(b) by 458 days.

(21) Appl. No.: 15/525,021

(22) PCT Filed: Nov. 6, 2015

(86) PCT No.: PCT/US2015/059577
§ 371 (c)(1),
(2) Date: May 5, 2017

(87) PCT Pub. No.: WO2016/073919
PCT Pub. Date: May 12, 2016

(65) Prior Publication Data
US 2017/0334009 A1 Nov. 23, 2017

Related U.S. Application Data

(60) Provisional application No. 62/222,682, filed on Sep. 23, 2015, provisional application No. 62/077,142, filed on Nov. 7, 2014.

(51) Int. Cl.
*B32B 15/01* (2006.01)
*C22C 38/00* (2006.01)
(Continued)

(52) U.S. Cl.
CPC .................. *B23K 9/04* (2013.01); *B23K 5/18* (2013.01); *B23K 9/173* (2013.01); *B23K 26/34* (2013.01);
(Continued)

(58) Field of Classification Search
CPC .. B23K 35/30; B23K 35/3053; B23K 35/306; B23K 35/308; B23K 35/0255;
(Continued)

(56) References Cited

U.S. PATENT DOCUMENTS 7,666,244 B2 * 2/2010 Lockwood ........... B23K 35/327
175/374

FOREIGN PATENT DOCUMENTS

CN 102091889 A 6/2011
CN 103273168 A 9/2013

OTHER PUBLICATIONS

"Tool Steel Grade and Standard Designation," from www.wisetool.com (five pages)(no date), downloaded on Sep. 15, 2019. (Year: 2019).*

(Continued)

*Primary Examiner* — Michael E. La Villa
(74) *Attorney, Agent, or Firm* — Michael Best and Friedrich LLP

(57) ABSTRACT

One aspect of the disclosure provides an iron-based hardfacing layer which includes hard or wear resistant phases resulting at least in part from dissolution of silicon and/or boron carbide particles into a liquid iron-based metal during the fabrication process. In an embodiment, the hardfacing layer is formed by a fusion welding process in which carbide particles are added to the molten weld pool. In an example, the filler metal supplied to the welding process is a mild steel. In an embodiment, the hardness as measured at the surface of the hardfacing ranges from 40 to 65 HRC. In an example, the iron-based hardfacing layer also includes tungsten carbide particles.

18 Claims, 42 Drawing Sheets

(51) Int. Cl.
| | |
|---|---|
| C23C 28/00 | (2006.01) |
| B23K 9/04 | (2006.01) |
| B23K 9/173 | (2006.01) |
| B23K 35/30 | (2006.01) |
| B23K 35/24 | (2006.01) |
| B23K 35/02 | (2006.01) |
| B23K 26/34 | (2014.01) |
| B23K 35/36 | (2006.01) |
| B23K 35/22 | (2006.01) |
| B23K 35/00 | (2006.01) |
| B23K 35/34 | (2006.01) |
| B23K 5/18 | (2006.01) |
| C22C 38/54 | (2006.01) |
| C22C 37/00 | (2006.01) |
| C22C 38/34 | (2006.01) |
| C22C 38/02 | (2006.01) |
| C22C 37/10 | (2006.01) |
| C22C 37/06 | (2006.01) |
| B32B 15/00 | (2006.01) |
| B32B 15/18 | (2006.01) |
| B32B 15/04 | (2006.01) |
| C23C 26/00 | (2006.01) |
| C23C 30/00 | (2006.01) |
| C23C 26/02 | (2006.01) |

(52) U.S. Cl.
CPC .......... *B23K 35/00* (2013.01); *B23K 35/0255* (2013.01); *B23K 35/0261* (2013.01); *B23K 35/0272* (2013.01); *B23K 35/22* (2013.01); *B23K 35/24* (2013.01); *B23K 35/30* (2013.01); *B23K 35/306* (2013.01); *B23K 35/308* (2013.01); *B23K 35/3053* (2013.01); *B23K 35/3093* (2013.01); *B23K 35/34* (2013.01); *B23K 35/36* (2013.01); *B32B 15/00* (2013.01); *B32B 15/01* (2013.01); *B32B 15/012* (2013.01); *B32B 15/013* (2013.01); *B32B 15/04* (2013.01); *B32B 15/043* (2013.01); *B32B 15/18* (2013.01); *C22C 37/00* (2013.01); *C22C 37/06* (2013.01); *C22C 37/10* (2013.01); *C22C 38/00* (2013.01); *C22C 38/02* (2013.01); *C22C 38/34* (2013.01); *C22C 38/54* (2013.01); *C23C 26/00* (2013.01); *C23C 26/02* (2013.01); *C23C 28/34* (2013.01); *C23C 28/341* (2013.01); *C23C 30/00* (2013.01); *C23C 30/005* (2013.01); *Y10T 428/12576* (2015.01); *Y10T 428/12625* (2015.01); *Y10T 428/12653* (2015.01); *Y10T 428/12757* (2015.01); *Y10T 428/12917* (2015.01); *Y10T 428/12924* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01)

(58) Field of Classification Search
CPC ................ B23K 35/0272; B23K 35/24; B23K 35/0261; B23K 9/173; B23K 9/04; B23K 26/34; B23K 5/18; B23K 35/22; B23K 35/34; B23K 35/3093; B23K 35/36; B23K 35/00; C22C 37/00; C22C 37/06; C22C 37/10; C22C 38/00; C22C 38/02; C22C 38/34; C22C 38/54; B32B 15/00; B32B 15/01; B32B 15/012; B32B 15/013; B32B 15/04; B32B 15/043; B32B 15/18; C23C 30/00; C23C 30/005; C23C 26/00; C23C 26/02; C23C 28/34; C23C 28/341; Y10T 428/12951; Y10T 428/12958; Y10T 428/12965; Y10T 428/12972; Y10T 428/12979; Y10T 428/12917; Y10T 428/12924; Y10T 428/12757; Y10T 428/12576; Y10T 428/12625; Y10T 428/12653

See application file for complete search history.

(56) References Cited

OTHER PUBLICATIONS

Office Action with English translation from the State Intellectual Property Office of the People's Republic of China for Application No. 201580014509.4 dated Jun. 1, 2018 (19 pages).

\* cited by examiner

CARBIDE-BASED HARDFACING

CROSS-REFERENCE TO RELATED APPLICATIONS

This application is a 35 U.S.C. § 371 filing of International Application No. PCT/US2015/059577, filed Nov. 6, 2015, which claims the benefit of priority to U.S. Provisional Patent Application 62/077,142, filed Nov. 7, 2014 and U.S. Provisional Patent Application 62/222,682, filed Sep. 23, 2015, each of which is hereby incorporated by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND AND INTRODUCTION

Hardfacing as a process generally refers to application of a hard and wear resistant material to the surface of a second material (base metal). When a hardfacing layer is applied to a second material that is metal, that metal may be referred to as the base metal. The hard and wear resistant material may be a composite material which incorporates wear resistant particles in a matrix of a component, such as a metal.

Hardfacing application techniques frequently include welding and/or spraying and other deposition techniques. Welding may be defined as the joining of two or more pieces of metal by applying heat, pressure or both to produce a localized union through fusion or recrystallization across the interface (ASM Metals Reference Book, ed. M. Bauccio, 1993, ASM International). In fusion welding with a filler metal, both the filler metal and the base metal are melted together to complete the weld.

Fusion welding techniques include, but are not limited to, oxyfuel gas welding, resistance welding, laser beam welding, electron beam welding and arc welding. Gas metal arc welding (GMAW) is an arc welding process which produces coalescence of metals by heating them with an arc between a continuous filler metal (consumable) electrode and the workpiece. Shielding is obtained from an externally supplied gas or gas mixture. Variations of GMAW include short circuit transfer, globular transfer, spray arc transfer and pulsed arc transfer depending on welding parameters and equipment variation. GMAW may use an external shield gas that may be a largely inert gas, such as argon, a mixture of argon and other gases or a reactive gas such as carbon dioxide For GMAW welding direct current is typically used; the electrode may be either positive or negative.

Various techniques have been used to produce hardfacings which are composites of filler metal and carbide particles such as tungsten carbide. Current robotics-based hardfacing systems typically employ a workpiece fixed in a given location, with a movable arc welding unit and a concurrently-operating feed system for the particulate (e.g., tungsten carbide) being used together to achieve the desired hardfacing. Such a feed system generally incorporates a stationary bin/source of the carbide, a vibratory flow metering device fixed below the bin/source, a feed-out mechanism, and a delivery hose interconnecting the vibratory flow metering device and the feed-out mechanism. The stationary bin and the associated vibratory flow metering device are often fixed in a position several feet above the welding zone in order, in part, to create a sufficient flow of carbide through the delivery hose (i.e., provide a sufficiently steep flow angle to ensure movement of the carbide through the delivery hose) and to keep the welding area reasonably clear of obstructions to maximize the working space. The feed-out mechanism, on the other hand, mimics the travel of the movable arc welding unit so that the particulate being delivered via the feed-out mechanism can be delivered into the molten zone of the arc welding puddle created by the arc welding unit. That sort of travel is usually ensured by affixing the feed-out mechanism to the arc welding unit.

US patent application publication US 20130252023 describes a process in which a robot can move a part under a stationary metal inert gas (MIG) gun and carbide feeder, instead of moving the welding head. In addition, US Patent Application Publication US2010/0112375 describes combination of boron and/or silicon carbide powders with aluminum alloy matrix powder and application to a metal substrate using plasma transferred arc welding. Boytuz (Surface and Coatings Technology, 2006 200 pp 3734-3742) describes formation of a paste of SiC on the surface of a 1020 steel substrate and then using tungsten inert gas welding to form a hardfacing.

BRIEF SUMMARY

In one aspect, the invention provides an iron-based hardfacing layer which includes hard or wear resistant phases resulting at least in part from dissolution of silicon and/or boron carbide particles into a liquid iron-based metal during the fabrication process. The composition, microstructure and hardness of the hardfacing layers can be controlled to provide a wide variety of hardfacing materials for impact wear and sliding wear applications. In an embodiment, the hardfacing materials are substantially homogeneous through their depth, which enables them to wear evenly. In an embodiment of the invention, the hardfacing layers provide a cost advantage over conventional tungsten carbide-based hardfacings, which is a derivative of both the unit price of the material and the density thereof. That is, lower density carbides can occupy a greater volume than a similar amount of tungsten carbide, on a per weight basis.

In an embodiment, the hardfacing layer is formed by a fusion welding process in which carbide particles are added to the molten weld pool. In an embodiment, the carbide particles comprise at least one of silicon carbide particles and boron carbide particles. The welding process may be, for example, semi-automatic or robotic, which allows programming of the movement of the welding gun and/or the workpiece holder. In embodiments, the lateral travel speed of the welding gun or workpiece is 10 in/min to 30 in/min or 10 in/min to 25 in/min. In further embodiments the associated lateral travel speed is at least 15 in/min or from 15 in/min to 30 in/min and may even exceed 30 in/min. In an embodiment, where the carbide particles are silicon carbide particles, boron carbide particles, or a combination thereof, the rate of addition of carbide particles to the weld pool is 0.5 g/second to 5 g/second. In an embodiment, in a boron carbide or silicon carbide-based hardfacing, the total $CB_4$ and/or SiC is less than 12% wt (when factoring in the filler metal (via the weld wire) associated with the given hardfacing). In an embodiment, the welding voltage is 22 V to 35 V. In a further embodiment, the voltage is 24 V to 31 V. In an embodiment, the welding amperage is 180 A-400 A. In embodiments, the filler metal supplied to the welding process is a mild steel or a stainless steel. In embodiments, the filler metal is ER70S or ER90S. In other embodiments the filler metal is ER 309LSi, ER 310 or ER 330. In other embodiments, the hardfacing is nonmagnetic or weakly magnetic. In some embodiments, stainless steel filler metal and nonmagnetic particles can be used to make a nonmagnetic or weakly magnetic hardfacing.

In some embodiments, the welding gun and particle feeding system are stationary, and the workpiece holder and associated workpiece or part are moved during operation of the arc welding head. In other embodiments, the workpiece (and attached workpiece or part) is stationary and the welding gun and at least a portion of the particle feeding system are moved during operation of the arc welding head. In an embodiment, keeping the welding gun and particle feeding system stationary facilitates incorporation of an increased amount of carbide particles into the weld pool. In an embodiment, keeping the welding gun and particle feed system stationary with the part instead being moved increases the uniformity of hardness and/or microstructure in the hardfacing. In an embodiment, keeping the welding gun and particle feed system stationary with the part instead being moved produces a hardfacing which is substantially homogeneous in hardness and/or composition. In another embodiment, the welding gun and particle feed system may be limited to being stationary and/or being able to provide non-oscillatory, lateral movement, while the part is moved in at least an oscillatory manner, yielding substantial uniformity in hardness, composition, and/or microstructure throughout a given hardfacing.

In an embodiment, at least some of the silicon carbide and/or boron carbide particles added or fed to the weld pool via a particle feed system are dissolved in the weld pool. The particles fed to the weld pool may also be referred to as the initially added particles. In embodiments, none or only a few undissolved or partially undissolved initially added silicon and/or boron carbide particles are seen in the solidified hardfacing. In embodiments, a majority or all of the initially added silicon and/or boron carbide particles are dissolved in the weld pool. Other phases (e.g., carbides, borides) may precipitate out in the hardfacing upon cooling. These initially added silicon and/or boron carbide particles may also be termed primary particles, while particles precipitated during solidification may be termed secondary particles. In a further embodiment, the average size of silicon and/or boron carbide particles in the solidified hardfacing, (when still remaining therein), is less than 50 microns, 20 microns or 10 microns.

In embodiments, alloying of the weld pool through at least partial dissolution of silicon carbide and/or boron carbide particles results in formation of hard and/or wear resistant phases in the hardfacing. In an embodiment, the hardfacing comprises greater than 90% of a single phase. In embodiments, one hard and wear resistant phase formed by dissolution of silicon carbide in the weld pool includes, but is not limited to, martensite. In further embodiments, the hardfacing further comprises retained austenite. The hardness of martensitic regions in the hardfacing will depend at least in part on the carbon content of the martensite formed. In an embodiment, hardness is described in terms of the Rockwell C scale (HRC). In embodiments, the hardness is 55-65 HRC (fully hard), 40-55 HRC, or 40-65 HRC (multiple forms of martensite present in the hardfacing). In additional amounts, the amount of any graphite formed is minor (e.g. less than 5 vol %). In an embodiment, hard and wear resistant phases formed by dissolution of boron carbide into the weld pool include, but are not limited to, one or more metal carbides, one or more iron borides, martensite, and combinations thereof. In an embodiment, hard and wear resistant phases formed by dissolution of both silicon carbide and boron carbide in the hardfacing include, but are not limited to, iron boride, iron carbide and iron boro-carbide. Various types of metal carbide are known to the art, including MC, $M_3C$, $M_7C_3$ and $M_{23}C$, where M is a metal. In embodiments, the hardness as measured at the surface of the hardfacing is from 55 to 65 HRC (Rockwell C scale hardness), from 50 to 60 HRC, from 45 to 55 HRC, or from 40 to 50 HRC. In an embodiment, hardfacings with higher hardnesses (e.g., higher than 55 HRC) are suitable for sliding wear applications. Hardfacings with lower hardnesses (e.g., 35 to 45 HRC) and acceptable toughness may be used for impact wear applications. In embodiments, the wear number of the hardfacing is from 3.0 to 6.0, from 5.5-11; 6.0 to 11; 6.5 to 11; or 7 to 11.

In an embodiment, the uniformity of the hardfacing is measured by the variation in hardness through the hardfacing. In embodiments, the maximum variation in hardness in the solidified hardfacing is 20 HRC. In further embodiments, the maximum hardness variation is 15 HRC or 10 HRC. In embodiments, the solidified hardfacing comprises an outer portion adjacent to the surface of the hardfacing and an inner portion adjacent to the base metal, and the maximum variation in hardness between the outer portion and the inner portion of the hardfacing is 20 HRC; in further embodiments such maximum variation is 15 HRC or 10 HRC. In one embodiment the maximum variation is less than 20 HRC outside of any dilution zone immediately adjacent the base metal.

In one aspect of the invention, silicon carbide particles are fed into the weld pool during the welding process to form a silicon carbide-based hardfacing. In an embodiment, the invention provides a hardfacing layer joined to at least a portion of a metal surface by a metal fusion bond, the hardfacing layer comprising a first region comprising a first iron-based material, wherein the first iron-based material further comprises silicon and carbon, and at least a portion of the first iron-based material is martensitic. In an embodiment, the iron-based material is predominately martensitic with retained austenite. In embodiments, the iron-based material comprises high carbon martensite with retained austenite, medium carbon martensite with retained austenite, low carbon "lath" martensite with retained austenite, or a combination thereof. The amount of high carbon martensite or lath martensite formed in the matrix is generally based upon the carbon content in the austenitic matrix. In an embodiment, the amount of retained austenite affects the toughness of the hardfacing, with increasing amounts of retained austenite increasing the toughness. In an embodiment, the amount of austenite depends on the carbon content. In an example, the structure of the iron-based material is primarily martensitic.

In some embodiments, the hardfacing further comprises particles of a metal carbide. In an embodiment, the metal carbide comprises iron and carbon. In embodiments, the hardness of the majority of the hardfacing first region is from 40 to 55 or 55 to 65 on the Rockwell C scale. In embodiments, the amount of chromium in the first iron-based material is less than 2 wt %, as may be obtained by using a low carbon steel such as ER70S type (L59) or ER90S type (LA90 type). In further embodiments, the microstructure of the hardfacing from near the exterior surface to near the end of the hardfacing and/or proximate a dilution zone is high carbon martensite with retained austenite. In embodiments where the microstructure of the hardfacing is primarily high carbon martensite with retained austenite, the hardness in this region of the hardfacing is from 55 to 65 HRC or 60 to 65 HRC. In this embodiment, the variation between the maximum and minimum values of the hardness are less than or equal to 20 HRC, less than or equal to 15 HRC or less than or equal to 10 HRC. In another embodiment, the microstructure of the hardfacing from near the exterior surface to near the end of the hardfacing or dilution zone is a lower carbon martensite, with retained austenite. In such an embodiment, the hardness of this region of the hardfacing is 40-55 HRC.

In embodiments, the amount of silicon in the iron-based material is from 1.5 wt % to 10 wt %, 2 wt % to 10 wt %, from 2 wt % to 8 wt %, from 3 wt % to 8 wt %, 5 wt % to 10 wt %, 5 wt % to 12% wt, or 5 wt % to 15 wt %. In further embodiments, these amounts are average amounts. In further embodiments, the amount of total carbon in the iron-based material (including the amount found in carbon-containing compounds) is from 1.5 wt % to 10 wt %, 2 wt % to 10 wt %, from 2 wt % to 8 wt %, from 3 wt % to 8 wt %, 5 wt % to 10 wt %, 5 wt % to 12% wt, or 5 wt % to 15 wt %. When only silicon carbide particles are added to a weld pool formed using low carbon steel weld wire, the atomic percentage of carbon in the hardfacing may be close to the atomic percentage of silicon in the hardfacing. For example, the atomic percentage of carbon in the hardfacing may be less than 5% or less than 1% greater than the atomic percentage of silicon. In further embodiments, these amounts are average amounts. In embodiments, the hardfacing includes only a minor amount of graphite even when substantial amounts of silicon are present (e.g. greater than or equal to 1.5 wt %). In further embodiments, the amount of graphite observed in the microstructure is less than 5% (area % as measured on a polished cross-section or volume %, see FIG. 3B). In an embodiment, the drop rate of silicon carbide is from 0.5 g/s to 2.5 g/s to limit graphite formation.

In an embodiment, the amount of chromium in the first iron-based material is less than 2 wt %, less than 1 wt % or less than 0.5 wt %. In further embodiments, the amount of manganese in the first iron-based material is less than 2 wt %, less than 1 wt % or less than 0.5 wt % and/or the amount of nickel in the first iron-based material is less than 2 wt %, less than 1 wt % or less than 0.5 wt %. In some embodiments, Fe, C, and Si comprise 95% or more of the elements of the hardfacing. In some embodiments, the majority of the metal carbides formed are iron carbide(s) at these chromium levels.

In an embodiment, the silicon carbide-based hardfacing further comprises a second region located interior to the first region. In an embodiment, the second region comprises a second iron-based material. In an embodiment, the second iron-based material comprises silicon and carbon, and at least a portion of the second iron-based material is low carbon martensitic structure or '"lath" martensite and retained austenite. In embodiments, the hardness in the second region is from 40 to 55. In an embodiment where the carbon content varies with depth in a silicon-carbide based hardfacing, high carbon martensite with retained austenite is observed near the surface of the hardfacing and lath martensite with retained austenite is observed near the junction of the hardfacing and the base metal.

In other embodiments, the average amount of chromium in the hardfacing may range from 7 wt % to 28 wt % Cr, as may be obtained by using a stainless steel weld wire. In further embodiments, chromium carbides are observed in such hardfacings. In additional embodiments iron carbides are also present. When chromium carbides are present in greater amounts than iron carbides, the presence of the iron carbides may be at least partially masked in x-ray diffraction spectra due to overlapping peaks.

In another aspect boron carbide particles are fed into the weld pool to form a boron carbide-based hardfacing. In an embodiment, the hardfacing comprises a first region comprising a first iron-based material, wherein the first iron-based material further comprises boron and carbon, and at least a portion of the first iron-based material comprises a metal carbide and a metal boride. In an embodiment, the metal carbide comprises carbon and iron. In embodiments, the amount of chromium in the first iron-based material is less than 2 wt %, as may be obtained by using a low carbon steel such as ER70S type (L59) or ER90S type (LA90 type). In embodiments, the metal carbide takes the form of massive metal carbides or dendritic metal carbides. In an embodiment, the metal boride comprises iron. In an embodiment, the iron boride is an iron boride such as FeB or $Fe_2B$. Other iron borides are known, including, but not limited to $Fe_9B$. The iron boride may be a eutectic boride. In an embodiment, the structure of the first region of the hardfacing comprises columnar metal carbide structures, which may also be termed "massive metal carbides." In an embodiment, the structure further comprises an iron boride phase and lamellar metal carbides. In an embodiment, the hardness of a first region comprising columnar metal carbides is from 65 to 70 HRC.

In some embodiments, the amount of total boron in the iron-based material is from 1.5 wt % to 10 wt %, 2 wt % to 10 wt %, from 2 wt % to 8 wt %, from 3 wt % to 8 wt %, 5 wt % to 10 wt %, 5 wt % to 12% wt, or 5 wt % to 15 wt %. In further embodiments, the amount of total carbon in the iron-based material is from 1.5 wt % to 10 wt %, 2 wt % to 10 wt %, from 2 wt % to 8 wt %, from 3 wt % to 8 wt %, 5 wt % to 10 wt %, 5 wt % to 12% wt, or 5 wt % to 15 wt %. In further embodiments, these amounts are average amounts. In further embodiments, the amount of niobium in the first iron-based material is less than 2 wt %, less than 1 wt %, or less than 0.5 wt %; and/or the amount of titanium in the first iron-based material is less than 2 wt %, less than 1 wt %, or less than 0.5 wt %. In some embodiments, Fe, C, and B comprise 95% or more of the elements of the hardfacing.

In an embodiment, the boron-carbide based hardfacing further comprises a second region comprising a second iron-based material, wherein the second iron-based material further comprises boron and carbon and at least a portion of the second iron-based material comprises a metal carbide and a metal boride. In an embodiment, the structure of the second region of comprises dendritic metal carbides. In an embodiment, the structure further comprises an iron boride phase and lamellar metal carbides (in a pearlitic structure). In an embodiment, the hardness of the second region comprising dendritic metal carbides is from 60 to 67 HRC.

In an embodiment, the boron-carbide-based hardfacing further comprises a third region comprising a metal boride, the metal boride comprising iron. In an embodiment, the third region is located near the junction of the hardfacing with the base metal.

In another embodiment the boron carbide-based hardfacing comprises a first region comprising a first iron-based material and a metal boride, wherein the first iron-based material further comprises carbon. In an embodiment, the first iron-based material further comprises carbon and boron.

In an embodiment, the hardfacing comprises a first region comprising a first iron-based material, wherein the first iron-based material further comprises boron and carbon, and at least a portion of the first iron-based material comprises a martensite and a metal boride. In an embodiment, the hardness of the hardfacing is from 40 to 50 HRC.

In other embodiments, the average amount of chromium in the hardfacing may range from 7 wt % to 28 wt % Cr, as may be obtained by using a stainless steel weld wire. In further embodiments, chromium carbides are observed in such hardfacings; and these chromium carbides may be tetragonal or dendritic in form. In additional embodiments, iron borides (for example eutectic iron borides) are observed in combination with tetragonal chromium carbides. In yet additional embodiments, gamma phase iron is observed in combination with dendritic chromium carbides.

In another aspect, a hardfacing may be made by adding both boron carbide and silicon carbide particles to the weld pool. Any percentages of boron carbide and silicon carbide totaling 100% may be used. In embodiments, 20%-70 vol % or 30-60 vol % silicon carbide is used, with the balance being boron carbide. In an embodiment, 50 vol % silicon carbide is used, and in a further embodiment the balance is boron carbide. In an embodiment, a mixture of 30 vol % silicon carbide and 70 vol % boron carbide is used. In an embodiment, the hardfacing comprises a first region comprising a first iron-based material. In an embodiment, the first iron-based material further comprises silicon, boron and carbon. In an embodiment, the iron based material comprises a metal carbide and an iron boride. In an embodiment, the metal carbide comprises carbon and at least one of boron, silicon and iron. In an embodiment, the metal carbide is a dendritic metal carbide rather than a columnar or massive carbide. In a further embodiment, the metal carbides are dendritic near the surface of the hardfacing and lamellar in form towards the middle of the hardfacing. In an embodiment, the iron boride is a eutectic iron boride. In another embodiment, the iron based material comprises martensite and retained austenite in addition to a boride. In some embodiments, the amount of silicon and/or boron is from 1 wt % to 10 wt %.

In various aspects of the invention, particles of tungsten carbide may be added to the weld pool along with the silicon carbide and/or boron carbide. Typically, the tungsten carbide particles will dissolve partially but not fully in the filler metal during the welding process. In an embodiment, the volume fraction of particles comprising tungsten carbide in the hardfacing is from 10 to 20%, 10-35%, 20% to 60%, 20% to 50%, from 30% to 60%, 30-55%, 30-50%, 40 to 60%, or 30 to 50%. The resulting hardfacing is a composite material, with the particles of tungsten carbide distributed in a matrix of an iron-based material. The matrix of the material typically comprises an iron-based component and a metal carbide component. In an embodiment, the weight percentage of tungsten in the hardfacing is from 3 wt % to 10 wt %.

In an aspect, the present disclosure provides iron-based hardfacing layer disposed on the surface of a workpiece, the iron-based hardfacing layer being made by the process of:
  a. welding an iron-based filler metal to the metal surface of the workpiece, thereby generating a weld pool; and
  b. feeding a plurality of carbide particles towards the weld pool with a particulate delivery system.

In another aspect, the present disclosure provides iron-based hardfacing layer disposed on the surface of a workpiece, the iron-based hardfacing layer being made by the process of:
  a. welding an iron-based filler metal to the metal surface of the workpiece by gas metal arc welding, thereby generating a weld pool, the filler metal being used as an electrode in a welding gun;
  b. feeding a plurality of carbide particles towards the weld pool with a particulate delivery system;
  c. moving the workpiece with respect to the welding gun, the workpiece being moved so as to trace an oscillatory path having a predetermined frequency and amplitude of oscillation.

In various embodiments, the frequency of oscillation is 1 Hz to 10 Hz, from 4 Hz to 10 Hz or from 5 Hz to 10 Hz. In further embodiments the oscillatory path is a weaving path having a primary weld direction and at least one of the workpiece and the welding gun is moved at a lateral travel speed defined along the primary weld direction. In some embodiments, the workpiece is moved at a lateral travel speed defined along the primary weld direction. In further embodiments, during a given weld pass the welding gun is stationary, is moved so that tip of the welding gun traces a non-oscillating path, or a combination thereof, wherein the particle delivery system is held stationary when the welding gun is stationary and wherein the particle delivery system is moved with the welding gun when the welding gun is moved. In some embodiments, the welding gun is stationary for at least a portion of a given welding pass, wherein the weave path further includes a dwell time of greater than zero to 0.2 s or greater than zero and less than or equal to 0.05 second at each peak of the path.

In various embodiments, the volume fraction of carbide particles in the hardfacing layer is from 15% to 50% or from 30% to 50%. In some embodiments, the volume fraction of carbide particles introduced into the weld pool volume is from 15% to 50% or from 30% to 50%. In further embodiments, the iron-based filler metal is a low carbon steel such as ER70S-6 (L59) or ER90S-D2 (LA 90). In additional embodiments, the iron-based filler metal is a stainless steel such as ER310, ER330, ER308 or ER309LSi. In some embodiments, the Cr content of the stainless steel ranges from 18% to 28%. In several embodiments, the carbide particles comprise silicon carbide particles, boron carbide particles, or a combination thereof and have a size from 10 to 25 mesh; the amplitude of the path is from 0.25 mm to 10 mm; and at least one of the workpiece and the welding gun is moved at a lateral travel speed from 10 ipm (inches per minute) to 40 ipm. In embodiments, the rate of addition of carbide particles is from 0.5 to 5 g/second. In further embodiments carbide particles further comprise tungsten carbide particles having a size from 10 to 25 mesh. In a further example, the rate of addition of carbide particles is from 2 to 5 grams/second. In yet a further example the amplitude of oscillation is from 1 mm to 10 mm. In this aspect, the welding voltage is 24 V to 31 V. In yet a further variation, the lateral travel speed is at least 15 ipm.

In embodiments, oscillatory movement of the workpiece during the welding is selected to enhance mixing and/or interrupt the formation of nucleation sites within the weld pool, which essentially slows freezing of the pool. Since there is very short period available (e.g. a fraction of a second) to accommodate the particulate into the weld pool before the pool becomes too viscous and eventually solidifies, the processes of the invention can help maximize the time available to get the desired level of carbide impregnation. In addition, movement of the workpiece during the welding pass can reduce dissolution and/or formation of second phase(s) at the interface of tungsten carbide particles.

In a further embodiment, oscillatory movement of the workpiece while keeping the welding torch stationary or moving the tip of the welding torch in a non-oscillatory manner (e.g., substantially linear except at turn locations) allows use of high speeds in the welding pass direction. For example, a process speed of about 10-40 in/min, 15-30 in/min, 20-30 in/min, 20-40 in/min, or at least 15 in/min can be obtained by moving the workpiece via the moving workpiece holder and using an oscillating motion with an ultimate "forward" motion in the welding pass direction. The efficiencies in getting carbide into the puddle associated with processes of the present invention can produce desirable hardfacings, while permitting faster process speeds than those speeds (e.g., 10-12 in/min or less) typically associated with the use of a moving gun/drop tube and a stationary sample.

In embodiments, the lateral travel speed is from 10 ipm (inches per minute) to 40 ipm, at least 12 ipm, at least 15 ipm, or at least 18 ipm. In embodiments, the frequency of the oscillation of the weaving path is from 1 Hz to 10 Hz, from 2 Hz to 10 Hz, from 4 Hz to 10 Hz, from 5 Hz to 10 Hz, from 6 Hz to 10 Hz, at least 2 Hz, at 25 least 4 Hz, at least 5 Hz, or at least 6 Hz. In embodiments, the amplitude of the weaving path is from 1 mm to 15 mm, 1 mm to 10 mm, 1 mm to 9 mm, 1 mm to 8 mm, 0.25 mm to 10 mm, 0.25 mm to 8 mm, 2 mm to 10 mm, or 5 mm to 10 mm. In an embodiment, no dwell time is used. In further embodiments, the dwell time is greater than zero and less than or equal to 0.01 sec, greater than zero and less than or equal to 30 0.02 sec, greater than zero and less than or equal to 0.05 sec, greater than zero and less than or equal to 0.1 sec, greater than zero and less than or equal to 0.15 sec or greater than zero and less than or equal to 0.2 sec. The dwell time may occur at each peak of the path. In embodiments, the drop rate of the particles is from 0.5 to 9 g/sec, 0.5 to 5 g/sec, 0.5 to 2.5 g/sec and 2 to 5 g/sec. In an embodiment, the volume percentage of tungsten carbide particles in the feed of carbide particles is from 10% to 70% or from 40% to 70%, with silicon carbide and/or boron carbide particles forming the balance. In various embodiments, the tungsten carbide particles are used in combination with silicon carbide particles, with boron carbide particles, or with a combination of silicon carbide particles and boron carbide particles, where the ratio of silicon carbide to boron carbide is from 0.3 to 0.6.

Fusion welding processes suitable for use in embodiments of the invention may include GMAW, FCAW (flux cored arc welding), PAW (plasma arc welding), LW (laser welding), GTAW (gas tungsten arc welding), and SAW (submerged arc welding). In an aspect of the invention, the hardfacing materials of the invention are applied to the surface of an article using a GMAW process. The welding process may be, for example, semi-automatic or robotic, which would allow for programming of the movement of the welding gun. Alternately, the welding gun may be held stationary and the workpiece moved during the welding process. The movement of the workpiece, likewise, could be semi-automatic or robotically controlled. In an embodiment, the particles are not embedded in the weld wire so that the particles are added to the weld pool separately from the filler metal. The size of the wear resistant particles added to the weld pool may be 10 to 30 mesh; 10 to 25 mesh; 12 to 24 mesh, 12 to 25 mesh; 12 to 30 mesh; 12 to 40 mesh; 12 to 18 mesh; or 18 to 25 mesh. In an embodiment, the mesh size of the boron carbide and/or silicon carbide particles is 12-24 mesh. During the fusion welding process, the composition of the filler metal may be modified by dilution from the base metal and/or reaction between the filler metal and the carbide particles. For example, when the base metal is ferrous but has a lower alloy content than the filler metal, the filler metal may be "diluted" by the base metal. When the molten filler metal partially dissolves the carbide particles, elements from the carbide particles may be incorporated into the filler metal. As the molten filler metal cools, wear resistant phases such as iron carbide may be formed in the hardfacing.

The composition and other properties of the matrix and/or the matrix components may be referenced to depth zones within the hardfacing. In an embodiment, the hardfacing may be viewed as comprising three zones or regions, an outer zone nearest the outer surface of the hardfacing, an inner zone nearest the interface or fusion joint between the hardfacing and the base metal and a middle zone between the outer and inner zones. In other embodiments, the hardfacing may comprise two zones or regions.

In another embodiment, properties of the hardfacing may be measured within a specified distance from the outer (free) surface of the hardfacing or from the bonding/joint interface of the hardfacing with the base metal. In an embodiment where the hardfacing is at least 3 mm thick, the properties of the hardfacing may be measured within a "near surface" region within 1.25 mm or 1 mm from the outer surface and measured within a "near fusion joint" region within 1.25 mm or 1 mm from the fusion joint. In another embodiment, where the hardfacing is at least 2 mm thick, the "near surface" region may be within 0.75 mm of the outer surface and "near fusion joint" region may be within 0.75 mm of the fusion joint. In another embodiment, where the hardfacing is at least 1 mm thick, the "near surface" region may be within 0.3 mm of the outer surface and "near fusion joint" region may be within 0.3 mm of the fusion joint.

In an embodiment, the hardness of the matrix material varies with depth in the hardfacing. In another embodiment, the hardness of the matrix material falls within a narrow range throughout the depth of the hardfacing. The hardness of the matrix material is typically measured so as to include contributions from both the first and second components of the matrix material.

In another aspect, the invention provides an article comprising: a feature comprising a metal surface; and a hardfacing layer joined to at least a portion of the metal surface, the hardfacing layer being joined to the metal surface by a metal fusion bond, the hardfacing layer being as provided herein. In some embodiments, hardfacings formed by combining a low carbon steel with silicon carbide particles are suitable for use for parts for impact applications. In other embodiments, hardfacings formed by combining a low carbon steel with tungsten carbide particles and silicon carbide or a combination of silicon carbide and boron carbide particles are suitable for parts ground-engaging applications. In further embodiments, hardfacings formed by combining stainless steel with silicon carbide and/or boron carbide particles are suitable for non-magnetic hardfacings.

BRIEF DESCRIPTION OF THE DRAWINGS

FIG. 28A: near the surface. FIG. 28B: in the middle area of the hardfacing.

FIG. 30A: near the surface of the hardfacing. FIG. 30B: below the surface of the hardfacing FIG. 33B: near the mid section of the hardfacing. FIG. 30C near the end of the hardfacing (near the junction with the base metal.

DETAILED DESCRIPTION

Figure 1:
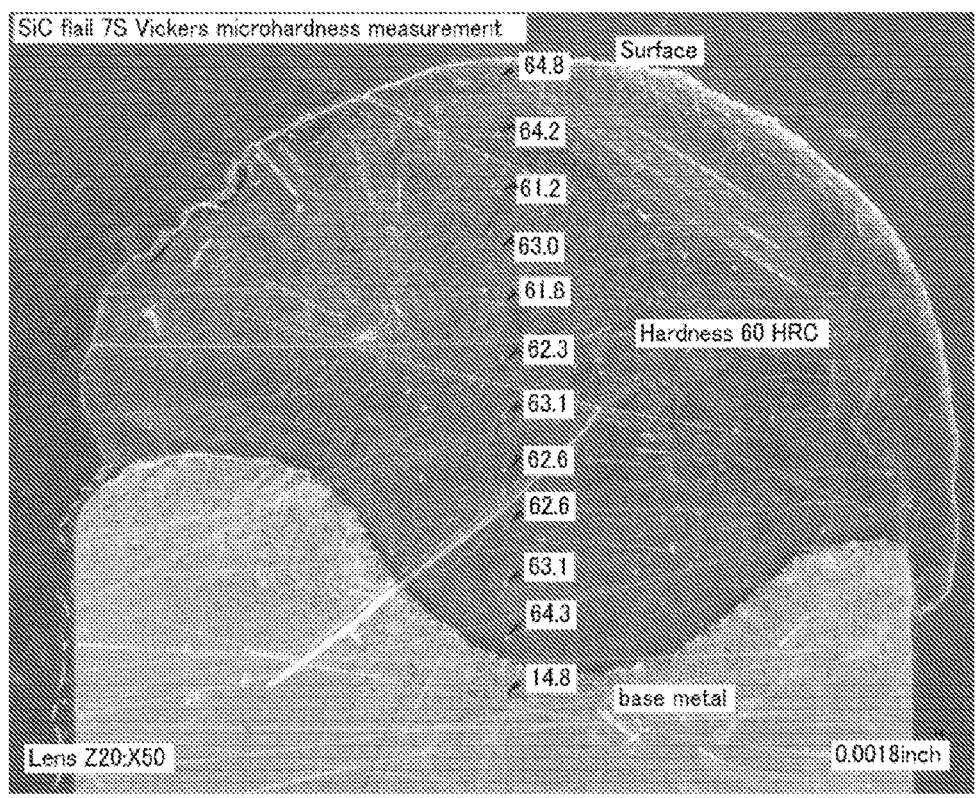
FIG. 1 shows a cross-section through a silicon carbide based hardfacing applied to a base metal (50×). Hardness measurements at different depths in the hardfacing are also shown.

In an embodiment, the as-fabricated thickness of the hardfacing may be from 1 mm (about 0.039") to 25 mm (about 1"), from 2 mm (about 0.08") to 25 mm, or from 5 mm (about 0.2") to 25 mm. In an embodiment, such thickness is from 2.5 mm to 5.0 mm. The thickness of hardfacing may vary somewhat along the article to which it is applied. In another embodiment, the variation in thickness of the hardfacing is 0-25%, 0-30% or 0-50%.

In an embodiment, the wear resistance of the hardfacing may be assessed by methods known to the art. In an embodiment, the abrasive wear resistance of the hardfacing may be assessed using ASTM standard B611, which was developed for cemented carbides. In an embodiment, the wear resistance is indicated by a wear number. In embodiments, the wear number is from 3.0 to 6.0, from 5.5-11; 6.0 to 11; 6.5 to 11; or 7 to 11.

It is known in the art that some hardfacing alloys have a tendency to crack. For example, cracking may, for example, be due to the stresses induced by shrinkage of the weld metal upon cooling, microstructural discontinuities or any differences in thermal expansion between the base metal, the hardfacing matrix, and the carbide particles. Cracking may be assessed visually or by using a liquid penetrant such as a dye penetrant. In an embodiment, a hardfacing coating of the invention which is substantially free of cracking contains no visible surface cracks. In another embodiment, the hardfacing coating is resistant to cracking. In an embodiment, the invention provides silicon-carbide based hardfacings which are essentially free from cracking upon formation. Without wishing to be bound by any particular belief, retained austenite in the hardfacing matrix may limit cracking of the hardfacing.

As used herein, an iron based alloy or metallic material is an alloy or metal in which iron is the element present in the highest concentration. In an embodiment, the iron based metallic material comprises a ferrite phase, which has a body-centered cubic crystal structure. Alpha iron is a form of ferrite. Delta ferrite may also form at high temperatures. The presence of ferrite can be determined with x-ray diffraction and with other techniques as known in the art.

In an embodiment, the iron based metallic material comprises an austenite phase, which has the face-centered cubic crystal structure. Austenite is also known as gamma iron. The presence of austenite can be determined with x-ray diffraction and with other techniques as known in the art. However, peaks for retained austenite may be obscured by overlapping peaks.

In another embodiment, the iron based metallic material comprises a martensitic phase, which can have a body centered tetragonal crystal structure. These phases may be identified by their characteristic microstructure when viewed in a polished cross-section (e.g. lath or lenticular). The presence of martensite can also be determined with x-ray diffraction and with other techniques as known in the art.

Cementite, or $Fe_3C$, is also known as iron carbide. Pearlite comprises closely spaced plates or lamellae of cementite and ferrite. Cementite may also be present in the form of particles, either dispersed or agglomerated or in acicular (needle-like) form.

Mixed or complex carbides are also known to the art. For example, iron and boron can together form a carbide; these carbides can be referred to as complex metal boron carbides or metal boro-carbides.

Several compounds of iron and boron are known to the art. These include, but are not limited to, $Fe_2B$, $FeB$, $Fe_9B$ ($Fe_{18}B_{0.2}$) and $Fe_{23}B_6$. Iron boron networks may vary in composition based on the amount of iron and boron in the matrix. In an embodiment, at high iron content the base material $Fe_2B$, $Fe_9B$ or $Fe_{23}B_6$ is more likely than $FeB$.

In an embodiment where the hardfacing comprises particles of tungsten carbide distributed in a matrix material, the matrix material comprise two components, a first component comprising iron, carbon and silicon and/or boron and tungsten; and a second component comprising a metal and carbon.

In an embodiment, the composition of the matrix material at a particular location in the hardfacing is measured so as to include contributions from both the first and second components of the matrix material. In an embodiment, the composition of the matrix material at a particular depth in the hardfacing may be measured sufficiently far away from the tungsten carbide containing particles so that the contribution of any reaction products around the particles is excluded. In an embodiment, the distance away from the particles may be a fraction or multiple of the minimum particle size established by the mesh size range of the particles applied during the hardfacing process. For example, the composition may be measured a distance one-tenth or one-quarter of this minimum particle size away from any tungsten carbide-containing particle.

In an embodiment, the composition of the matrix material can be determined from energy dispersive x-ray analysis (EDS or EDX) of a volume of the sample which contains both the first and second components. However, EDS analysis may be unable to determine boron and carbon content precisely. The volume of the sample analyzed is influenced by both the beam diameter and voltage. The average composition over a particular region or zone of the hardfacing may be determined from an average of several measurements at different locations in the specified region or zone. The composition of the first and second components may also be analyzed separately. In another embodiment, the composition can be determined with electron backscatter diffraction. In yet a further embodiment, the composition may be determined with x-ray fluorescence. However, detection of lighter elements such as boron and carbon, and to some extent, silicon may be non-optimal with this technique.

In an embodiment where tungsten carbide particles are included in the hardfacing, the hardness of the hardfacing matrix material may also vary with depth in the hardfacing. In an embodiment, the hardness of the matrix material at a particular depth in the hardfacing is measured sufficiently far away from the tungsten carbide containing particles so that the contribution of any reaction products around the particles is excluded. In an embodiment, the hardness of the matrix material may be determined from an indentation measurement performed on an area of sample which contains both the first and the second components. In an embodiment, the hardness may be measured on the Rockwell C scale (HRC). In an embodiment, the hardness in the hardfacing may be from 25 to 55 HRC.

As used herein, tungsten carbide particles include WC, $W_2C$, other tungsten carbide phases, and mixtures thereof. Particles comprising tungsten carbide particles obtained from recycling of a cemented tungsten carbide material can also contain relatively small amounts of other materials such as binder material and/or coating material. For example, the particles comprising tungsten carbide may also contain cobalt, as well as smaller amounts of iron, titanium, and phosphorous, along with other possible elements. The amount of cobalt may be approximately 10 wt %, with the amount of tungsten and carbon approximately 83 wt %. The volume fraction of particles comprising tungsten carbide in the hardfacing may be from 30% to 60%, 30-55%, 30-50%, 40 to 60%, or 30 to 50%. An average volume fraction may be determined for a particular zone or region within the hardfacing by averaging several measurements. In an embodiment, the particles comprising tungsten carbide are substantially uniformly distributed when the average volume fraction of particles comprising tungsten carbide in each of the inner, middle and outer zones of the hardfacing is from 30 to 60% or 30 to 50%. In an embodiment, the volume fraction of particles comprising tungsten carbide in the hardfacing may be measured from the area fraction of particles comprising tungsten carbide obtained from a cross-section of the hardfacing. In other embodiments, the percentage of tungsten carbide particles in a mixture of carbide particles being fed into the weld pool is from 40% to 70% by volume and the percentage of silicon carbide and boron carbide particles is from 30% to 60% by volume. Examples include, but are not limited to 50 vol % tungsten carbide particles and 50 vol % silicon carbide or boron carbide particles or 50 vol % tungsten carbide particles, 25 vol % silicon carbide particles and 25 vol % boron carbide particles.

A weight fraction of wear resistant particles can also be calculated. The weight of the hardfacing may be measured by measuring the weight of the piece to which the hardfacing is to be applied both prior to and following application of the hardfacing. The weight of the filler metal supplied to the hardfacing process may also be calculated. The difference of the hardfacing weight and the weight of the metal supplied to the hardfacing process gives a measure of the weight contribution of the wear resistant particles. The weight fraction of the wear resistant particles can then be taken as the ratio of the weight of the wear resistant particles to the weight of the hardfacing, as a whole. The weight fraction of wear resistant particles may be from 10-20%, 30-55%, 30-50%, 40-55% or 40-50%.

The number of particles comprising tungsten carbide within a given measurement area is another parameter which can be used to characterize the hardfacing. In an embodiment, the number of particles comprising tungsten carbide per square centimeter is from 90 to 150 (about 580 particles per square inch to about 970 particles per square inch); this number of particles per unit area may be present in combination with a volume fraction of particles comprising tungsten carbide of 30 to 60%; or 40 to 60%.

In embodiments, the hardfacing materials of the invention may be applied to the surface of an article using a GMAW process. The GMAW process may be globular transfer, spray arc transfer or may be a pulsed GMAW process with pulsed metal arc transfer. As previously mentioned, the welding torch may be moved while the workpiece is held stationary, or the welding torch may be held stationary while the workpiece is moved. FIG. 22 illustrates a moving workpiece fixture attached to a robot arm.

The wire feed speed, voltage, travel speed, amplitude, frequency, and carbide drop rate may change depending on the size and hardness of the hardfacing desired. Several trends may be observed when changing the hardfacing parameters. An increase in wire feed speed and/or travel speed will lower the carbide to weld wire ratio and generally reduce the weld's hardness. An increase in carbide drop rate will generally increase the carbide to weld wire ratio and increase weld hardness. When modifying the hardfacing parameters there is an upper limit to the achievable hardness of the deposit and is defined by the microstructural phase. The exemplary parameters below are for 0.4-0.8 inch hardfacing with hardness ranging from 45-65 HRC. In an embodiment the wire feed speed is 300-400 inches per minute. In an embodiment the voltage is 24-31 volts, with the voltage being kept under 31 volts to prevent burn back on the welding torch. Voltage may be raised or lowered to maintain the heat input for other sizes of welds. In an embodiment, the travel speed is 10-25 inches per minute. Travel speed will affect the final weld width. In an embodiment, amplitudes for hardfacing with a width of 0.4-0.8 inches are 3-7 millimeters. Amplitude controls the shape of the bottom half of the weld and is changed in conjunction with travel speed and wire feed speed to obtain the desired weld size and geometry. In an embodiment, the frequency ranges from 2-6 hertz. In an embodiment the carbide drop rate varies from 0.5-5.0 grams per second depending on the amount of carbide required to attain the desired weld hardness. Drop rate is influenced by wire feed speed and travel speed.

Figure 20:
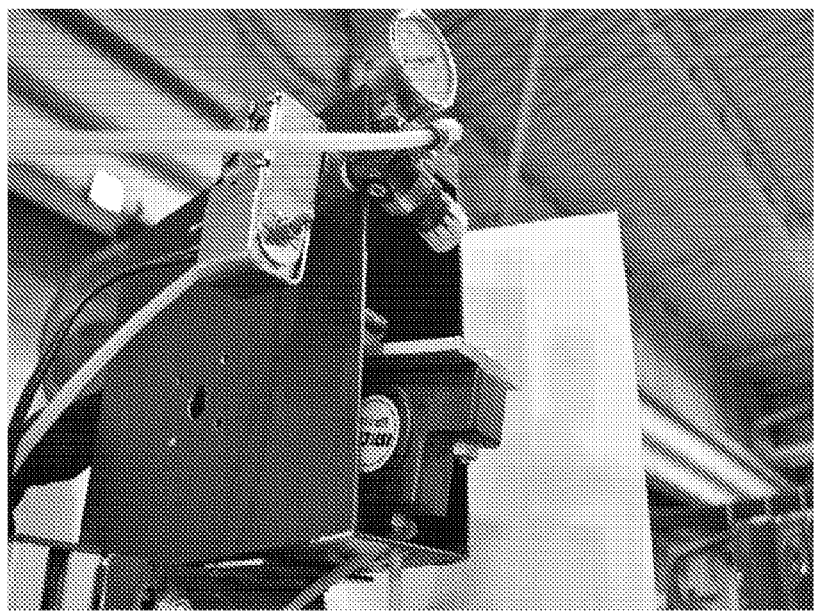
FIG. 20 illustrates a vibratory carbide shaker.

The welding torch is selected to deposit weld wire onto the surface of the part. In an embodiment, the welding torch shields the hardfacing with an appropriate shielding gas to avoid porosity. Commercial hardfacing shielding gases may contain at least 75% argon. Typical contact tip to working distance for this hardfacing is 0.5-0.75 inches. FIG. 20 illustrates weld torch and carbide drop nozzle fixturing.

Figure 21:
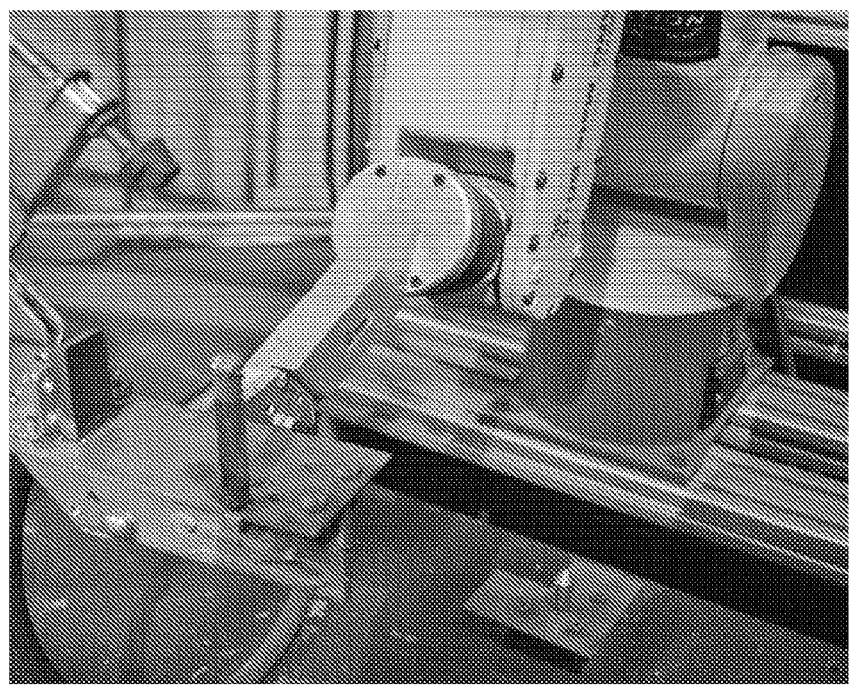
FIG. 21 illustrates a moving sample fixture attached to a robot arm.

In an embodiment, the carbide delivery system comprises a carbide container, tubing and a carbide drop nozzle. In an embodiment, the carbide container holds and feeds a controlled amount of carbide to the hardfacing. Examples of carbide containers include vibratory and screw fed systems. Carbide is typically fed from the container to the hardfacing by tubing connected to the carbide drop nozzle. The carbide drop nozzle funnels carbide into the molten weld puddle and follows directly behind the welding torch. The nozzle may also be elevated to avoid plugging with weld spatter. FIG. 21 illustrates a vibratory carbide shaker.

In the methods described above, silicon carbide (SiC) and/or boron carbide are fed to the weld pool. SiC has high hardness, good thermal shock, low density, high temperature oxidation and corrosion resistance and relatively low cost. In an embodiment, the SiC particles may include up to 5% or up to 2% impurities such as $SiO_2$ and Si. In an embodiment, the amount of SiC in the particles is at least 97%.

Boron carbide is the fourth of hardest material after diamond, CBN and some types of SiC (Field, 1992) and has a relatively low density and cost. The carbon content in boron carbide creates significant influence on its mechanical properties, hardness and fracture toughness. In 8.8 to 20 at % C, boron carbide exists in rhombohedral form and is usually designated $B_{13}O_2$ or $B_4C$, which revealed the highest hardness value compare to other composition of boron carbide that have been recorded (Loubet et al, 1989). In embodiment, the boron carbide carbide particles may include up to 5% or up to 2% impurities. In an embodiment, the amount of boron and carbide is at least 98%.

In embodiments, the total amount of silicon carbide and/or boron carbide fed to the weld pool is less than 15 wt % or less than 12 wt %. In an embodiment, the drop rate of carbide particles to the weld pool is 0.5 to 5 g/s. In an embodiment where 10 to 35% tungsten carbide particles are added, the drop rate is from 2 to 5 g/s. In some embodiments, the hardfacing may be identified by the dominant carbide component fed to the weld pool. For example, a silicon carbide based hardfacing is prepared with a carbide feed of only silicon carbide or with a carbide feed in which the volume percentage of silicon carbide is greater than that of other carbide components.

In an embodiment, the consumable wire electrode is a made of a mild or low-carbon steel including less than 0.3 wt % carbon. In embodiments, the wire metal may be a plain carbon steel or a low alloy steel. The consumable electrode may be referred to by its AWS (American Welding Society) classification. Suitable filler wires include, but are not limited to ER70S type (L59) or ER90S type (LA90 type). The specified composition of ER70S-6 is 0.06-0.12% C, 1.40-1.85% Mn, 0.8-1.15% Si, 0.035% max S, 0.025% P, 0.5% max Cu, 0.15% max Ni, 0.15% max Cr, 0.15% max Mo, and 0.03% max V. The specified composition of ER90X-D2 is 0.07-0.12% C, 1.60-2.10% Mn, 0.5-0.8% Si, 0.15% max % Ni, 0.40-0.60% Mo, 0.025% max S, 0.025% max P, and 0.5% max Cu. Suitable plain carbon steels include, but are not limited to, steels represented by the AISI/SAE designation 10xx, 15xx, 13xx, 11xx and 12xx, where the last two digits of the designation represent the carbon content, steels represented by ASTM designations A572 (all grades) and ASTM A514 (all grades) and proprietary steels such as Hardox® and Wearform. In an embodiment, low alloy steels have a total alloy content less than 8 wt %, with the remainder being iron. Suitable low alloy steels include steels represented by the AISI/SAE 40xx, 41xx, 43xx, 44xx, 46xx, 47xx, 48xx, 50xx, 51xx, 50xxx, 51xx, 61xx, 81xx, 86xx, 87xx, 88x, 92xx, 93xx or 94xx, where the last two or three digits of the designation represent the carbon content.

In an embodiment, the consumable wire electrode is made of an austenitic stainless steel. As used herein, an austenitic stainless steel has a substantially austenitic microstructure at room temperature. Substantially austenitic microstructures may retain a small amount of other phases such as ferrite. In embodiments, the austenitic stainless steel may comprise 15-28% Cr and 8-35% Ni; 15-25% Cr and 8-35% Ni; 15-25% Cr and 8-25% Ni; 15-25% Cr and 8-20% Ni; 15-25% Cr and 8-15% Ni; or 15-23.5% Cr and 8-35% Ni (wt %), with a balance of Fe. The austenitic stainless steel may be referred to by its AWS (American Welding Society) classification. In the AWS designation ER309XX, "ER" refers to the wire which may be used as an electrode or rod, the three or four digit number such as "309" designates the nominal chemical composition of the filler metal and "XX" designates the carbon content restrictions and other alloying information In embodiments, the austenitic stainless steel wire may be an 308 type alloy rod, an 309 type alloy rod, a 310 type alloy rod, a 316 type alloy rod, a 317 type alloy rod, a 320 type alloy rod, a 330 type alloy rod, or an 385 type alloy rod. As used herein, a YYY type alloy may also include compositional variants. For example, a 316 type alloy may include 316, 316L, or 316H. In an embodiment, the austenitic stainless steel may be an alloy in the AISI 300 series of alloys. It is noted that the 300 series of alloys may also include duplex stainless steels (e.g. 329) as well as austenitic stainless steels. In embodiments, the austenitic stainless steel may be a 309 type alloy, a 310 type alloy, a 316 type alloy or a 330 type alloy (AISI designations). The alloy may be ER309XX, ER316XX, ER310 or ER330. Table 1 gives nominal alloy compositions for several AWS 300 series alloys (amounts in weight %).

TABLE 1

| Element | ER309LSi | ER310 | ER316LSi | ER330 |
| --- | --- | --- | --- | --- |
| C | 0.03 | 0.08-0.15 | 0.03 | 0.18-0.25 |
| Cr | 23.0-25.0 | 25.0-28.0 | 18.0-20.0 | 15.0-17.0 |
| Ni | 12.0-14.0 | 20.0-22.5 | 11.0-14.0 | 34.0-37.0 |
| Mo | 0.75 | 0.75 | 2.0-3.0 | 0.75 |
| Mn | 1.0-2.5 | 1.0-2.5 | 1.0-2.5 | 1.0-2.5 |
| Si | 0.65-1.00 | 0.30-0.65 | 0.65-1.00 | 0.30-0.65 |
| P | 0.03 | 0.03 | 0.03 | 0.03 |
| S | 0.03 | 0.03 | 0.03 | 0.03 |
| N | — | — | — | — |
| Cu | 0.75 | 0.75 | 0.75 | 0.75 |

As used herein, the melting range is the range of temperatures over which a noneutectic alloy changes from solid to liquid. The melting range may be taken as the difference between the solidus temperature and the liquidus temperature. The melting range for austenitic stainless steel filler metal suitable for use with embodiments of the present invention may be in the range from 1375° C. to 1450° C. (2507° F. to 2642° F.).

The coefficient of linear thermal expansion (CTE) is a material property that is indicative of the extent to which a material expands upon heating. The coefficient of thermal expansion may be defined as the fractional increase in length per unit rise in temperature. Typically the magnitude of the CTE increases with rising temperature. The mean coefficient of thermal expansion may be measured over a specified temperature range. For austenitic stainless steels, the CTE in the range from room temperature to 100° C. may be from 9.8 to $25 \times 10^{-5}$/K ($5.4-14 \times 10^{-5}$/° F.). (ASM Ready Reference: Thermal properties of metals, ed. Cverna, 2002, ASM International, p. 11.). The CTE for iron carbon alloys in the room temperature to 100° C. range may be from 10 to $12 \times 10^{-5}$/K ($5.5-6.5 \times 10^{-5}$/° F.). In an embodiment of the present invention, the CTE of the austenitic stainless steel filler metal may be from 13.5 to $18 \times 10^{-5}$/K (7.5 to $10 \times 10^{-5}$/° F.) in the range from room temperature to 100° C.

In an embodiment, the size of the particles supplied to the hardfacing process can be characterized by a mesh size range. As is known to the art, the mesh size refers to the size of the wire mesh used to screen the particles. In an embodiment, the mesh sizes used herein are per ASTM standard E-11 and may be US standard sieve numbers. As used herein, when the particle size is classified as 12-25 mesh, a majority of the particles are within the 12-25 mesh range, with a minority (for example 5-10%) being either greater than 12 mesh or less than 25 mesh. For reference, the nominal sieve opening for a no. 12 sieve is about 1.70 mm, the nominal sieve opening for a no. 25 sieve is about 0.710 mm, the nominal sieve size opening for a no. 30 sieve is about 0.6 mm and the nominal sieve size opening for a no. 40 sieve is about 0.425 mm (US Standard sieve sizing). If any dissolution of the particles comprising tungsten carbide occurs during the hardfacing process, the size of the particles may decrease from these initial values. In addition, some of the smaller particles (e.g. those which pass through a no. 30 sieve) may dissolve completely. The size of the wear resistant particles added to the weld pool may be 10 to 25 mesh; 12-24 mesh, 12 to 25 mesh; 12 to 30 mesh; 12 to 40 mesh; 12 to 18 mesh; or 18 to 25 mesh.

The base metal may be ferrous. In an embodiment, the base metal may be a steel (an iron alloy). As used herein, a steel is an alloy of iron containing less than 2 wt % carbon. In embodiments, the base metal may be a plain carbon steel or a low alloy steel. Suitable plain carbon steels include, but are not limited to, steels represented by the AISI/SAE designation 10xx, 15xx, 13xx, 11xx and 12xx, where the last two digits of the designation represent the carbon content, steels represented by ASTM designations A572 (all grades) and ASTM A514 (all grades) and proprietary steels such as Hardox and Wearform. In an embodiment, low alloy steels have a total alloy content less than 8 wt %. Suitable low alloy steels include steels represented by the AISI/SAE 40xx, 41xx, 43xx, 44xx, 46xx, 47xx, 48xx, 50xx, 51xx, 50xxx, 51xx, 61xx, 81xx, 86xx, 87xx, 88x, 92xx, 93xx or 94xx, where the last two or three digits of the designation represent the carbon content. In additional embodiments, the base metal is a stainless steel. In embodiments when a nonmagnetic base metal is desired, suitable stainless steels include austenitic stainless steels. Austenitic stainless steels include proprietary steels such as 15-15HS® (Carpenter), which is a nitrogen-strengthened austenitic stainless steel. In an embodiment, the magnetic properties of the hardfacing meets the requirement of American Petroleum Institute Standard API 5L (e.g. residual magnetism).

U.S. patent application Ser. No. 14/616,489, filed Feb. 6, 2015, International Application No. PCT/US15/21327, filed Mar. 18, 2015, and U.S. patent application Ser. No. 14/725, 302, filed May 29, 2015, are hereby incorporated by reference in their entirety for their description of hardfacing systems, apparatus, methods and applications.

In an aspect, the invention provides an apparatus comprising the hardfacing layers of the invention. A comminution (e.g., cutting, grinding, chopping, etc.) apparatus, which may comprise the hardfacing layers of the invention, include, but are not limited to, horizontal grinders, tub grinders, stump grinders, wood and/or brush chippers, and bale processors. In another aspect, the apparatus comprising the hardfacing layers of the invention may comprise trenchers, horizontal directional drills, boring equipment, rock wheels, and surface mining equipment. In yet a further aspect, the apparatus comprising the hardfacing layers may comprise non-comminution surfaces where impact and wear resistance still are desired, such as drum skins, pockets, and screens.

All references cited herein are hereby incorporated by reference to the extent not inconsistent with the disclosure herewith.

Although the description herein contains many specificities, these should not be construed as limiting the scope of the invention but as merely providing illustrations of some of the presently preferred embodiments of the invention. Thus the scope of the invention should be determined by the appended claims and their equivalents, rather than by the examples given.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

In general the terms and phrases used herein have their art-recognized meaning, which can be found by reference to standard texts, journal references and contexts known to those skilled in the art. The preceding definitions are provided to clarify their specific use in the context of embodiments of the invention.

When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds are intended to be exemplary, as it is known that one of ordinary skill in the art can name the same compounds differently. One of ordinary skill in the art will appreciate that methods, device elements, starting materials and synthetic methods, other than those specifically exemplified can be employed in the practice of the invention without resort to undue experimentation. All art-known functional equivalents, of any such methods, device elements, starting materials and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by various embodiments and optional features, modification and variation of the concepts herein disclosed may be resorted to by those skilled in the art, and that such modifications and variations are considered to be within the scope of this invention as defined by the appended claims.

The embodiments of the invention may be further understood by the following non-limiting examples.

Example 1: Silicon Carbide Based Hardfacings with Mild Steel Weld Wire

Hardfacings were deposited using GMAW using ER70S-6 (L59) wire with 12-24 mesh size SiC particles being dropped into the weld during the welding process. A stationary gun and moving sample method was used.

FIG. 1 shows a cross-section through a silicon carbide based hardfacing applied to a base metal (SiC bale flail 7S, 50×, marker 0.0018 inch). Hardness measurements at different depths in the hardfacing are also shown, with the measured hardness values in the hardfacing ranging between 61.2 and 64.8 (Rockwell C Hardness, HRC).

Figure 2A:
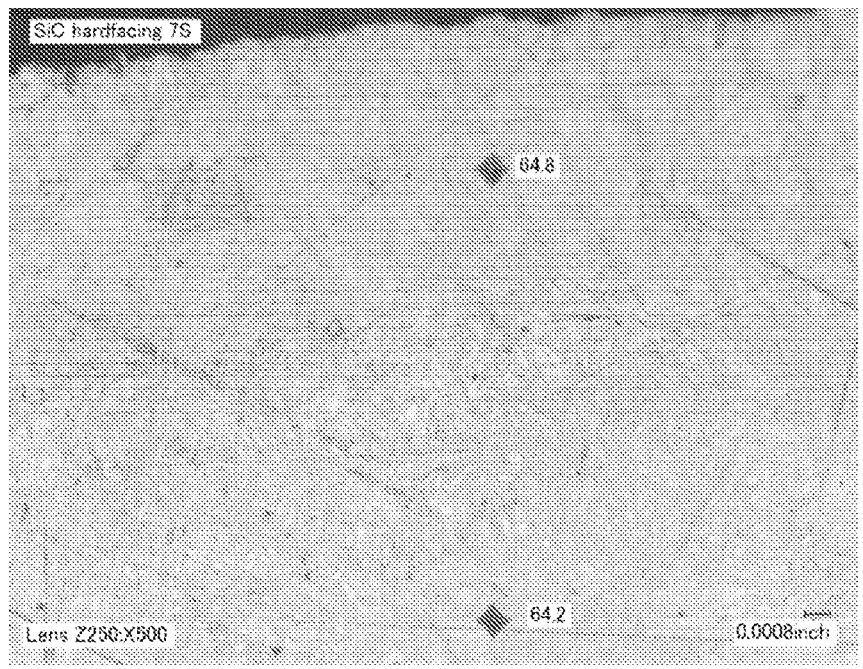
FIGS. 2A, 2B and 2C show polished cross-sections at higher magnifications and at different depths in the hardfacing of FIG. 1.
Figure 2B:
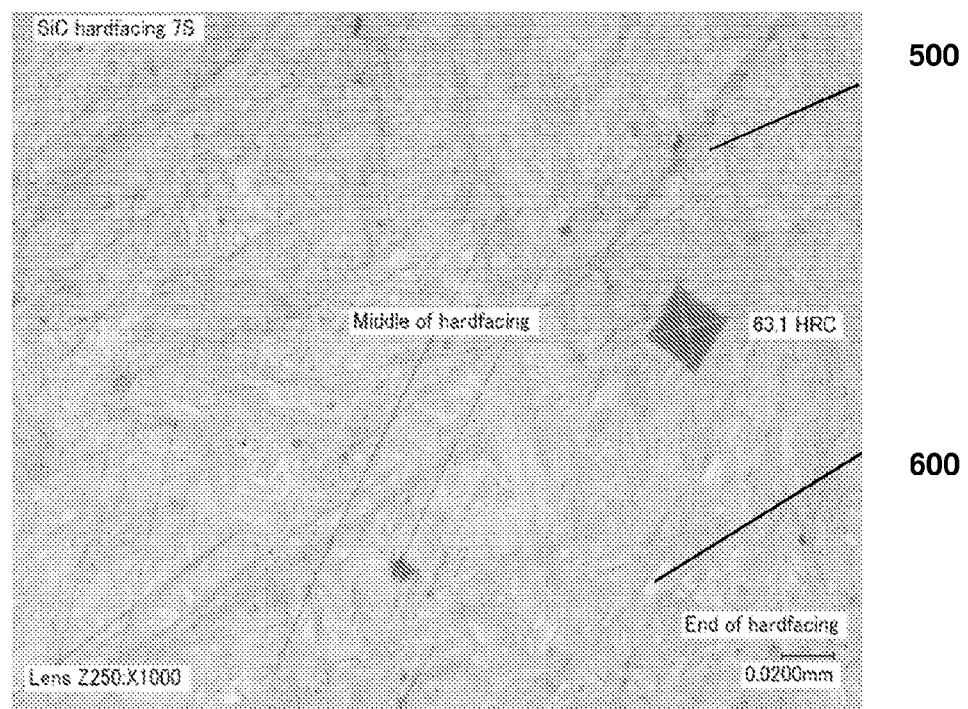
Figure 2C:
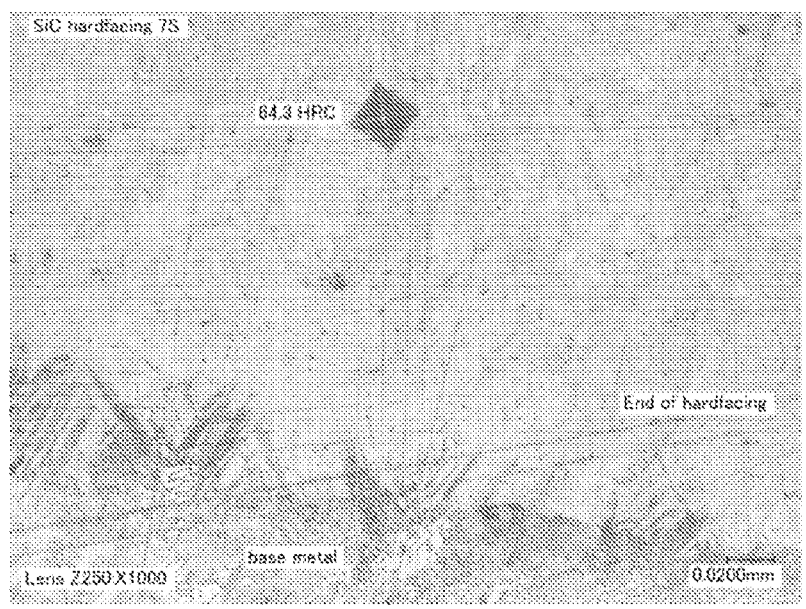

FIGS. 2A, 2B and 2C show polished cross-sections at higher magnifications at different depths in the hardfacing of FIG. 1 (Sample 7S). FIG. 2A (500×, marker 0.0008 inch) is from a location near the surface of the hardfacing. FIG. 2B (1000×, marker 0.02 mm) is from a location near the middle of the hardfacing. The structure in FIGS. 2A and 2B contains features which resemble those found in martensite. The structure in FIG. 2A is believed to correspond to high carbon martensite with retained austenite (white background phase in the etched sample). In FIG. 2B, a high carbon martensitic plate (500) and retained austenite phase (600) are indicated. FIG. 2C (1000×, marker 0.02 mm) shows a location at the end of the hardfacing, and martensitic features are also seen in the upper portion of the figure.

Figure 3A:
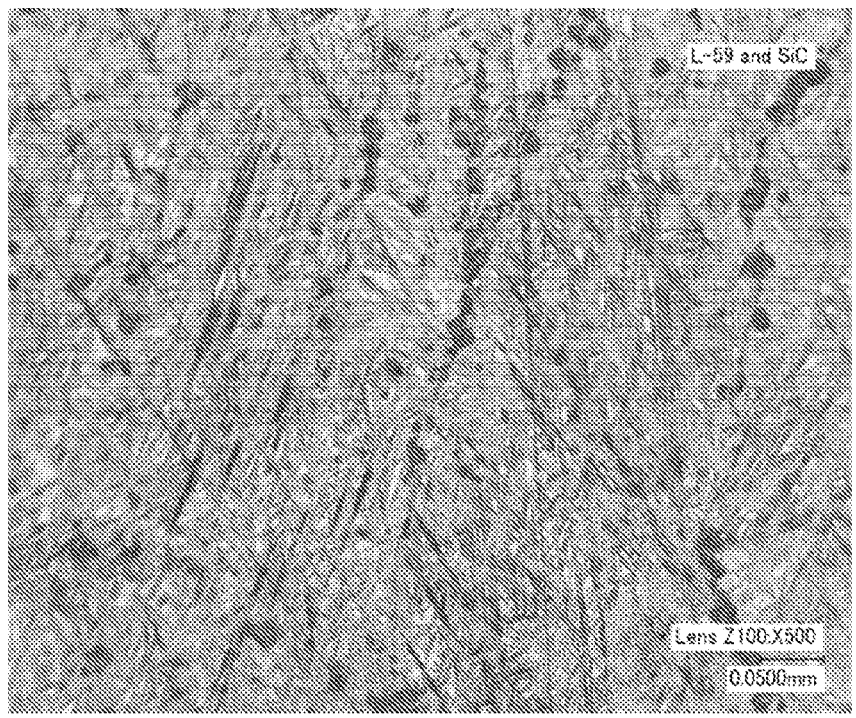
FIGS. 3A and 3B show additional polished cross-sections of silicon carbide based hardfacings.
Figure 3B:
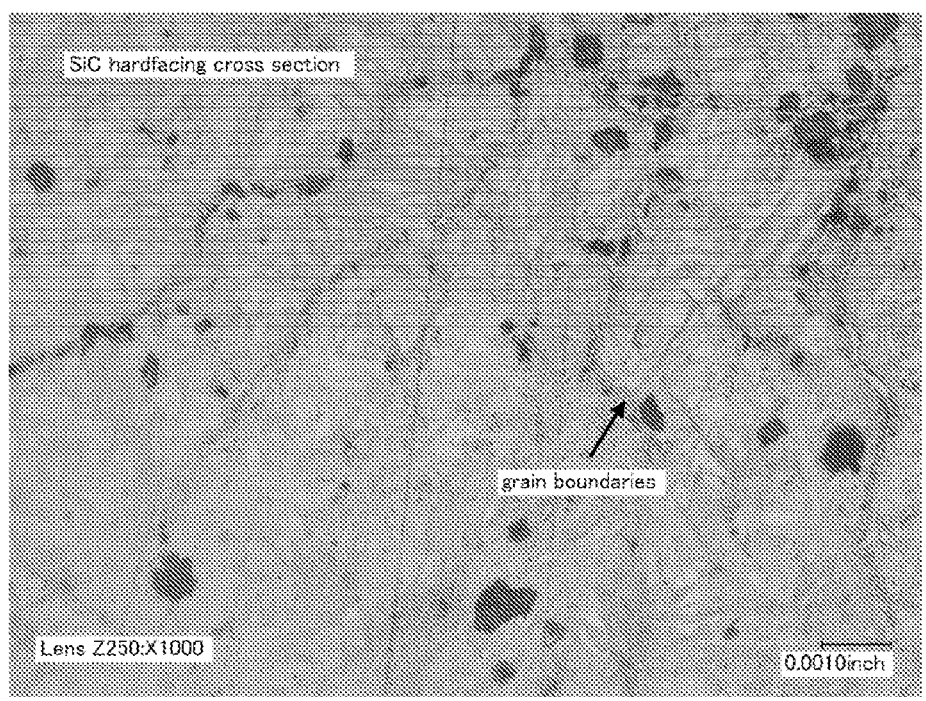

A micrograph of a different hardfacing sample with a measured hardness of about 62 HRC is shown in FIG. 3A (500×, marker 0.05 mm); and martensitic features (characteristic of high carbon martensite) and retained austenite (gamma iron) were observed. FIG. 3B indicates graphite observed at the grain boundaries of a silicon-carbide based hardfacing; the amount of graphite was minor (less than about 5 area %) (1000×, marker 0.001 inch)

Figure 4:
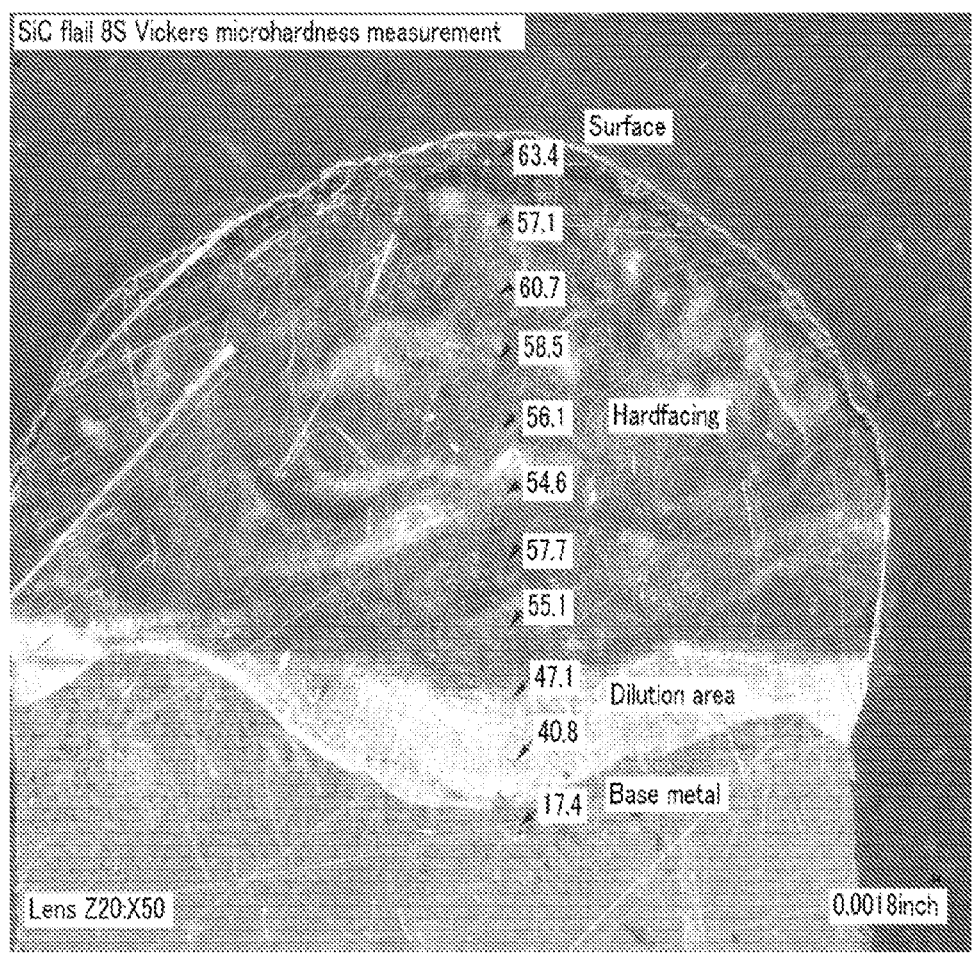
FIG. 4 shows a cross-section through another silicon carbide based hardfacing applied to a base metal (50×). Hardness measurements at different depths in the hardfacing are also shown.

FIG. 4 shows a cross-section through a silicon carbide based hardfacing applied to a base metal (SiC flail 8S, 50×, marker 0.0018 inch). Hardness measurements at different depths in the hardfacing are also shown. The measured hardness values in the hardfacing ranged between 63.4 and 55.1 HRC; and values in the dilution area were less.

Figure 5A:
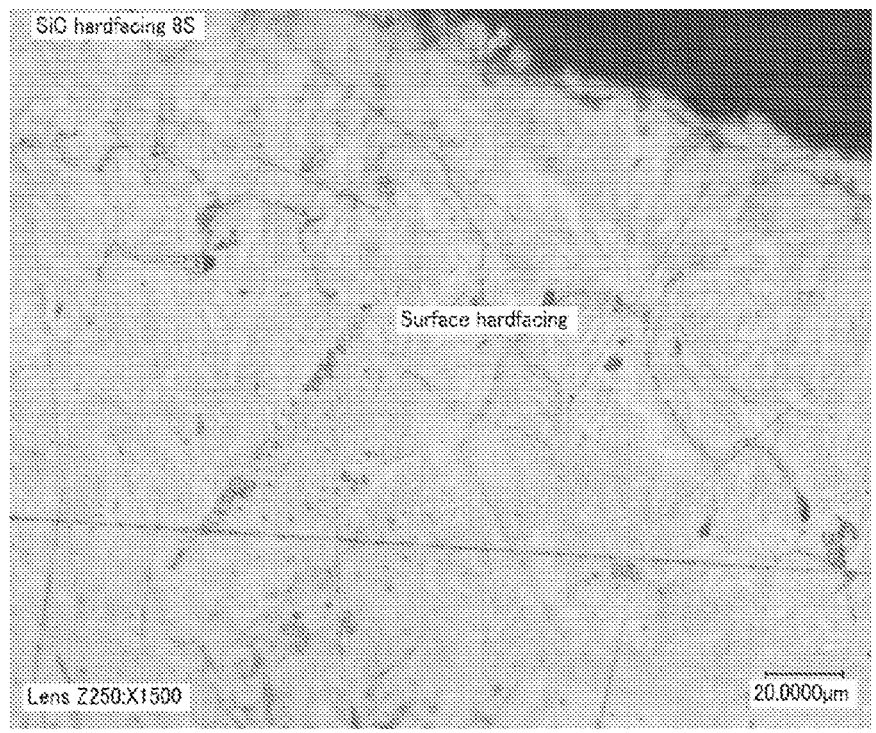
FIGS. 5A, 5B, 5C and 5D show polished cross-sections at higher magnifications at different depths in the hardfacing of FIG. 4.
Figure 5B:
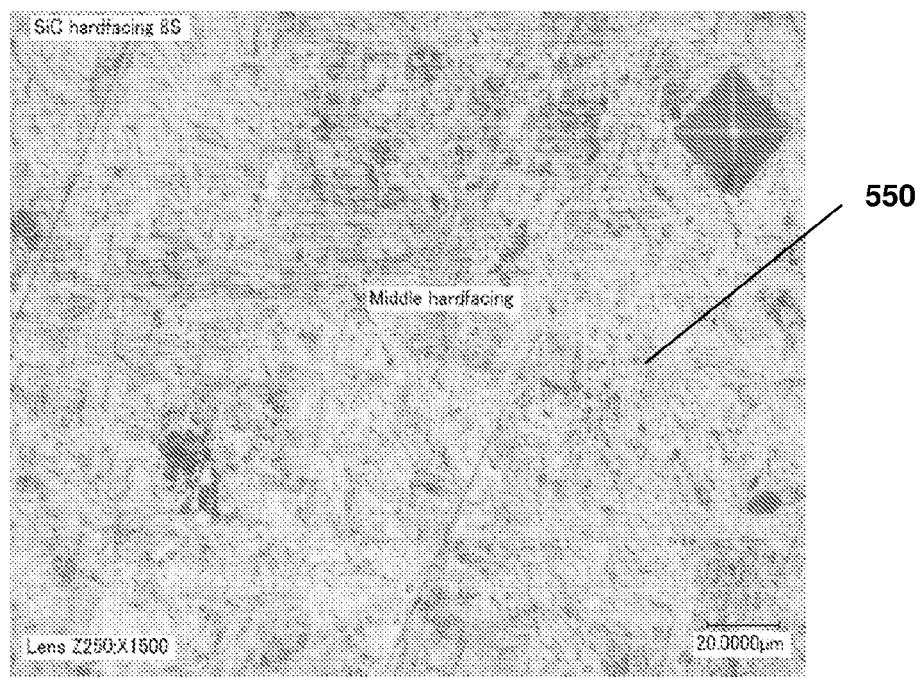
Figure 5C:
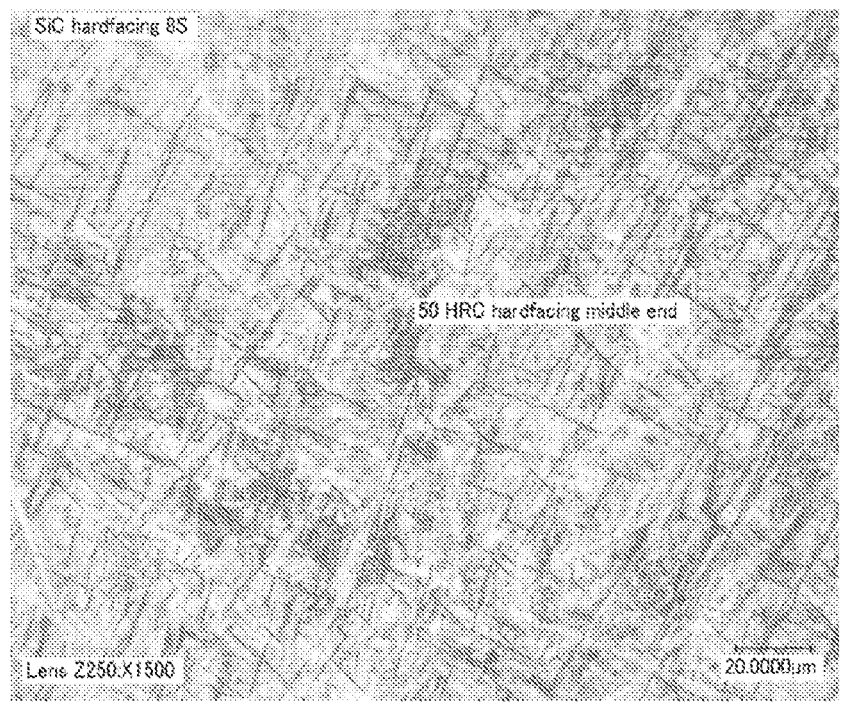
Figure 5D:
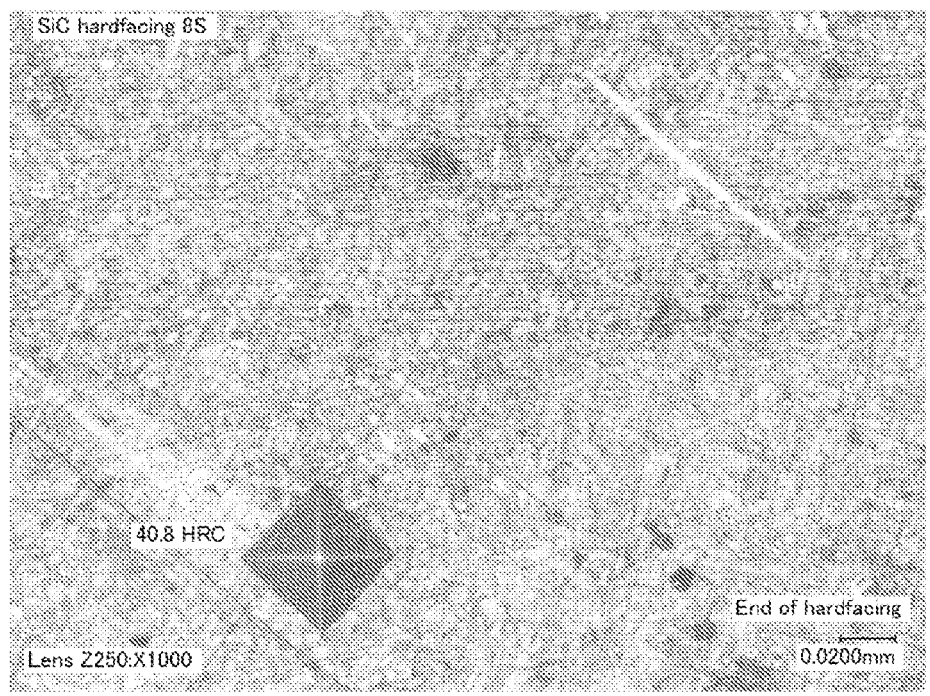

FIGS. 5A, 5B, 5C and 5D show polished cross-sections at higher magnifications at different depths in the hardfacing of FIG. 4 (Sample 8S). FIG. 5A is from a location near the surface of the hardfacing; and martensitic features and retained austenite are seen in this figure (high carbon martensite). (1500×, marker 20 micron). FIG. 5B is from a location near the middle of the hardfacing; and martensitic features 550 and retained austenite are also seen in this figure (lower carbon "lath" martensite) (1500×, marker 20 micron). FIG. 5C is from a location between the middle and the end of the hardfacing, this image shows medium carbon martensitic features and retained austenite phase (light etch background) (1500×, marker 20 micron). FIG. 5D shows a location near the end of the hardfacing, this image is believed to show lower carbon "lath" martensitic features with ferrite phase precipitated out along retained austenite grains (1000×, marker 0.02 mm). The hardness dropped to 40.8 HRC.

Figure 6A:
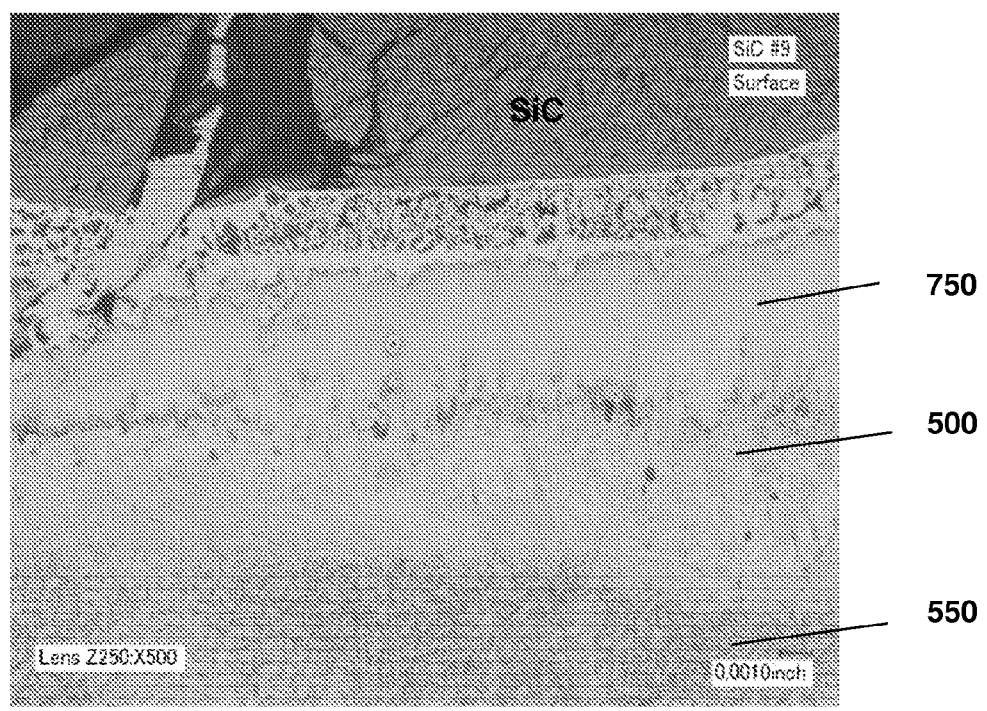
FIGS. 6A, 6B and 6C show polished cross-sections at various depths in another silicon carbide based hardfacing.
Figure 6B:
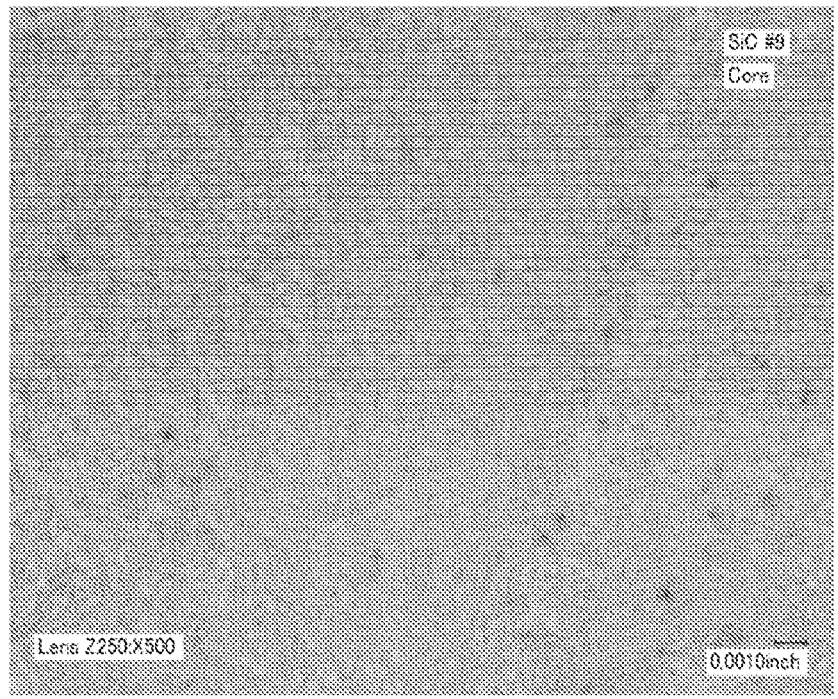
Figure 6C:
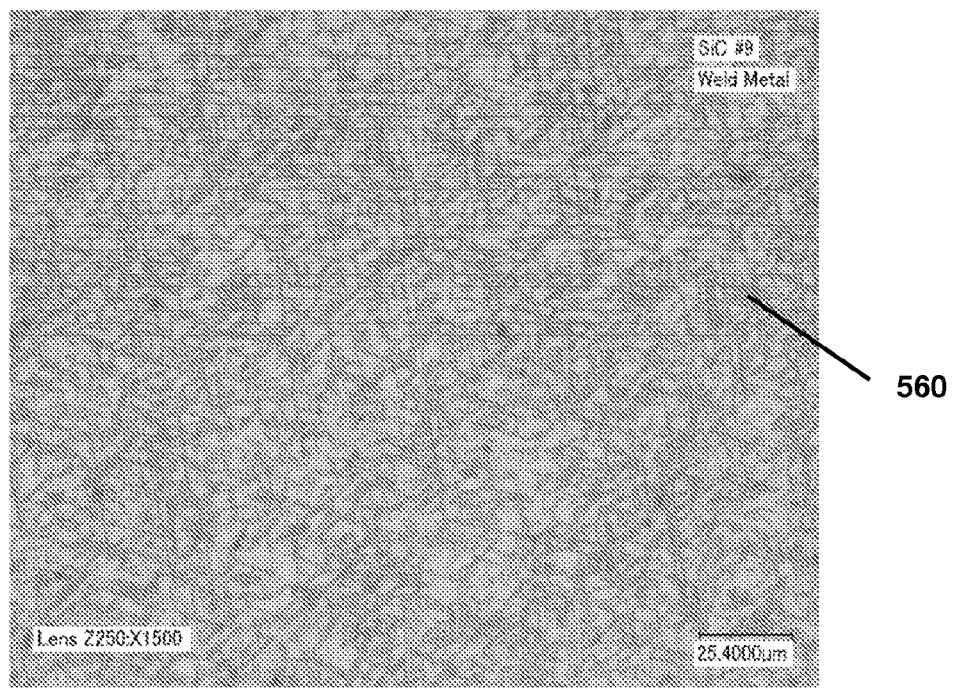

FIGS. 6A, 6B and 6C show polished cross-sections at various depths in another silicon carbide based hardfacing (SiC #9). FIG. 6A shows the surface of the hardfacing (500×, marker 0.001 inch). A surface region of the hardfacing includes SiC particles which were not completely dissolved during the welding process. FIG. 6A illustrates a high carbon content dilution area 750 around a SiC particle, high carbon martensite 500 and lower carbon martensite 550. FIGS. 6B and 6C show a location near the middle or core of the hardfacing. FIG. 6B is believed to show lath martensite with low carbon content and retained austenite (white in etched sample). FIG. 6C is at a higher magnification (1500×, marker 25.4 micron) than FIG. 6B (500× marker 0.001 inch). The image shows high magnification martensitic features and retained austenite (white etch background), with martensite needles being indicated by 560.

Figure 7:
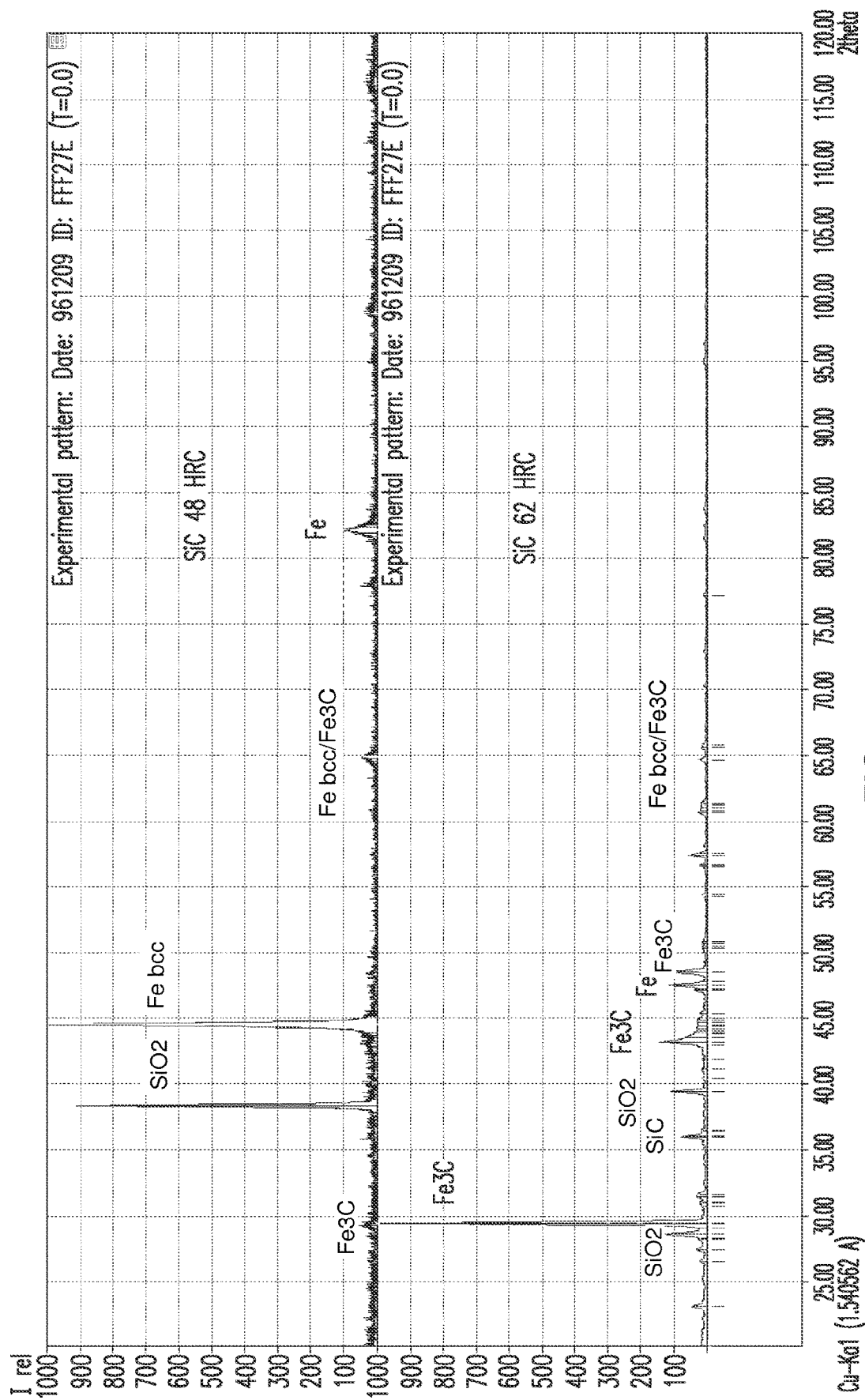
FIG. 7 shows diffraction patterns taken for two different silicon carbide based hardfacings.

FIG. 7 shows two x-ray diffraction patterns. The upper pattern is from sample 9 shown in FIGS. 6A-6C (48HRC). Peaks for non-austenitic iron identified as bcc type) were identified as well as peaks for $Fe_3C$ and $SiO_2$. The lower pattern is for sample 5 see FIG. 3A (62 HRC). Peaks for $Fe_3C$ as well as $SiO_2$, SiC and Fe were identified in the lower diffraction pattern.

Wear testing of a silicon carbide based hardfacing with an approximate hardness of 57 to 61 HRC gave an average abrasion (volume loss) of 19.06 and an average wear number of 5.40. Tables 2-5 give hardness values for various samples.

TABLE 2

Table of Hardness Values for Sample 7S.

| Sample 7S | Hardness HRC | Depth From Surface (inch) | Location |
|---|---|---|---|
| 1 | 64.8 | 0.005 | Near surface |
| 2 | 64.2 | 0.020 | |
| 3 | 61.2 | 0.035 | |
| 4 | 63.0 | 0.050 | |
| 5 | 61.8 | 0.065 | |

TABLE 2-continued

Table of Hardness Values for Sample 7S.

| Sample 7S | Hardness HRC | Depth From Surface (inch) | Location |
|---|---|---|---|
| 6 | 62.3 | 0.080 | Mid section |
| 7 | 63.1 | 0.095 | |
| 8 | 62.6 | 0.110 | |
| 9 | 62.6 | 0.125 | |
| 10 | 63.1 | 0.140 | |
| 11 | 64.3 | 0.155 | End hardfacing |
| 12 | 14.8 | 0.170 | Base Metal |

TABLE 3

Table of Hardness Values for Sample 8S.

| Sample 8S | Hardness HRC | Depth From Surface (inch) | Location |
|---|---|---|---|
| 1 | 63.4 | 0.005 | Near Surface |
| 2 | 57.1 | 0.020 | |
| 3 | 60.7 | 0.035 | |
| 4 | 58.5 | 0.050 | |
| 5 | 56.1 | 0.065 | |
| 6 | 54.6 | 0.080 | Mid section |
| 7 | 57.7 | 0.095 | |
| 8 | 55.1 | 0.110 | |
| 9 | 47.1 | 0.125 | |
| 10 | 40.8 | 0.140 | End hardfacing |
| 11 | 17.4 | 0.155 | Base Metal |

TABLE 4

Table of hardness values for Sample #5.

| Sample #5 | Hardness HRC | Location |
|---|---|---|
| 1 | 62.6 | Near surface |
| 2 | 62.7 | Near surface |
| 3 | 61.6 | Near surface |
| 4 | 56.2 | |
| 5 | 55.5 | |
| 6 | 58.5 | |
| 7 | 58.3 | |
| 8 | 58.7 | |
| 9 | 58.0 | Base metal line |
| 10 | 59.3 | |
| 11 | 57.2 | End of hardfacing |

TABLE 5

Table of hardness values for Sample VT1

| Sample VT1 Second Pass | Hardness HRC | Location |
|---|---|---|
| 1 | 62.6 | Near surface Undiluted area |
| 2 | 60.4 | Mixed area High C martensite |
| 3 | 59.0 | Finer martensite |
| 4 | 57.8 | Finer martensite |
| 5 | 55.4 | Mid section |
| 6 | 43 | Mid section Scattered zone |
| 7 | 42.9 | Below mid section |
| 8 | 41.5 | Below mid section |
| 9 | 39.3 | Near End |
| 10 | 39.1 | End of hardfacing |

Hardfacings which combined silicon carbide particles and low carbon steel weld wire were found suitable for use on production-model bale flails and delivered a cost advantage when compared to prior laser-clad hardfacing materials.

Example 2: Boron Carbide Based Hardfacings with Mild Steel Weld Wire

Hardfacings were deposited using GMAW using ER70S-6 (L59) wire with 12-24 mesh size boron carbide particles being dropped into the weld during the welding process. A stationary gun and moving sample method was used.

Figure 8:
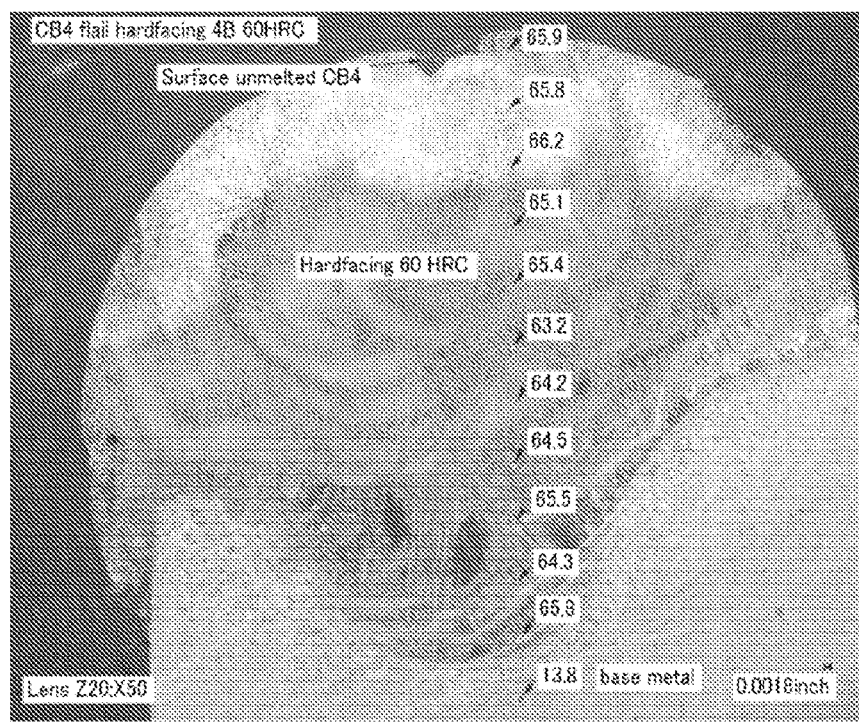
FIG. 8 shows a cross-section through a boron carbide based hardfacing applied to a base metal (50×). Hardness measurements at different depths in the hardfacing are also shown.

FIG. 8 shows a cross-section through a boron carbide based hardfacing applied to a base metal (CB4 flail hardfacing 4B, 50×, marker 0.0018 inch). Hardness measurements at different depths in the hardfacing are also shown; the measured hardness values in the hardfacing ranged between 64.3 and 66.2 (Rockwell C Hardness, HRC).

Figure 9A:
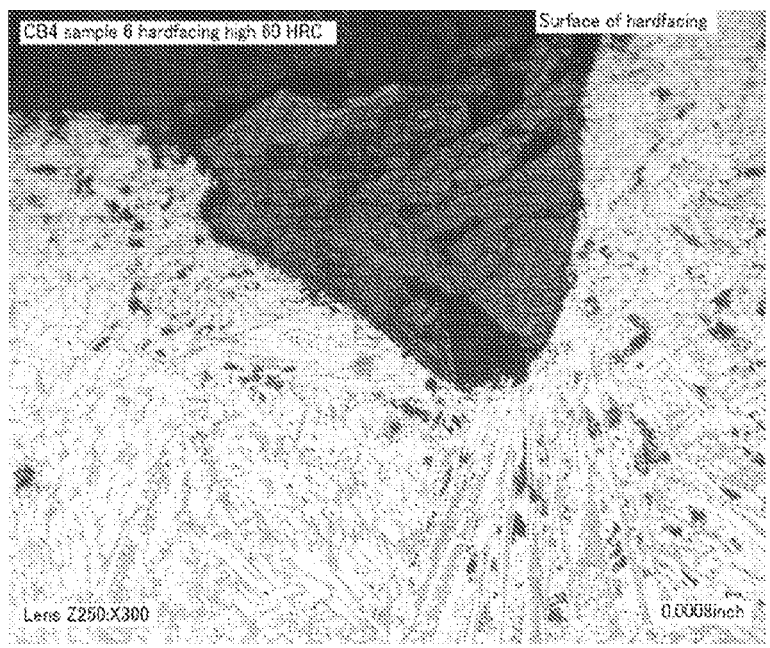
FIGS. 9A, 9B, 9C, 9D and 9E show polished cross-sections at higher magnifications at different depths in a boron carbide based hardfacing.
Figure 9B:
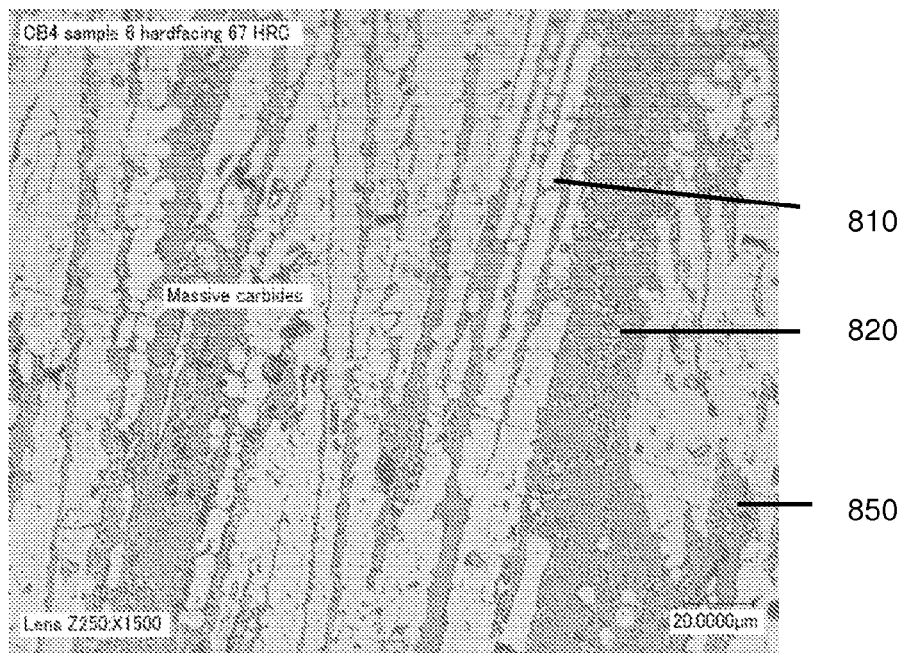
Figure 9C:
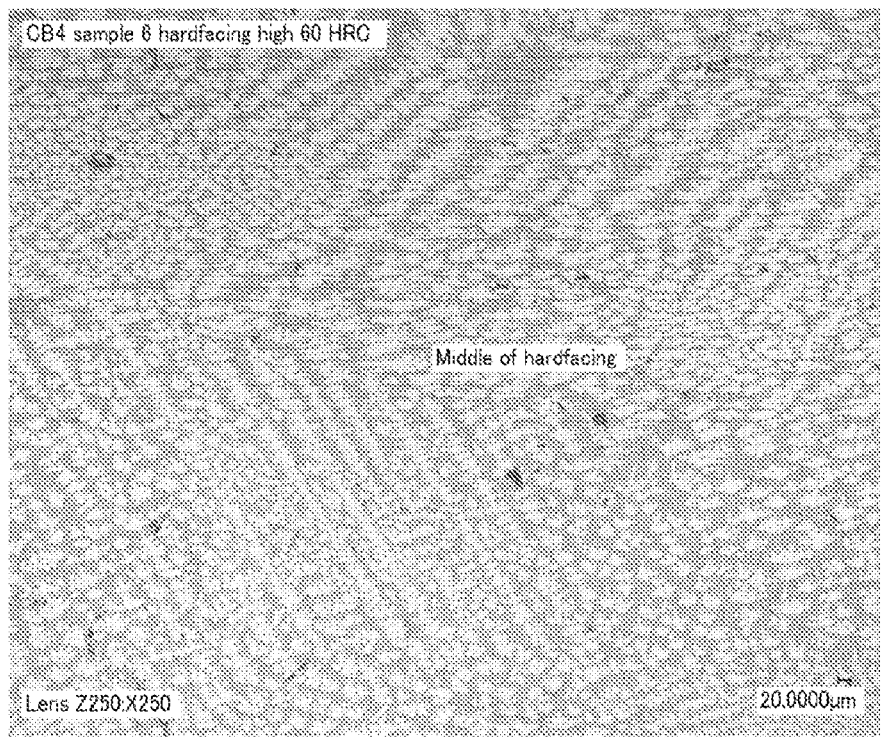
Figure 9D:
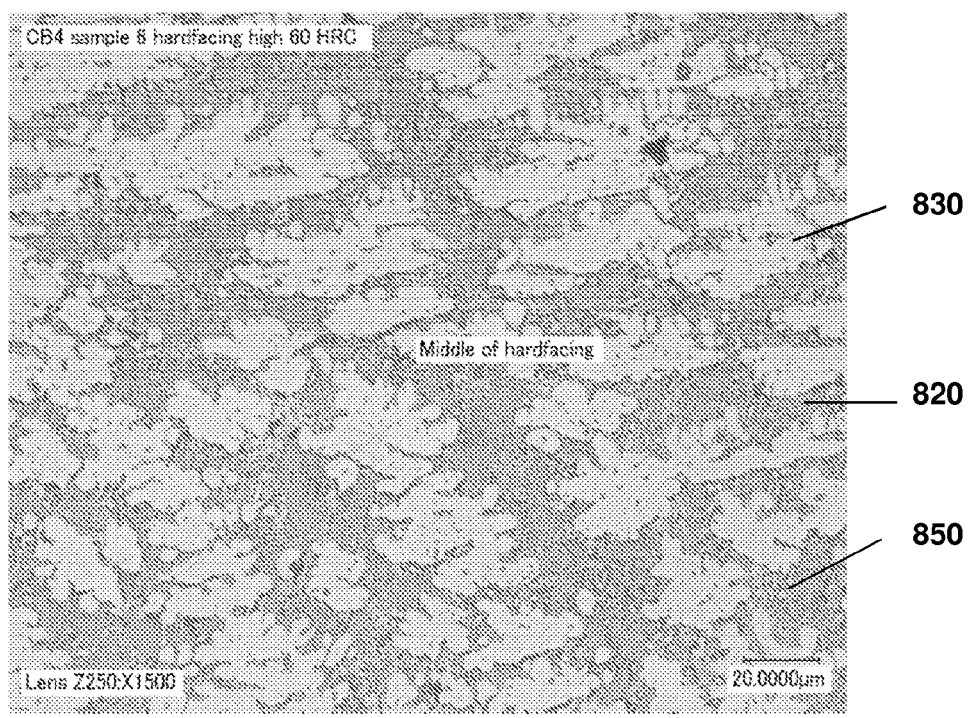
Figure 9E:
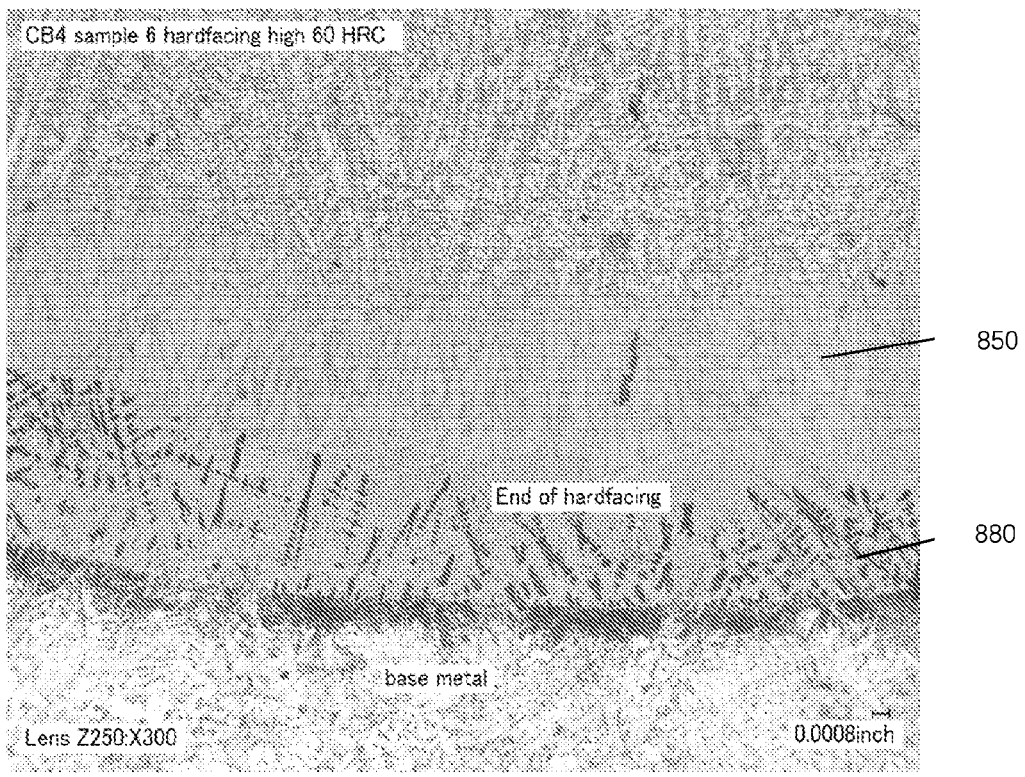

FIGS. 9A, 9B and 9C show polished cross-sections at higher magnifications at different depths in a hardfacing (CB4 sample 6) with similar hardness to that of FIG. 8. FIG. 9A is from a location at the surface of the hardfacing (300×, marker 0.0008 inch). The dark gray feature at the surface of the hardfacing is a boron carbide particle; it is believed that this boron carbide particle was not completely dissolved during the welding process. The light features are believed to be massive columnar metal carbide. FIG. 9B is from a location near the surface of the hardfacing and is at higher magnification (1500×, marker 20 micron); in this image the iron boride is gray and the metal carbide is lighter. Label 810 indicates massive carbide plates, label 820 lamellar metal carbides and label 850 an iron boride phase, which may include eutectic boride phase. FIG. 9C shows a location near the middle of the hardfacing (250×, marker 20 micron). Massive equiaxed dendritic metal carbides were observed. FIG. 9D also shows a location near the middle of the hardfacing, but at higher magnification. Iron boride and metal carbide phases are seen, but the morphology of these phases is different than near the surface; the metal carbide phase is dendritic in this area (1500×, marker 20 micron). FIG. 9D showed equiaxed dendritic metal carbides 830, which is likely indicative of rapid cooling conditions. The formation of dendritic metal carbide is believed to depend on the degree of chemical segregation and the cooling rate as austenite phase decomposed. Pearlitic metal carbide matrix (820 in and a grey phase iron boride phase 850 were also observed. FIG. 9E shows a location near the end of the hardfacing (300×, marker 0.0008 inch). A high hardness iron boride phase 850 was observed. The end of the hardfacing area cooled faster than the above region and formed a dendritic phase 880.

Figure 10:
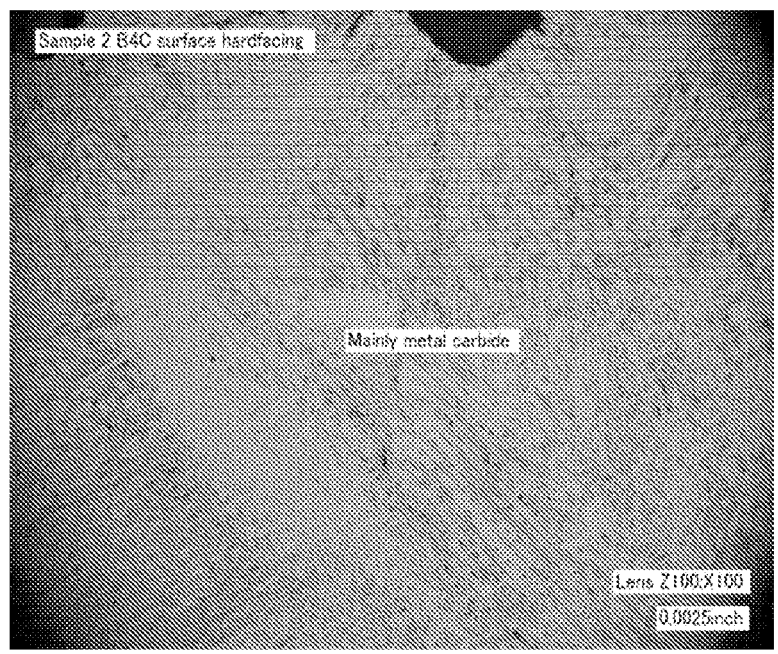
FIG. 10 shows a cross-section through another boron carbide based hardfacing applied to a base metal (100×).

FIG. 10 shows another boron carbide based hardfacing; and one hardness measurement for this hardfacing was 67 HRC (Sample 2 B4C). Massive metal carbide phases are visible even at a magnification of 100× (marker 0.0025 inch). The orientation of metal carbide grains is favored to increase wear resistance of this type of hardfacing.

Figure 11:
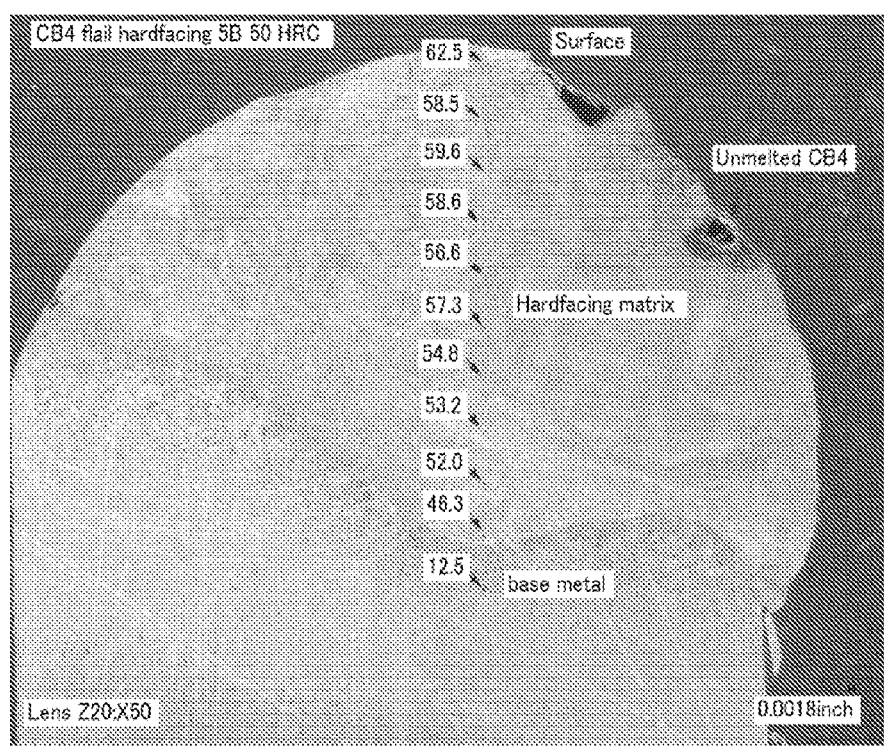
FIG. 11 shows a cross-section through another boron carbide based hardfacing applied to a base metal (50×). Hardness measurements at different depths in the hardfacing are also shown.

FIG. 11 shows a cross-section through another boron carbide based hardfacing applied to a base metal (50×, CB4 flail hardfacing 5B, marker 0.0018 inch). Hardness measurements at different depths in the hardfacing are also shown; the measured hardness values in the hardfacing ranged between 46.3 and 62.5 (Rockwell C Hardness, HRC). A boron carbide particle is identified at the surface of the hardfacing; and it is believed that this boron carbide particle was not completely dissolved during the welding process.

Figure 12A:
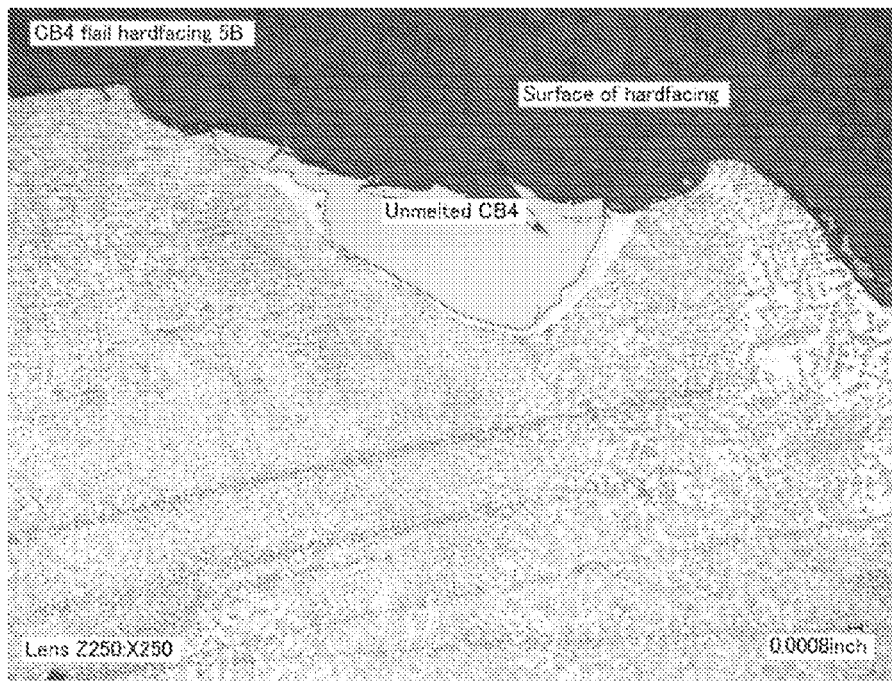
FIGS. 12A, 12B, 12C and 12D show polished cross-sections at higher magnifications at different depths in the hardfacing of FIG. 11.
Figure 12B:
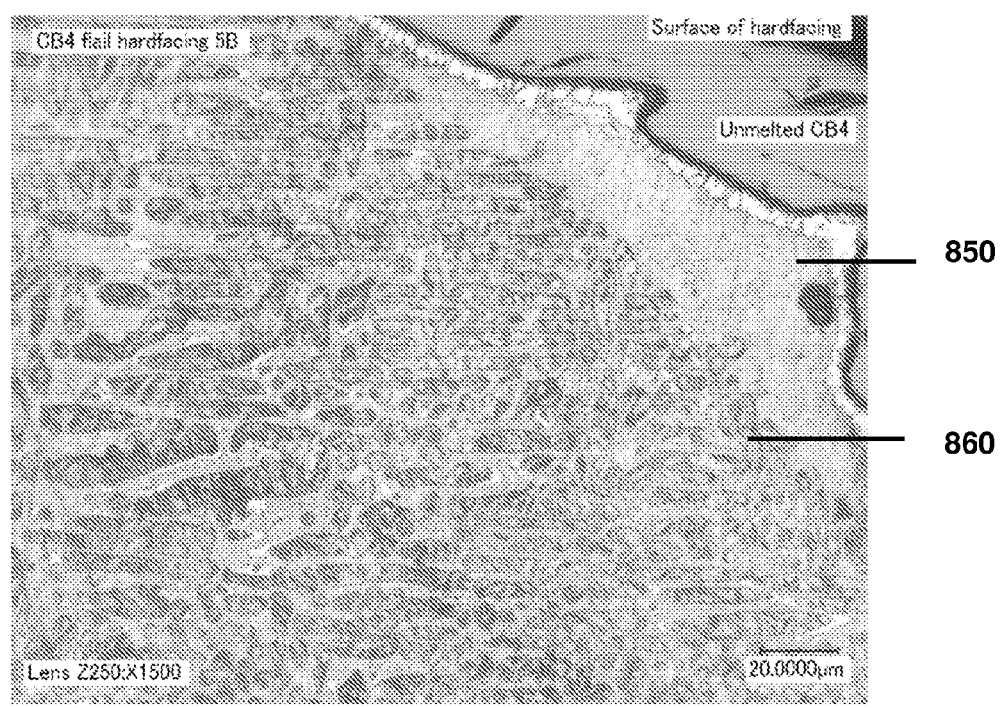
Figure 12C:
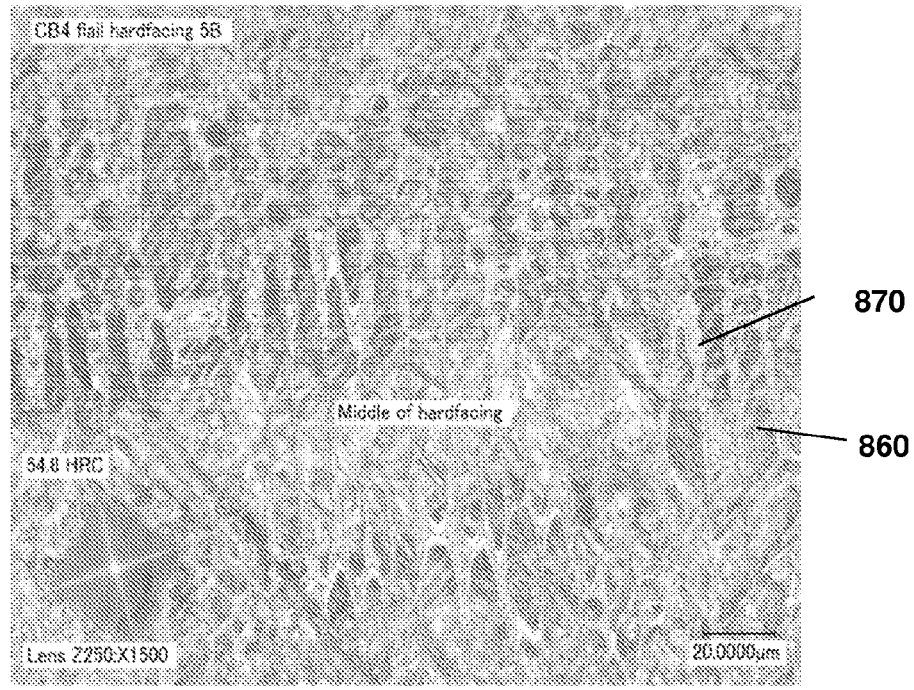
Figure 12D:
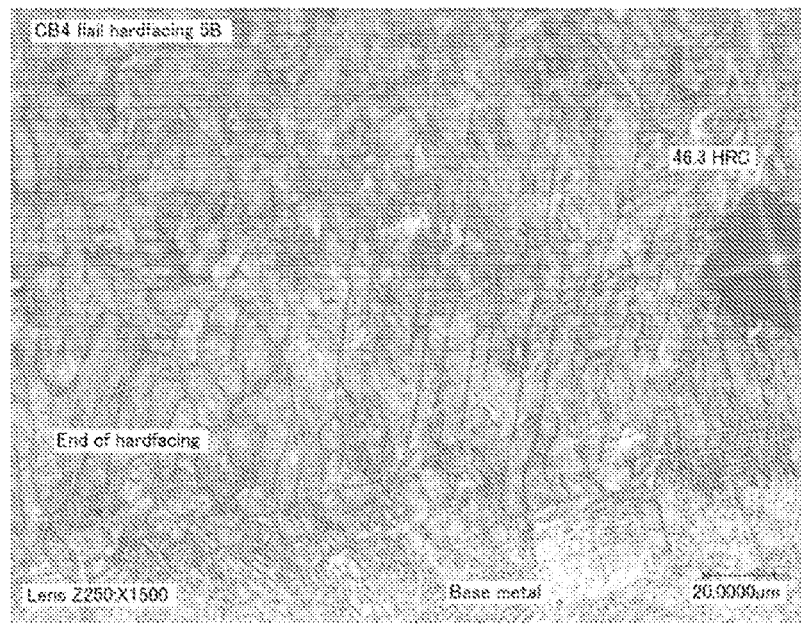

FIGS. 12A and 12B show two different magnified views near the surface of the hardfacing of FIG. 11. (sample 5B). Phases identified in FIG. 12A were dendtritic metal carbide, martensitic phase and iron boride. In FIG. 12B (1500×, marker 20 micron), the darker phase 860 is believed to be martensitic and the lighter phase is believed to be an iron boride phase 850. Dendritic metal carbide is also believed to be visible in FIG. 12A (250×, marker 0.0008 inch). FIG. 12C shows a location near the middle of the hardfacing of FIG. 11, and FIG. 12D shows a location near the end of the hardfacing. Medium carbon martensitic (darker gray, 860), iron boride (light gray) and metal carbide (white, 870) features are identified in FIG. 12C; lath martensitic features were observed near the base metal in FIG. 12D (both at 1500×, marker=20 micron)

Figure 13:
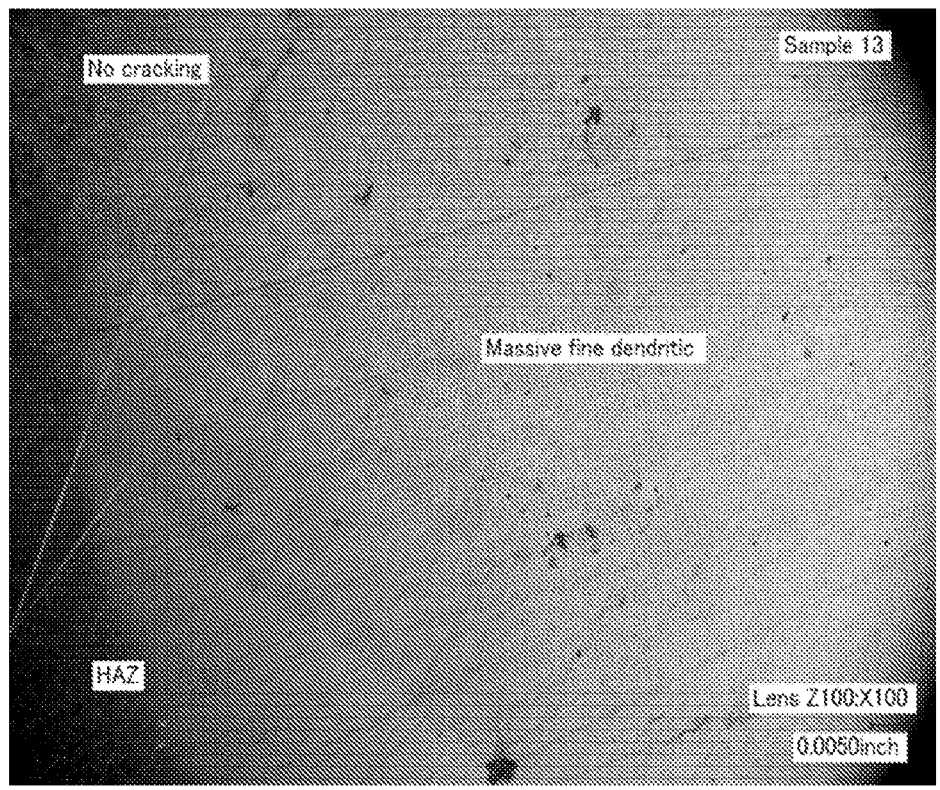
FIG. 13 shows a polished cross-section of another boron carbide based hardfacing.

FIG. 13 shows a cross-section of another boron carbide-based hardfacing (Sample 13, 100×, marker 0.005 inch). A hardness measurement for this hardfacing was 44 HRC.

Figure 14:
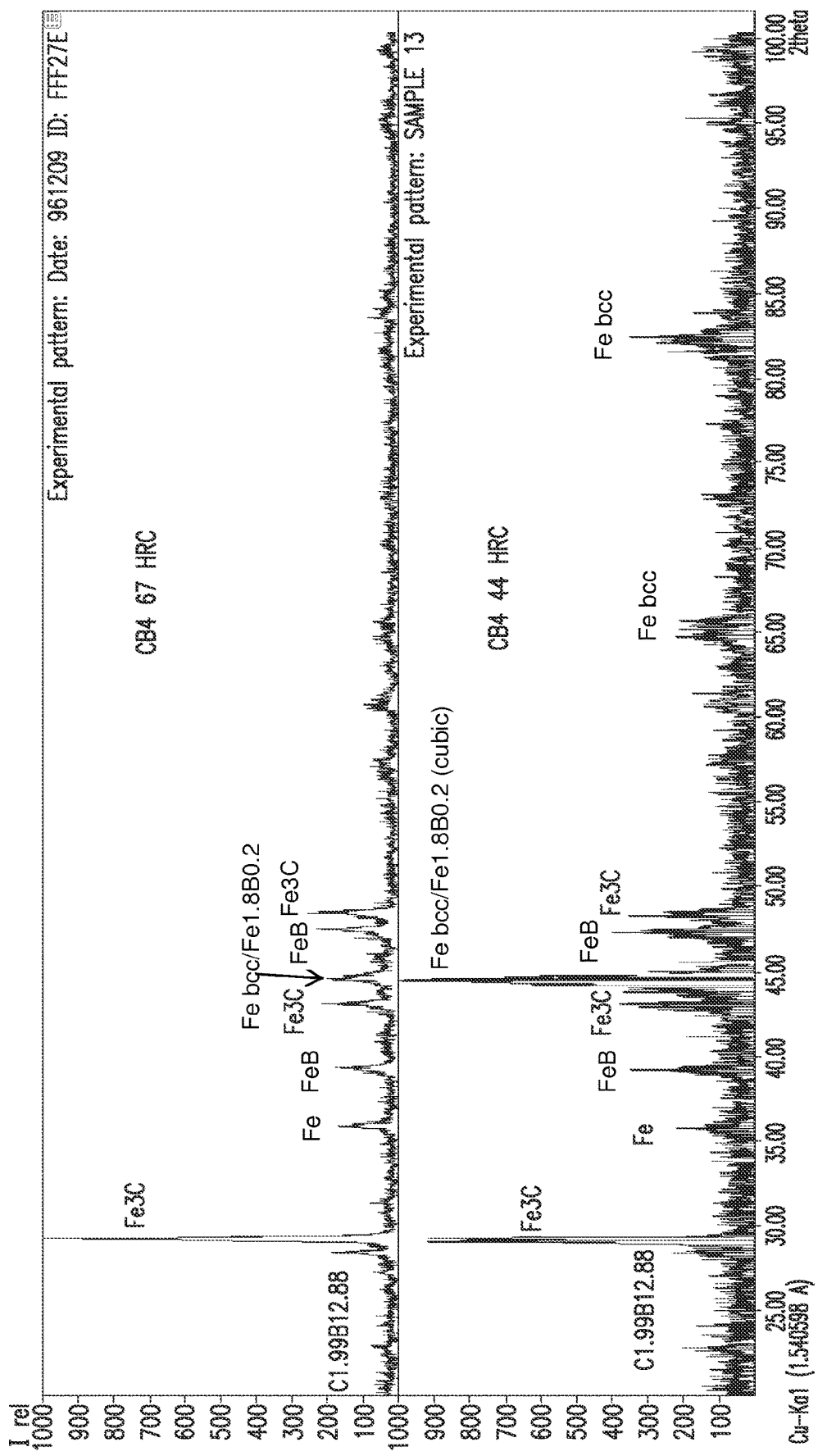
FIG. 14 shows diffraction patterns taken for two different boron carbide based hardfacings.

FIG. 14 shows two diffraction patterns. The upper trace is for sample 2 (FIG. 10, 67 HRC), while the lower trace is for sample 13 (FIG. 13, 44 HRC). Peaks were labeled as $Fe_3C$, Fe (non-austenitic), $Fe_{1.8}B_{0.2}$ ($Fe_9B$), FeB and possible $C_{1.09}B_{12.88}$ in the upper trace. The lower diffraction pattern indicates that non-austentic iron (bcc or alpha iron) as well as $Fe_3C$, $Fe_{1.8}B_{0.2}$ ($Fe_9B$) and FeB is present in the sample.

Wear testing of a boron carbide based hardfacing with an approximate hardness of 60 to 65 HRC gave an average abrasion (volume loss) of 31.55 and an average wear number of 3.26. Tables 6 and 7 give hardness values for various samples.

TABLE 6

Table of Hardness Values for Sample B4.

| Sample B4 | Hardness HRC | Depth From Surface (inch) | Location |
|---|---|---|---|
| 1 | 65.9 | 0.005 | Near surface |
| 2 | 65.8 | 0.020 | |
| 3 | 66.2 | 0.035 | |
| 4 | 65.1 | 0.050 | |
| 5 | 65.4 | 0.065 | |
| 6 | 63.2 | 0.080 | Mid section |
| 7 | 64.2 | 0.095 | |
| 8 | 64.5 | 0.110 | |
| 9 | 65.5 | 0.125 | |
| 10 | 64.3 | 0.140 | |
| 11 | 65.8 | 0.155 | |
| 12 | 13.8 | 0.170 | Base metal |

TABLE 7

Table of Hardness Values for Sample 5B.

| Sample 5B | Hardness HRC | Depth From Surface (inch) | Location |
|---|---|---|---|
| 1 | 62.5 | 0.005 | Near surface |
| 2 | 58.5 | 0.020 | |
| 3 | 59.6 | 0.035 | |
| 4 | 58.6 | 0.050 | |
| 5 | 56.6 | 0.065 | |
| 6 | 57.3 | 0.080 | Mid section |
| 7 | 54.8 | 0.095 | |
| 8 | 53.2 | 0.110 | |
| 9 | 52.0 | 0.125 | |
| 10 | 46.3 | 0.140 | End of hardfacing |
| 11 | 12.5 | 0.155 | Base metal |

Example 3: Boron and Silicon Carbide Based Hardfacings with Mild Steel Weld Wire Hardfacings were deposited using GMAW using ER70S-6 (L59) wire with 12-24 mesh size $B_4C$ and SiC particle mixtures being dropped into the weld during the welding process.

Figures 15A, 15B:
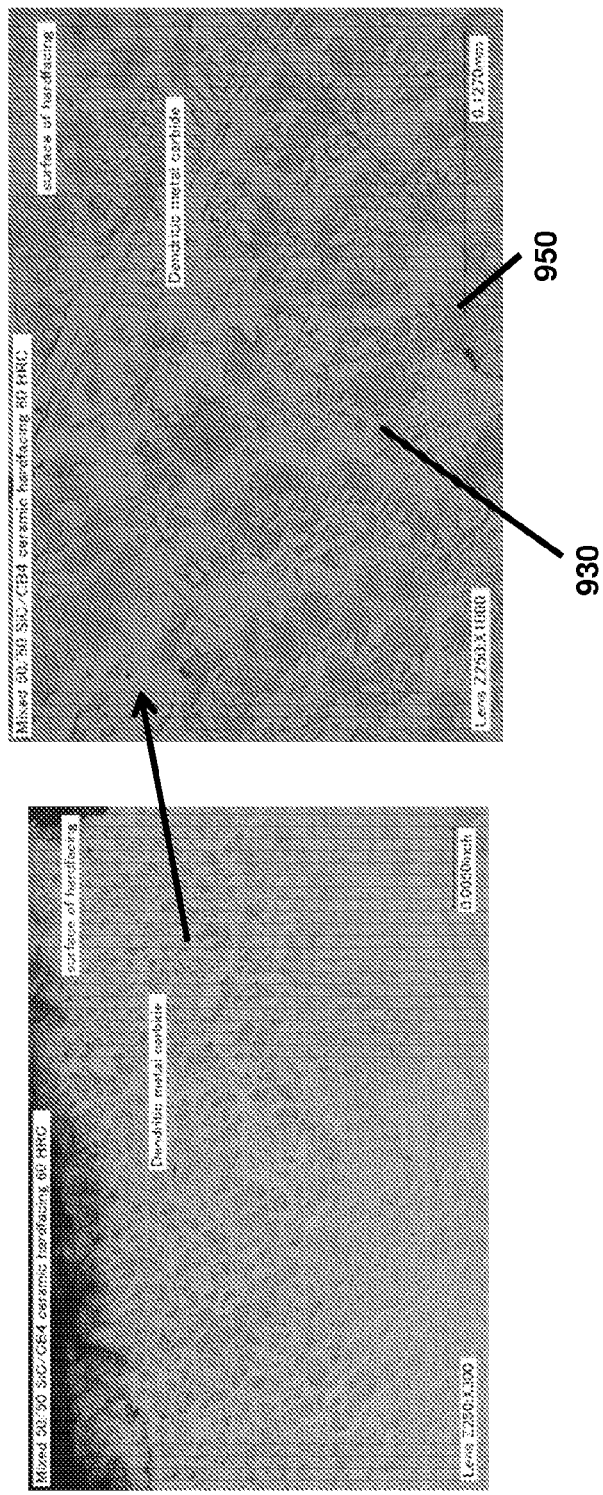
FIGS. 15A, 15B, 15C, 15D, 15E and 15F show polished cross-sections of a hardfacing made using a mixture of approximately 50 vol % boron carbide and 50 vol % silicon carbide.
Figure 15C:
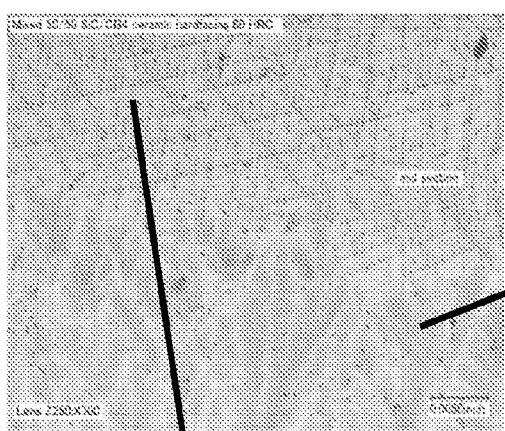
Figure 15E:
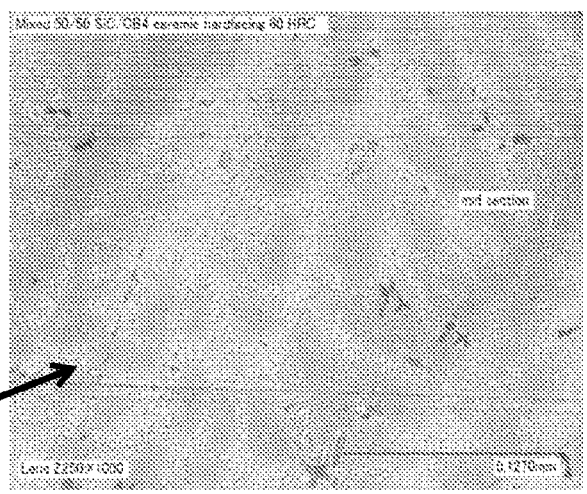
Figure 15D:
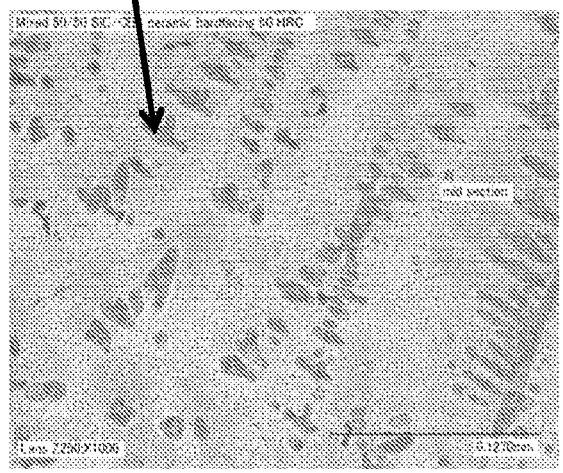
Figure 15F:
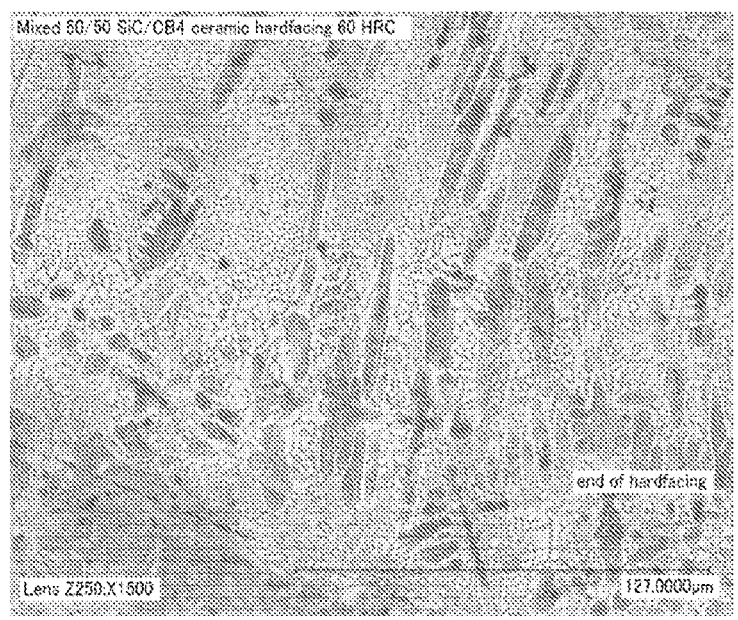

FIGS. 15A-15F show polished cross-sections of a hardfacing made using a mixture of approximately 50 vol % boron carbide and 50 vol % silicon carbide. The overall hardness of this hardfacing was about 60 HRC. FIGS. 15A (300×, marker 0.005 inch) and 15B (1000×, marker 0.127 mm) show an area near the surface of the hardfacing. Dendritic metal carbide phase (light, 930 and metal boride phase (darker, 950) are identified in FIG. 115B. The metal boride phase may comprise iron and silicon. The matrix is believed to include a majority of iron boride and a small amount of $SiB_4/SiB_6$. FIGS. 15C-15E show an area near the middle of the hardfacing. FIG. 15C, 300×, marker 0.005 inch; FIG. 15D, 1000×, marker 0.127 mm; FIG. 15E, 1000×, 0.127 mm are provided. Lamellar carbides are identified in FIGS. 15D and 15E; and a darker (iron-rich) dendritic phase is also identified in FIG. 15D. Similar lamellar carbides and dendritic phases are identified in FIG. 15F (1500×, marker 127 micron).

Figure 16A:
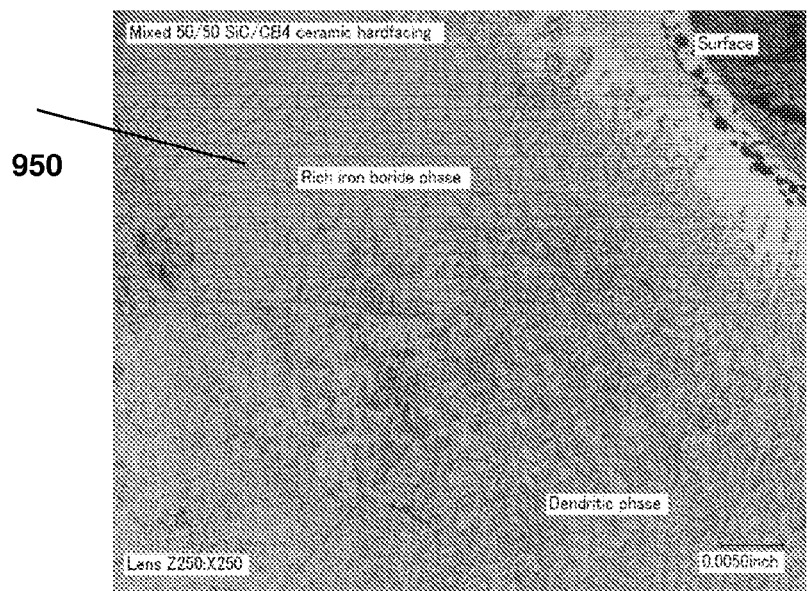
FIGS. 16A, 16B and 16C show polished cross-sections of a hardfacing made using a mixture of approximately 50 vol % boron carbide and 50 vol % silicon carbide.
Figure 16B:
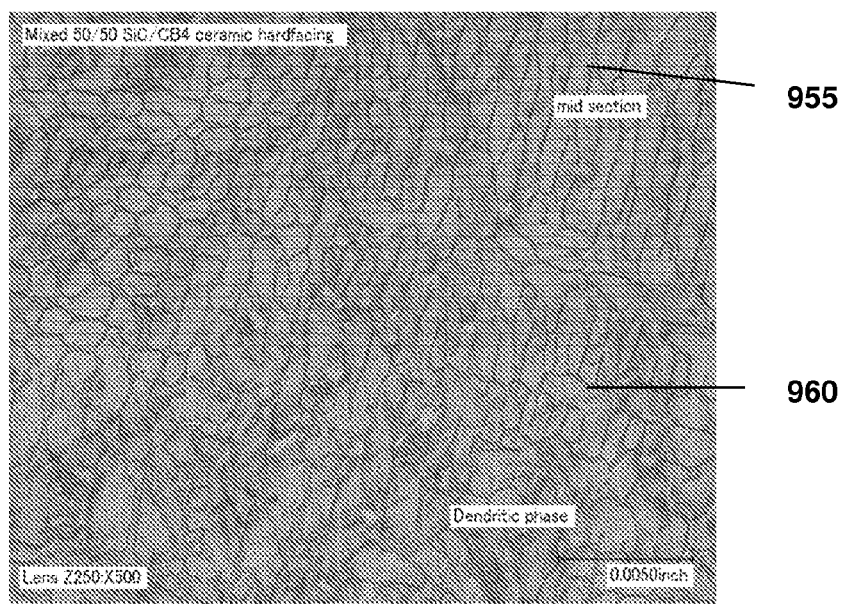
Figure 16C:
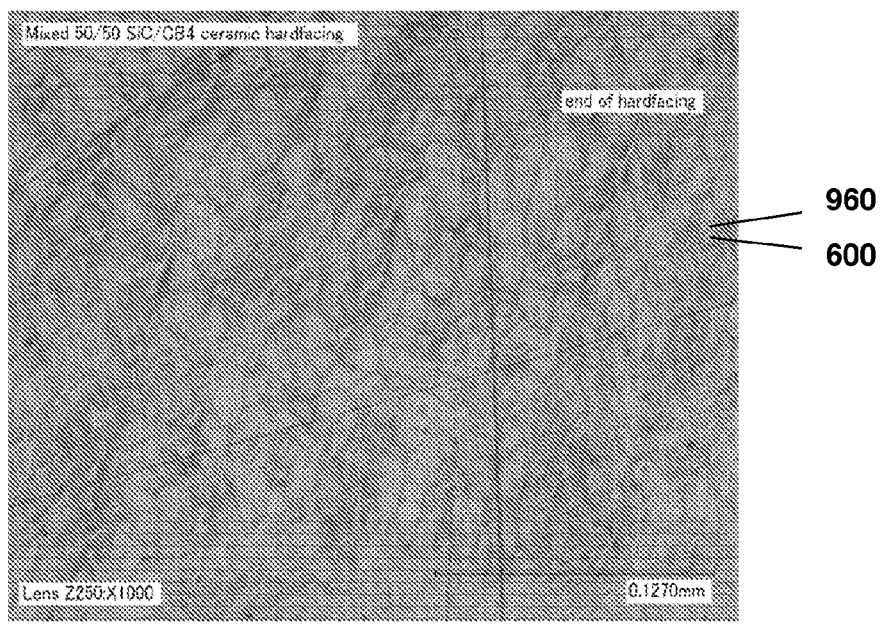

FIGS. 16A-16C show polished cross-sections of a hardfacing made using a mixture of approximately 50 vol % boron carbide and 50 vol % silicon carbide; the overall hardness of this hardfacing was about 50 HRC. Near the surface, an iron boride phase 950 was identified in FIG. 16A, as well as a dendritic phase (250×, marker 0.005 inch). FIG. 16B (500×, marker 0.005 inch) shows a location near the midsection of the hardfacing. Martensite 960 and retained austenite were identified as well as a grey boride network 955. At the end of the hardfacing, less boride network was observed relative to the amount of martensite (960) and retained austenite (600), as shown in FIG. 16C (1000×, marker 0.127 mm).

Wear testing of an approximately 50 vol % silicon carbide and 50 vol % boron carbide based hardfacing with an approximate hardness of 55 to 59 HRC gave an average abrasion (volume loss) of 20.45 and an average wear number of 5.10.

Figure 17A:
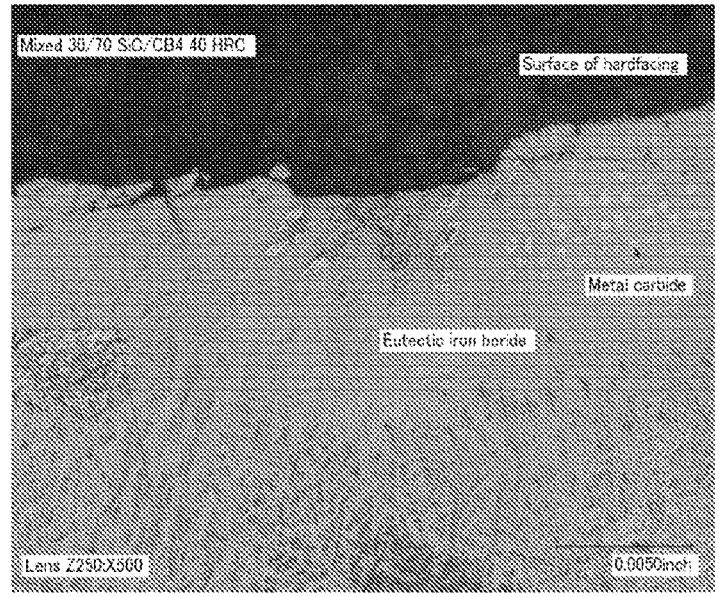
FIGS. 17A, 17B and 17C show polished cross-sections of a hardfacing made using a mixture of approximately 70 vol % boron carbide and 30 vol % silicon carbide.
Figure 17B:
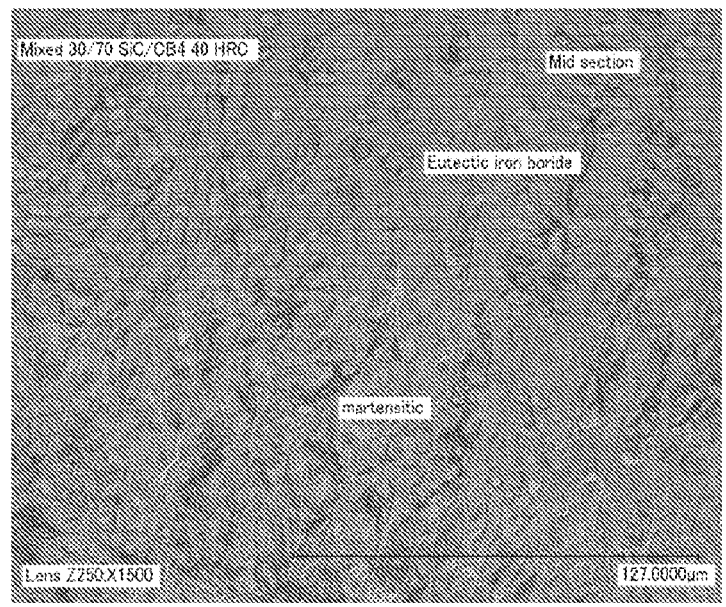
Figure 17C:
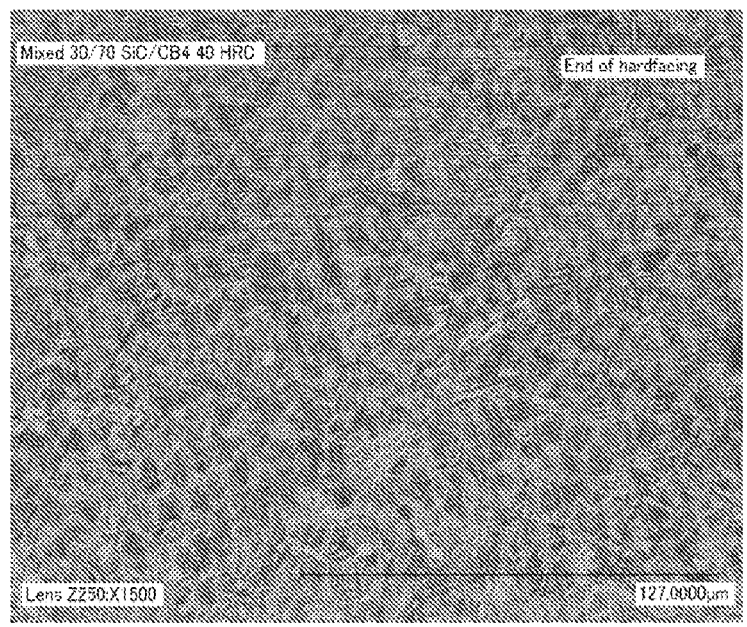

FIGS. 17A-17C show polished cross-sections of a hardfacing made using a mixture of approximately 70 vol % boron carbide and 30 vol % silicon carbide. As shown in FIG. 17A, metal carbide (lighter) was seen in iron boride (grey) near the surface of the hardfacing (500×, marker 0.005 inch). The metal carbide is tetragonal in form in an iron boride matrix, which may include eutectic iron borides. FIG. 17B shows an area near the mid-section of the hardfacing; dendritic martensitic or bainitic features are observed iron boride (grey) (1500×, marker 127 micron). Near the end of the hardfacing, martensitic or bainitic features with ferrite grains were observed, as shown in FIG. 17C (1500×, marker 127 microns).

Figure 18A:
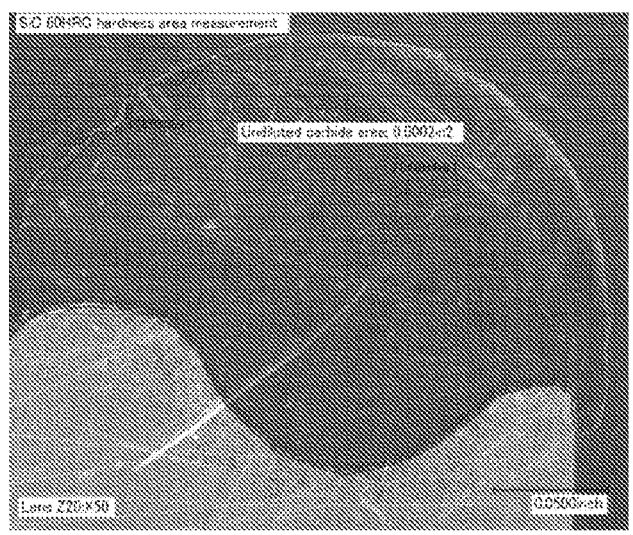
FIGS. 18A and 18B compare hardfacings made with a stationary gun (FIG. 18A) and a stationary sample (FIG. 18B).
Figure 18B:
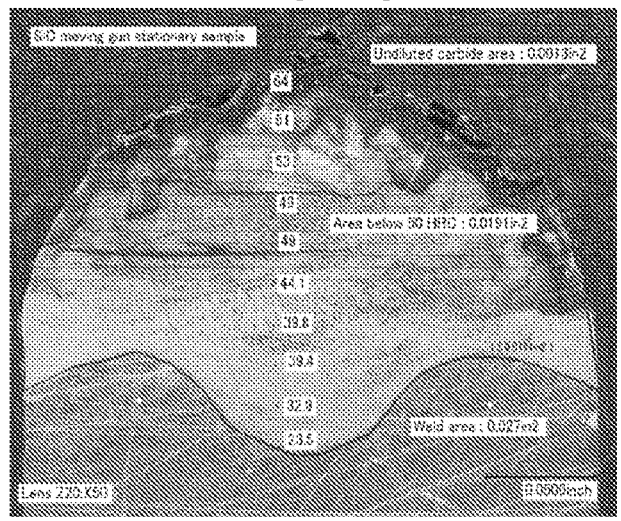

Example 4: Comparison of Hardfacings Made with Stationary Weld Gun and Stationary Sample FIGS. 18A and 18B shows silicon carbide-based hardfacings made with a stationary gun (FIG. 17A) and a stationary sample (FIG. 18B). The images show that the hardfacing in FIG. 18A had a more uniform hardness than that in FIG. 18B. FIG. 18A shows that the hardfacing made with a stationary gun had 100% of the hardfacing area with a hardness of at least 60 HRC. FIG. 18B shows the hardfacing made with a stationary sample. Although the hardness near the surface is above 60 HRC, 70% of the hardness is below 50 HRC (both at 50×, marker 0.05 inch).

Figure 18C:
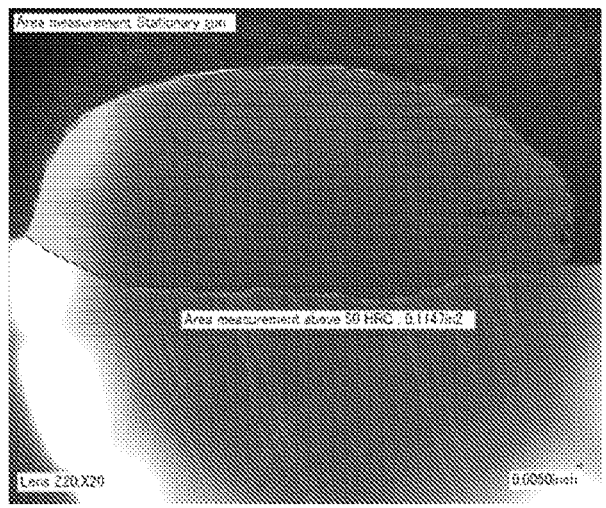
FIGS. 18C and 18D also compare hardfacings made with a stationary gun (FIG. 18C) and a stationary sample (FIG. 18D).
Figure 18D:
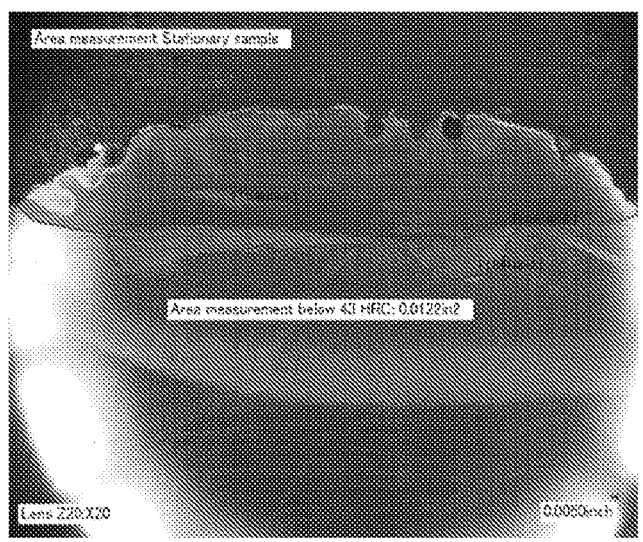

FIGS. 18C and 18D show hardfacings made with a stationary welding gun (FIG. 18C) and a stationary sample (FIG. 18D). The images show that the hardfacing in FIG. 18C had more uniform hardness than that in FIG. 18D. In FIG. 18C, 100% of the hardfacing has a hardness greater than 50 HRC. In FIG. 18D, 14.6% of the sample had a hardness below 43 HRC (both at 20×, marker 0.005 inch).

Figure 18E:
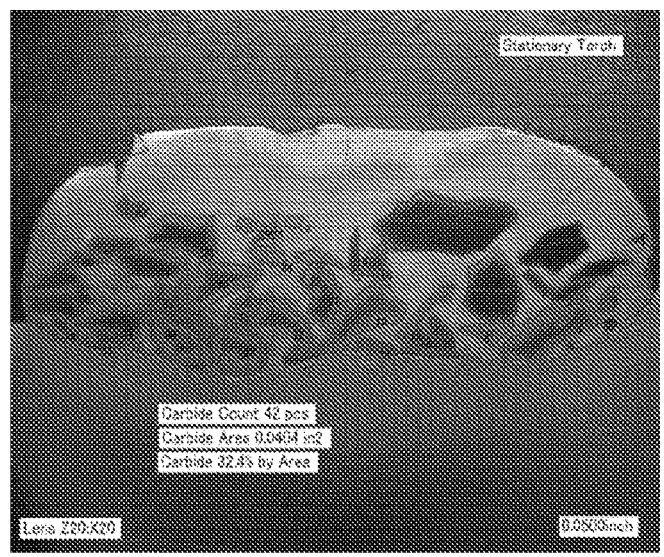
FIGS. 18E and 18F compare hardfacings incorporating tungsten carbide made with a stationary gun (FIG. 18E) and stationary sample (FIG. 18F).
Figure 18F:
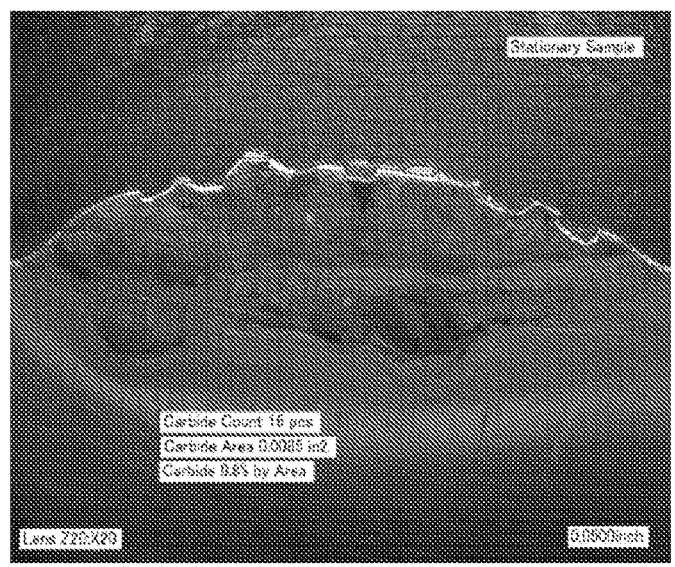
Figure 19:
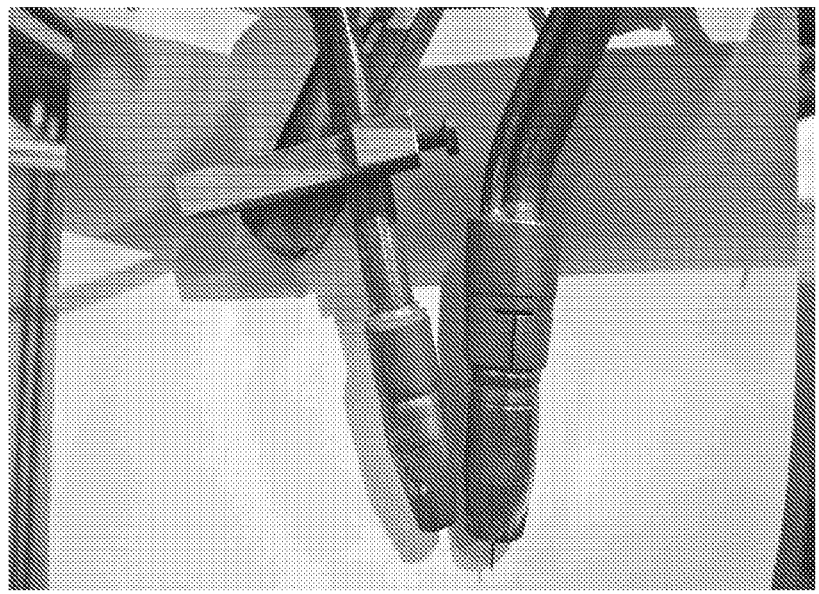
FIG. 19 illustrates an exemplary weld torch and carbide drop nozzle fixturing.

FIGS. 18E and 18F show percentage of tungsten carbide areas in a mixed ceramic hardfacing with the composition of 50 vol % WC, 25 vol % SiC and 25 vol % boron carbide (both at 20×, marker 0.05 inch). FIG. 18E (stationary gun): Percentage of tungsten carbide (WC) area: 32.4% (42 pieces carbide count) in mixed ceramic hardfacing with the composition of 50 vol % WC, 25 vol % SiC, 25 vol % $CB_4$. FIG. 18F (stationary sample): Percentage of tungsten carbide (WC) area: 9.8% (16 pieces carbide count) in mixed ceramic hardfacing with the composition of 50 vol % WC, 25 vol % SiC, 25 vol % $CB_4$.

Table 8 and 9, respectively, show hardness values for SiC based samples Viz 8 and Viz 9 obtained using a stationary sample and a moving gun.

TABLE 8

Table of Hardness Values for Viz 8.

| Sample Viz 8 | Hardness HRC | Depth From Surface (inch) | Location |
|---|---|---|---|
| 1 | 64.2 | 0.005 | Near surface |
| 2 | 51.0 | 0.020 | |
| 3 | 53.1 | 0.035 | |
| 4 | 49.9 | 0.050 | |
| 5 | 49.8 | 0.065 | Mid section |
| 6 | 44.1 | 0.080 | |
| 7 | 39.8 | 0.095 | |
| 8 | 39.4 | 0.110 | |
| 9 | 32.9 | 0.125 | End of hardfacing |
| 10 | 23.5 | 0.140 | Base metal |

TABLE 9

Table of Hardness Values for Viz 9.

| Sample Viz 9 | Hardness HRC | Depth From Surface (inch) | Location |
|---|---|---|---|
| 1 | 64.3 | 0.005 | Near surface |
| 2 | 58.1 | 0.020 | |
| 3 | 41.8 | 0.035 | |
| 4 | 55.4 | 0.050 | |
| 5 | 43.8 | 0.065 | Mid section |
| 6 | 42.9 | 0.080 | |
| 7 | 41.0 | 0.095 | |
| 8 | 31.5 | 0.110 | |
| 9 | 30.9 | 0.125 | End of hardfacing |
| 10 | 28.7 | 0.140 | Base metal |

Example 5: Boron and Silicon Carbide Based Hardfacings with Stainless Steel Weld Wire A variety of hardfacings were made, including reference hardfacings with only tungsten carbide particles. The reference hardfacings were formed using stainless steel wires (309LSi, 310) with WC 100%. Other classes of hardfacings were: stainless steel wires (309LSi, 308, 310, 330 Austenitic stainless) with 100% $CB_4$; stainless steel wires (309LSi, 308, 310, 330 Austenitic stainless) with 100% SiC; stainless steel wires (309LSi, 308, 310, 330 Austenitic stainless) with mixed 50:50 $CB_4$; SiC; stainless steel wires (309LSi, 308, 310, 330 Austenitic stainless) with mixed 70:30 $CB_4$ and SiC; and stainless steel wires (309LSi, 310) with mixed WC and ceramic. (Percentages and ratios based on volume % of the carbide being added to the weld pool).

The addition of ceramic ($CB_4$ and SiC) increased the hardness of the of pure stainless steel as deposited matrix from 20-27 HRC to 35-46 HRC. Table 10 below gives hardness values for selected compositions, including some compositions with L-59 wire, which is a mild steel wire rather than a stainless steel wire. For the samples with boron carbide reinforcement, the hardness was found to depend at least in part on the amount of dissolved boron carbide present in the matrix, which in turn depends on the drop rate. Higher drop rates can increase the hardness of the weld matrix.

Figure 22A:
FIG. 22A shows a cross-section of an as-deposited reference hardfacing formed with stainless welding wire (310 type alloy) and tungsten carbide particles.
Figure 22B:
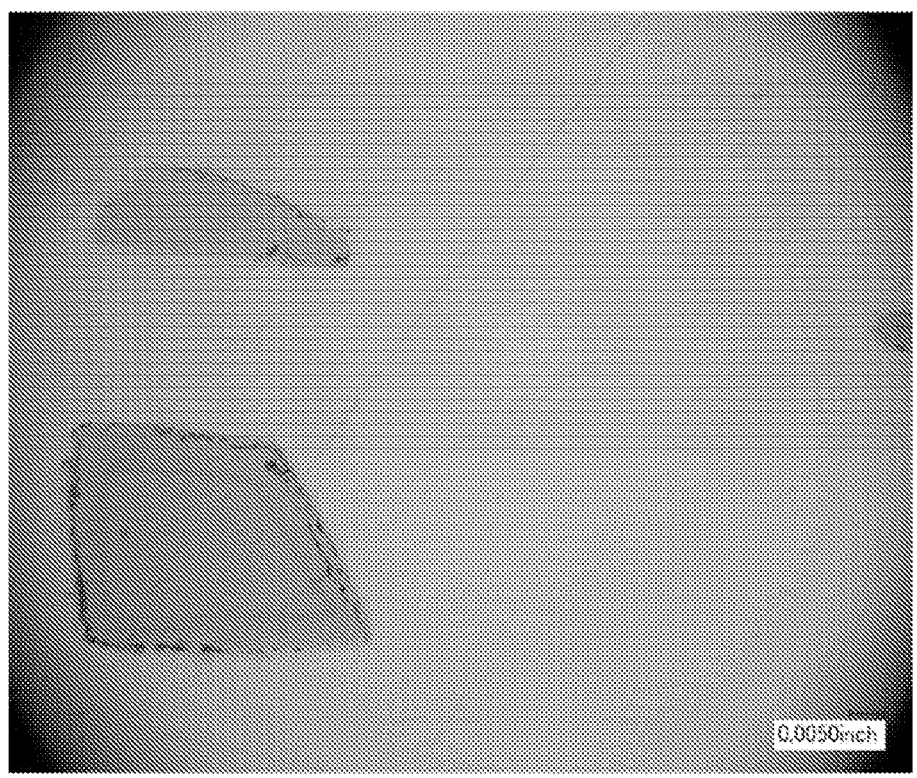
FIG. 22B shows a polished cross-section of the hardfacing at higher magnification.

FIG. 22A shows a cross-section of an as-deposited reference hardfacing formed with stainless welding wire (310 type alloy) and tungsten carbide particles. FIG. 22B shows a polished cross-section of the hardfacing at higher magnification. The cross-section of as-deposited stainless steel ER310 matrix and tungsten carbide showed an austenitic stainless steel matrix; no cracking was observed. In contrast, when a low carbon steel (ER70S) was used, a dendritic metal carbide and martensitic weld matrix was observed. Iron transformed into a martensitic structure is magnetic.

Figure 23A:
FIG. 23A shows a cross-section of an as-deposited hardfacing formed with stainless welding wire (310 type alloy) and boron carbide particles.
Figure 23B:
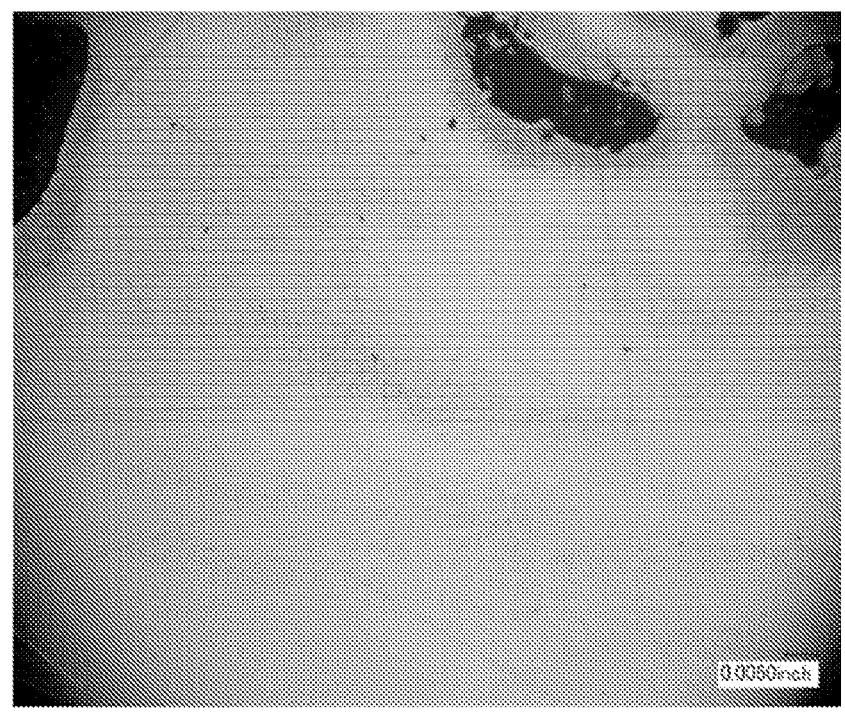
FIG. 23B shows a polished cross-section of the hardfacing at higher magnification; some undissolved boron carbide particles are seen at the top of the image.

FIG. 23A shows a cross-section of an as-deposited hardfacing formed with stainless welding wire (310 type alloy) and boron carbide particles. FIG. 23B shows a polished cross-section of the hardfacing at higher magnification; some undissolved boron carbide particles are seen at the top of the image.

Figure 24A:
FIG. 24A shows a cross-section of an as-deposited hardfacing formed with stainless welding wire (330 type alloy) and boron carbide particles.
Figure 24B:
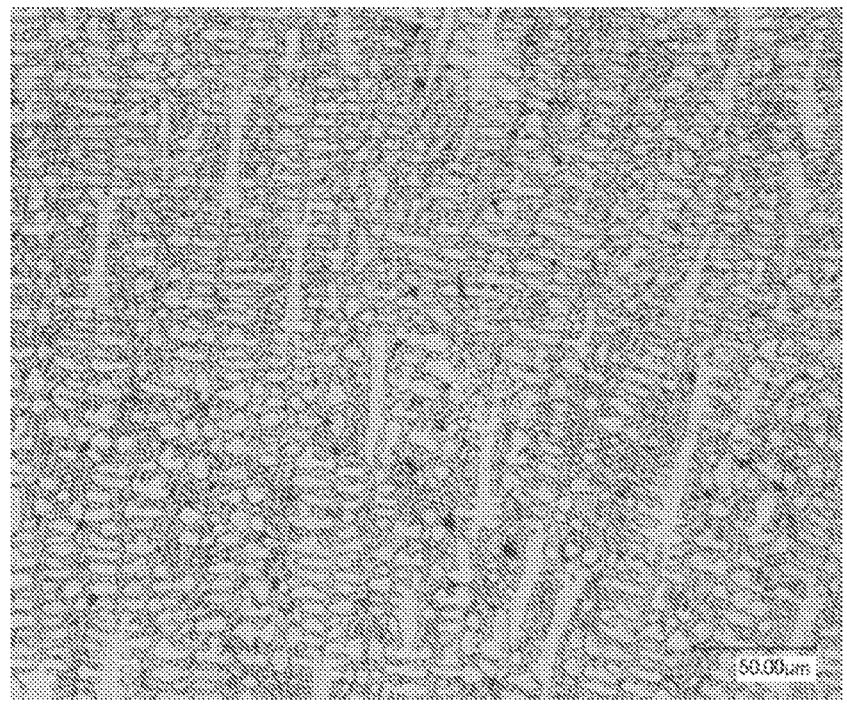
FIG. 24B shows a polished cross-section of the hardfacing at higher magnification. Some undissolved boron carbide particles are seen in both images near the top of the hardfacing.

FIG. 24A shows a cross-section of an as-deposited hardfacing formed with stainless welding wire (330 type alloy) and boron carbide particles. FIG. 24B shows a polished cross-section of the hardfacing at higher magnification. The structure in this image as characterized as a stainless steel austenitic dendritic matrix and what is likely an iron boride mixed phase. Some undissolved boron carbide particles are seen in both images near the top of the hardfacing.

Figure 25A:
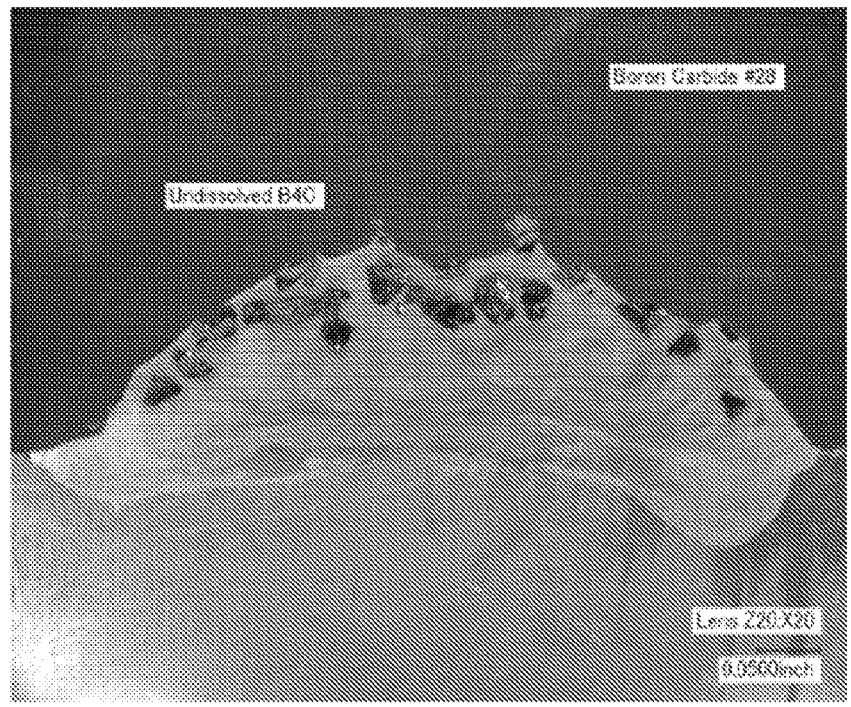
FIG. 25A shows a cross-section of an as-deposited hardfacing formed with stainless welding wire (309LSi type alloy) and boron carbide particles. Some undissolved boron carbide particles are seen in this image near the top of the hardfacing.
Figure 25B:
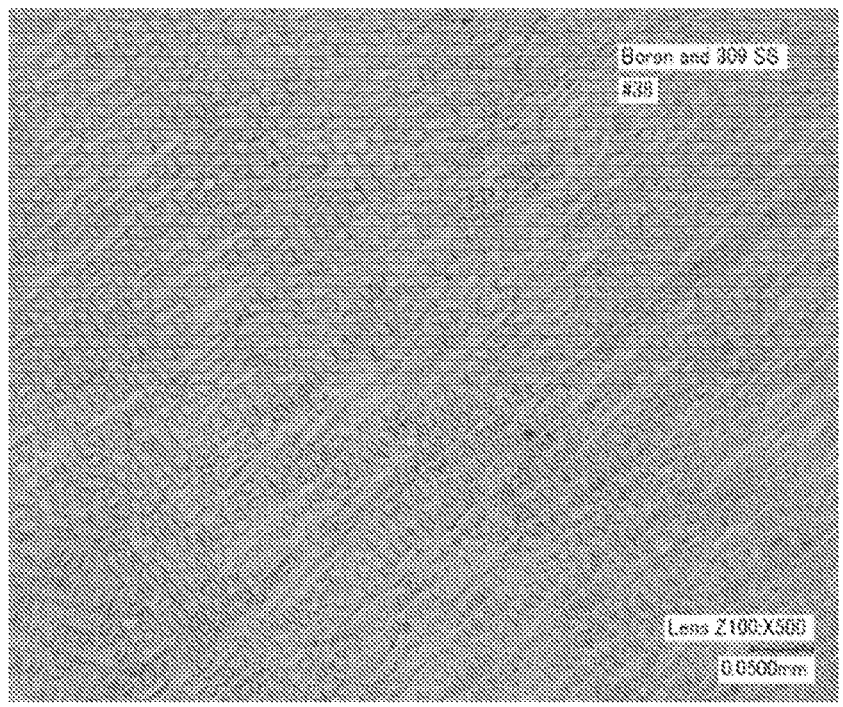
FIG. 25B shows a polished cross-section of another hardfacing (ER309 type) at higher magnification.

FIG. 25A shows a cross-section of an as-deposited hardfacing formed with stainless welding wire (309LSi type alloy, sample boron carbide #28)) and boron carbide particles. Some undissolved boron carbide particles are seen in this image near the top of the hardfacing. FIG. 25B shows a polished cross-section of another hardfacing (ER309, sample #38) at higher magnification.

Figure 26A:
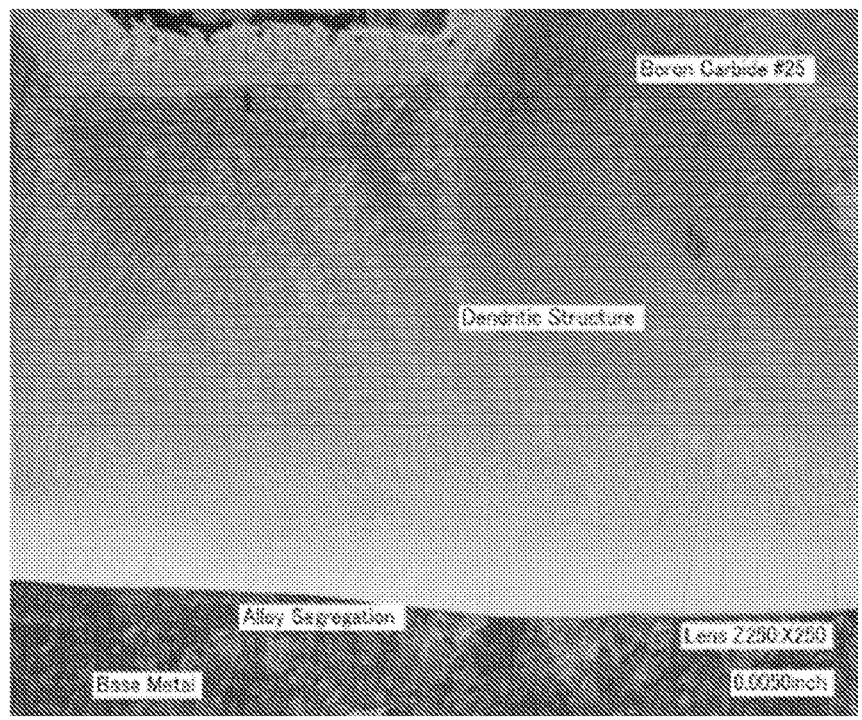
FIG. 26A shows a cross-section of an as-deposited hardfacing formed with stainless welding wire (330 type alloy).

FIG. 26A shows a cross-section of an as-deposited hardfacing formed with stainless welding wire (330 type alloy, Sample #25). This hardfacing was characterized as having no cracks and a dendritic structure.

Figure 26B:
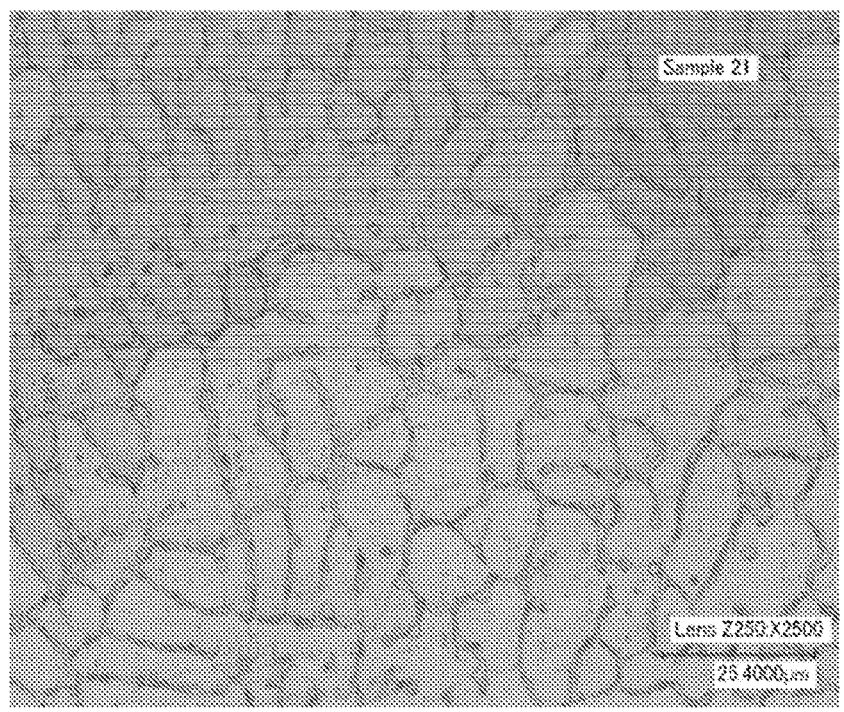
FIG. 26B shows a polished cross-section of another hardfacing (310 type alloy) with a 70:30 mix of boron carbide particles and silicon carbide particles at higher magnification.

FIG. 26B shows a polished cross-section of another hardfacing (Sample 21, 310 type alloy) with a 70:30 mix of boron carbide particles and silicon carbide particles at higher magnification. This hardfacing was characterized as having no cracks.

Figure 27:
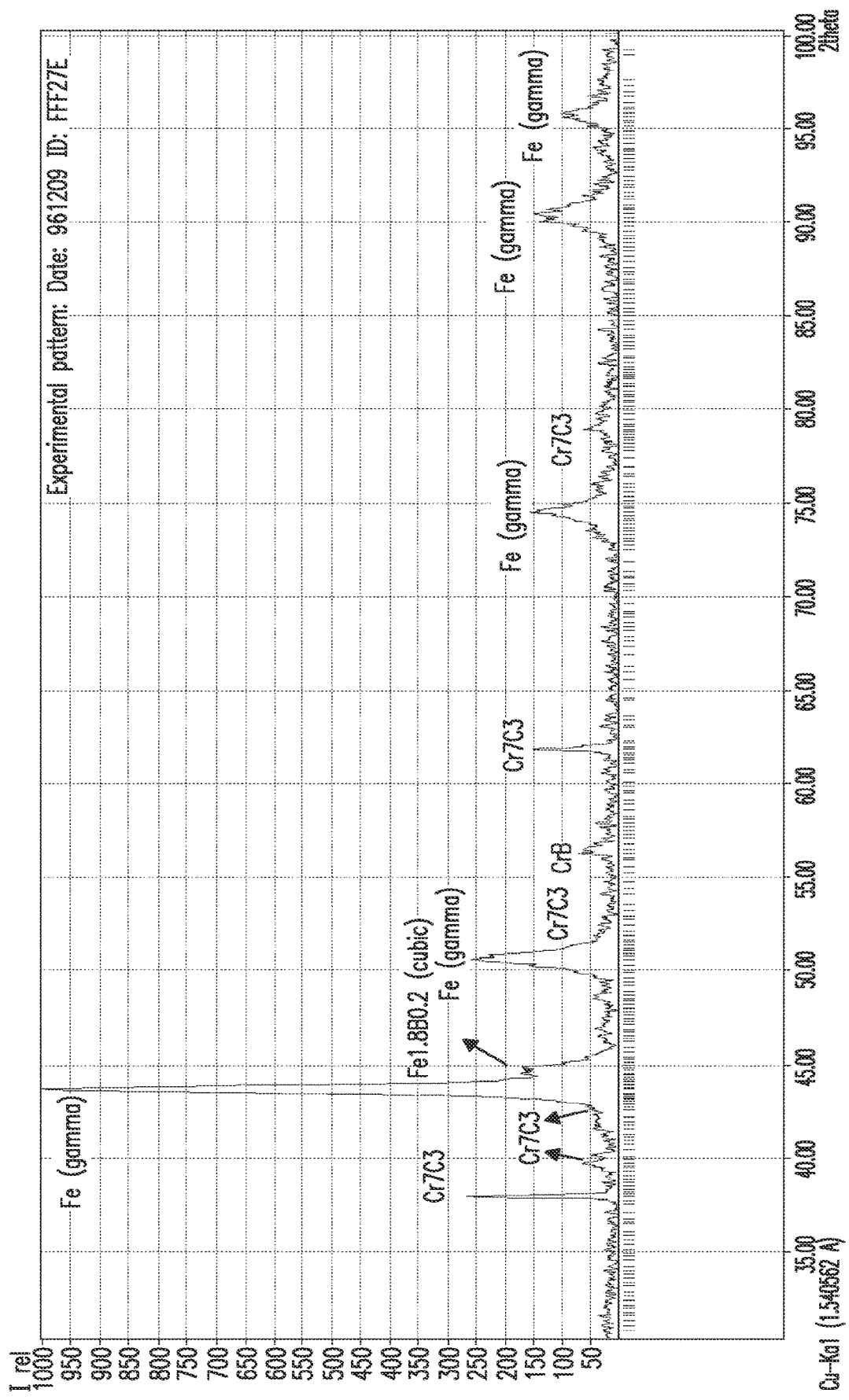
FIG. 27 shows a diffraction pattern taken for a boron carbide and stainless steel based hardfacing.

FIG. 27 shows a diffraction pattern taken for a boron carbide and stainless steel based hardfacing. The weld wire was ER 310. The XRD peaks revealed majority austentic (gamma) iron Fe peaks and chromium carbide ($Cr_7C_3$) peaks. A peak was also seen at about 2theta=45 degrees; a peak for iron boride $Fe_{1.8}B_{0.2}$ cubic structure is expected at about this location (sample HS5, ER310 matrix).

Figure 28A:
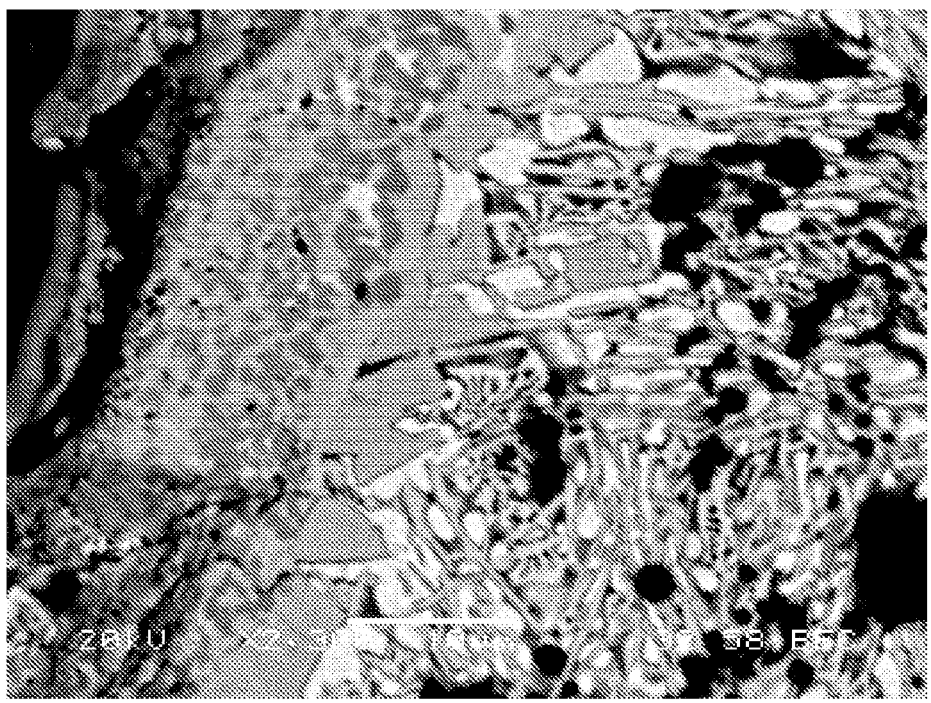
FIGS. 28A and 28B show microscope images of a boron carbide and stainless steel based hardfacing.
Figure 28B:
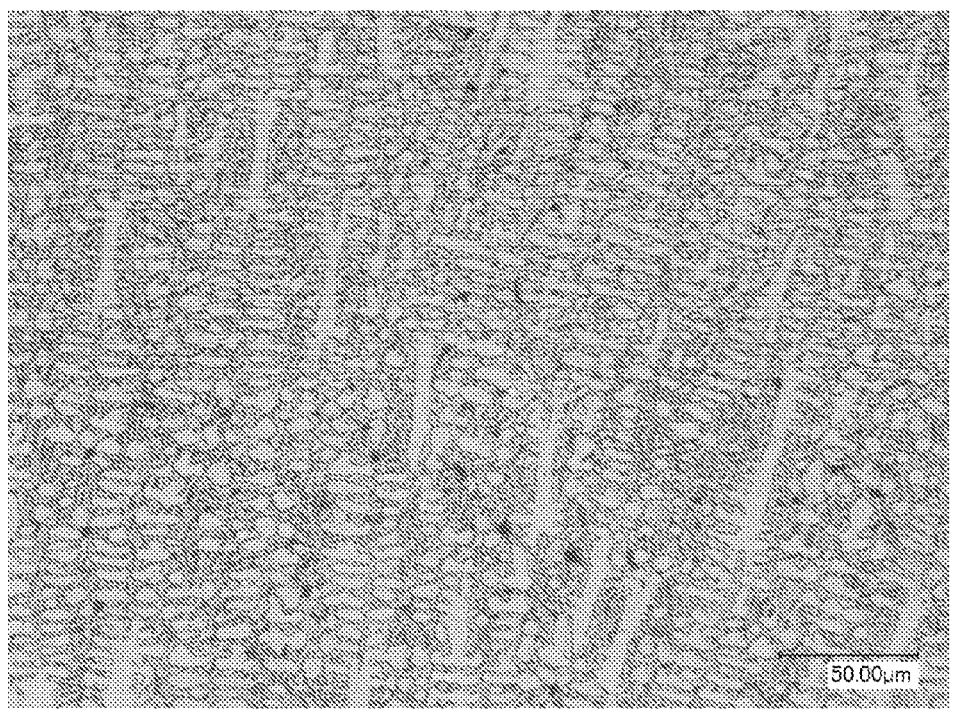

FIGS. 28A and 28B show microscope images of a boron carbide and stainless steel based hardfacing. FIG. 28A: SEM image near the surface. Undissolved boron carbide is seen (dark grey), as well as iron boride (light grey) and chromium carbide (white). FIG. 28B: image from the middle area of the hardfacing. The phases present were identified as dendritic chromium carbide/boride (white) in gamma iron and iron boride rich phase matrix. This latter phase may be $Fe_{1.8}B_{0.2}$.

Figure 29:
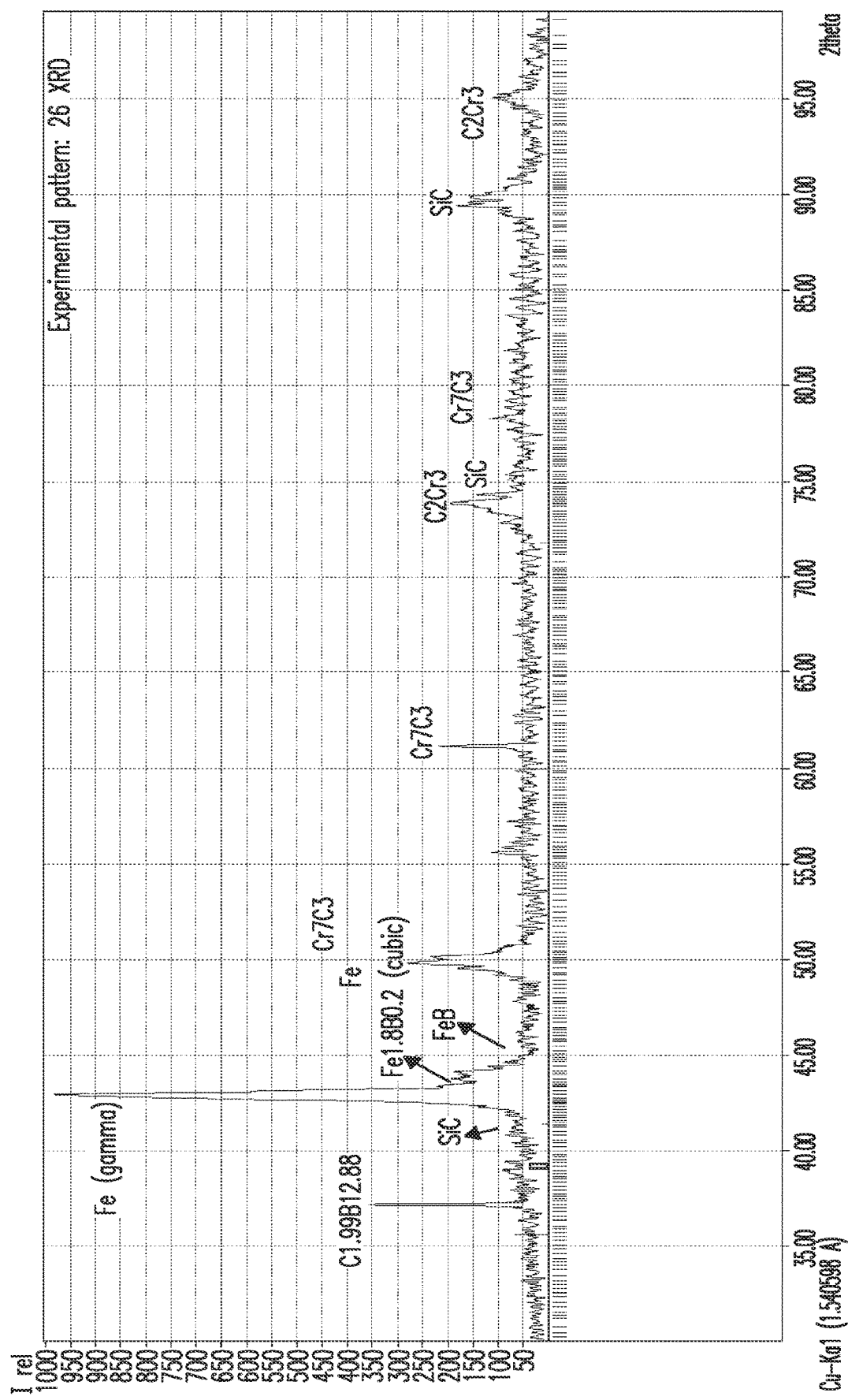
FIG. 29 shows a diffraction pattern taken for a hardfacing based on stainless steel and a mixture of boron carbide and silicon carbide (70/30).

FIG. 29 shows a diffraction pattern taken for a hardfacing based on stainless steel and a mixture of boron carbide and silicon carbide (70/30). The XRD peaks revealed gamma iron Fe peaks and multiple $Cr_7C_3$, $Cr_3C_2$ peaks. Undissolved Boron carbide and SiC peaks were also observed in this hardfacing. A peak was also seen at about 2theta=45 degrees; a peak for iron boride $Fe_{1.8}B_{0.2}$ cubic structure is expected at about this location (Sample HS2, ER310 matrix).

Figure 30A:
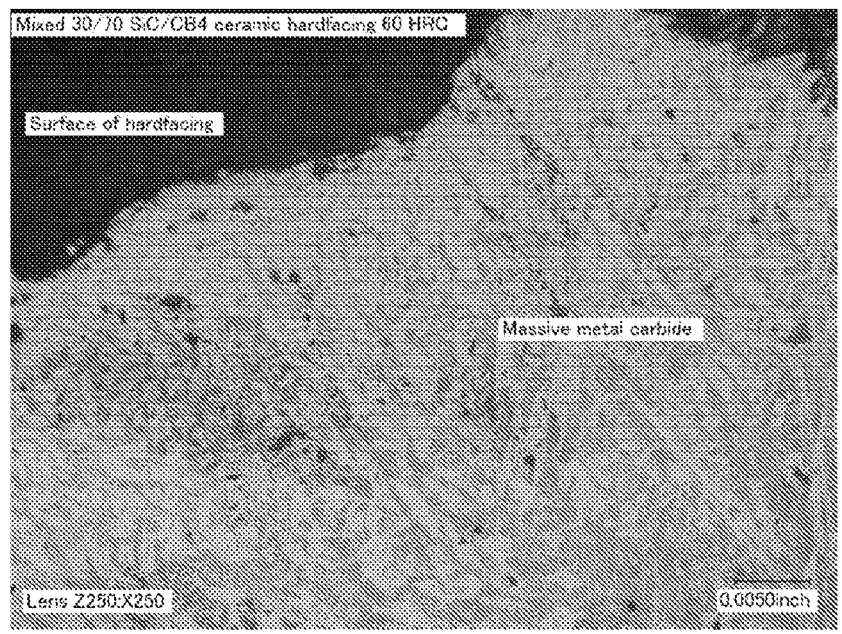
FIGS. 30A, 30B, 30C and 30D show microscope images of a hardfacing based on stainless steel and a mixture of boron carbide and silicon carbide (70/30).
Figure 30B:
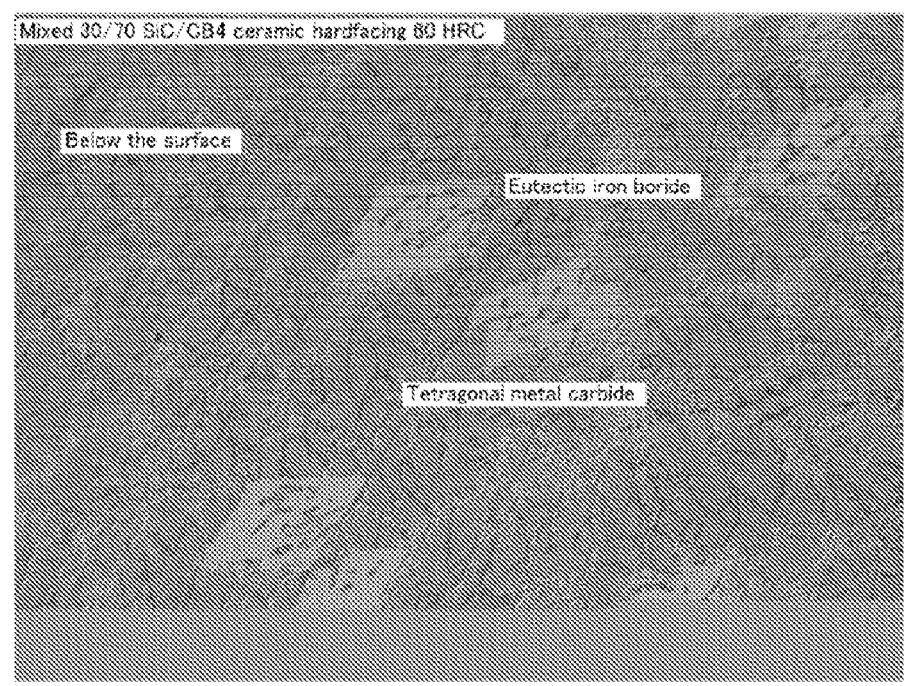
Figure 30C:
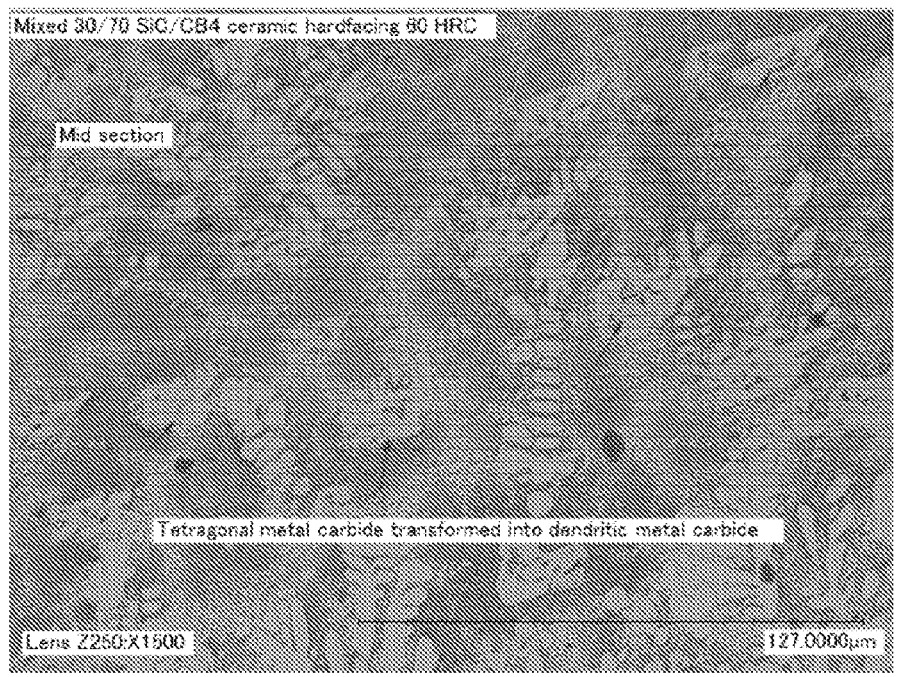
Figure 30D:
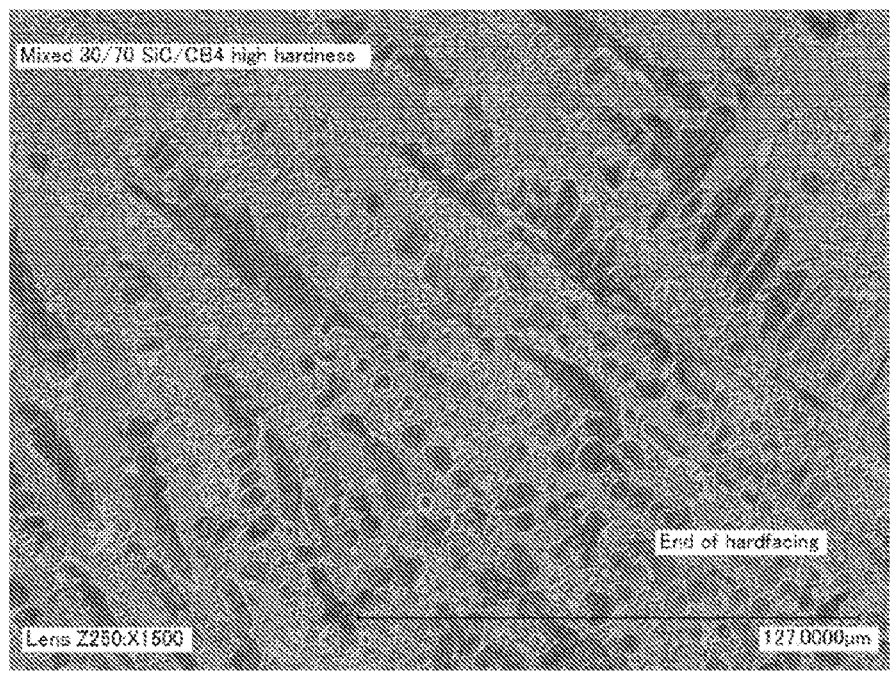

FIGS. 30A-30D show polished cross-sections of a hardfacing made using a mixture of approximately 70 vol % boron carbide and 30 vol % silicon carbide and stainless steel. The overall hardness of this hardfacing was about 60 HRC. FIG. 30A shows massive metal carbide observed near the surface (250×, marker 0.005 inch). Metal carbides near the surface of hardfacing are believed to consist of majority $Cr_7C_3$ chromium carbide (white phase). It is believed that a majority of chromium carbide $Cr_7C_3$ ($M_7O_3$) are formed rather than $M_3C$ due to high Cr content in matrix near the surface of the hardfacing. FIG. 30B shows metal carbide (tetragonal, lighter) in iron boride (may include eutectic iron borides) below the surface, and FIG. 30C shows dendritic metal carbide (lighter) near the mid-section of the hardfacing (1500×, marker 127 micron). It is believed that the tetragonal carbide phase of FIG. 30B presents in dendritic form in FIG. 30C. Dendritic chromium carbide (white) and background. (gamma iron and possible $Fe_{1.8}B_{0.2}$) FIG. 30D shows a different structure of lamellar carbide with dendritic iron rich phase (darker) seen near the end of the hardfacing (1500×, marker 127 micron). Dendritic phase of rich iron phase formation (dark grey) with chromium carbide phase (white) around the dendritic arm, near the end of hardfacing (rich in iron). It is believed that, at the lower chromium content near the heat affected zone (HAZ) end of the hardfacing, $M_3C$ and $Cr_3C_2$ can be formed.

Figure 31:
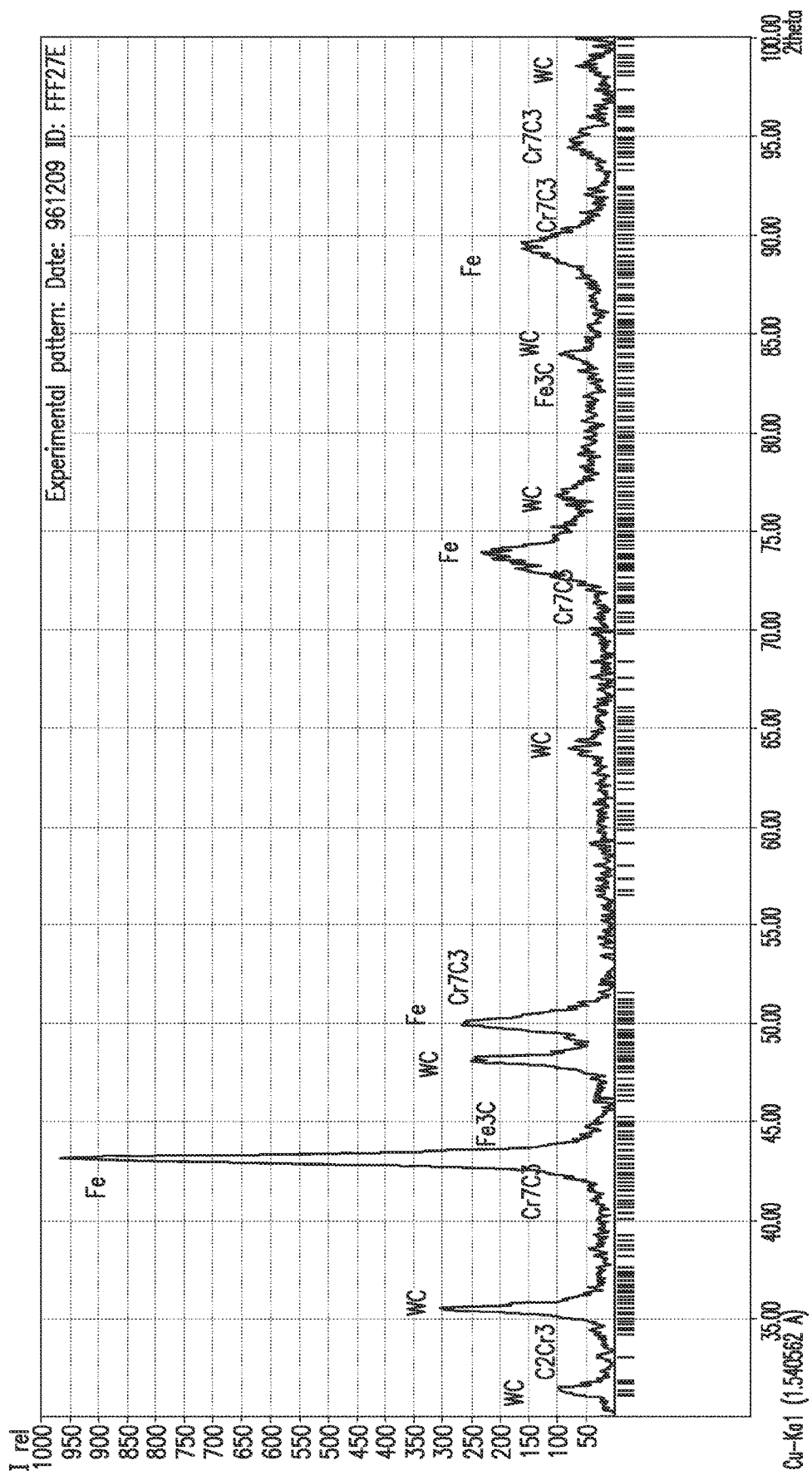
FIG. 31 shows a diffraction pattern taken for a reference hardfacing based on stainless steel and tungsten carbide.

FIG. 31 shows a diffraction pattern taken for a reference hardfacing based on stainless steel and tungsten carbide. The XRD peaks revealed gamma Fe peak with metal carbides $Fe_3C$, $Cr_7C_3$, and WC peaks.

The magnetic properties of selected hardfacings deposited on non-magnetic material were evaluated. The non-magnetic material was a proprietary alloy 15-15HS from Carpenter which is understood from the manufacturer's literature to be an austenitic stainless steel (MnCrNi stainless steel with a little bit of nitrogen). The tungsten carbide particles were recycled tungsten carbide and were believed to include some cobalt as well (10-12% Cobalt). A permeability limit of 1.01 (max) applies for API 5L.

Table 11 below presents measurements for samples HS2 and HS5 from Table 10. The magnetic saturation measurer is calculating the value based on weight of sample. The magnetic saturation of samples with backing cannot be measured accurately since backing weight affects the calculations. All HS5 samples showed no measurable coercivity values, which may be due to paramagnetic rather than ferromagnetic behavior. The presence of cobalt in the recycled tungsten carbide particles is expected to increase the coercivity; the coercivity is expected to decrease when non-magnetic tungsten carbide particles are used.

TABLE 10

| Sample ID | HS2 | HS3 | HS4 | HS5 | HS6 | HS7 | HS8 |
| --- | --- | --- | --- | --- | --- | --- | --- |
| Weld Wire | 310 | L-59 | L-59 | 310 | 309LSi | 330 | 309LSi |
| Carbides | 100% WC | 50% WC 50% B₄C | 50% B₄C 50% SiC | 100% B₄C | 100% B₄C | 100% B₄C | 50% WC 50% B₄C |
| Weld Matrix Hardness HRC | 26-29 | 38-47 | 40-49 | 39-46 | 35-38 | 38-43 | 32-38 |

TABLE 11

| Sample | Weight | Coercivity (Oe) |
| --- | --- | --- |
| HS2 With Backing #1 | 75.19 | 150 |
| HS2 With Backing #2 | 68.58 | 145 |
| HS2 No Backing | 15.96 | 160 |
| HS5 With Backing #1 | 61.18 | No measured coercivity |
| HS5 With Backing #2 | 62.26 | No measured coercivity |
| HS5 No Backing | 12.68 | No measured coercivity |

We claim:

1. A hardfacing layer joined to at least a portion of a metal surface by a metal fusion bond, the hardfacing layer comprising a first region comprising a first iron-based material, wherein the first iron-based material further comprises:
   silicon carbide and boron carbide, and wherein at least a portion of the first iron-based material comprises martensite and retained austenite,
   wherein the hardness in the first region is from 55 to 65 Rockwell C (HRC) and wherein the martensite in the first region comprises high-carbon martensite; and
the hardfacing layer further comprising a second region interior to the first region, the second region comprising a second iron-based material, the second iron-based material further comprises:
   silicon carbide and boron carbide, and wherein at least a portion of the second iron-based material comprises martensite and retained austenite,
   wherein the hardness in the second region is from 40 to 55 Rockwell C (HRC) and wherein the martensite in the second region comprises low-carbon, lath martensite; and
   such that high-carbon martensite and retained austenite is observed near a surface of the hardfacing layer, and lath martensite with retained austenite is observed at a junction of the hardfacing layer and the metal surface.

2. The hardfacing layer joined to at least a portion of a metal surface of claim 1, wherein the metal surface is a tooth, blade, knife, flail, block, hammer, anvil, plate, tang, raiser, drum skin, pocket or screen of an article.

3. The hardfacing layer of claim 1, wherein at least a portion of the first and second iron-based materials comprise a metal carbide and a metal boride.

4. The hardfacing layer of claim 1, wherein the first and second iron-based materials comprise a metal carbide and an iron boride.

5. The hardfacing layer of claim 1, wherein an average amount of boron in the first and second iron-based materials is from 1 wt % to 10 wt %; and an average amount of silicon in the first and second iron-based materials is from 1 wt % to 10 wt %.

6. The hardfacing layer of claim 1, wherein the silicon carbide and boron carbide includes a mixture of approximately 50 vol. % boron carbide and 50 vol. % silicon carbide.

7. The hardfacing layer of claim 1, wherein each of the first and second iron-based materials further includes tungsten carbide.

8. The hardfacing layer of claim 1, wherein the first and second iron-based materials further include chromium carbide.

9. The hardfacing layer of claim 1, wherein an average amount of chromium in the first and second iron-based material is less than 1 wt %.

10. The hardfacing layer of claim 1, wherein the first and second iron-based materials further comprise chromium, an average amount of chromium present being from 7 wt % to 28 wt %.

11. A hardfacing layer joined to at least a portion of a metal surface by a metal fusion bond, the hardfacing layer comprising a first region comprising a first iron-based material, wherein the first iron-based material further comprises:
   silicon carbide, and wherein at least a portion of the first iron-based material comprises martensite and retained austenite,
   wherein the hardness in the first region is from 55 to 65 Rockwell C (HRC) and wherein the martensite in the first region comprises high-carbon martensite; and
the hardfacing layer further comprising a second region interior to the first region, the second region comprising a second iron-based material, the second iron-based material further comprises:
   silicon carbide, and wherein at least a portion of the second iron-based material comprises martensite and retained austenite,
   wherein the hardness in the second region is from 40 to 55 Rockwell C (HRC) and wherein the martensite in the second region comprises low-carbon, lath martensite; and
   such that high-carbon martensite and retained austenite is observed near a surface of the hardfacing layer, and lath martensite with retained austenite is observed at a junction of the hardfacing layer and the metal surface.

12. The hardfacing layer of claim 11, wherein an average amount of silicon present in the first and second iron-based materials is from 2 wt % to 10 wt %.

13. The hardfacing layer of claim 11, wherein the first region comprises less than 10 vol % undissolved silicon carbide particles.

14. The hardfacing layer of claim 11, wherein each of the first and second iron-based materials further includes tungsten carbide.

15. A hardfacing layer joined to at least a portion of a metal surface by a metal fusion bond, the hardfacing layer comprising a first region comprising a first iron-based material, wherein the first iron-based material further comprises:
   boron carbide, and wherein at least a portion of the first iron-based material comprises martensite and retained austenite,
   wherein the hardness in the first region is from 55 to 65 Rockwell C (HRC) and wherein the martensite in the first region comprises high-carbon martensite; and the hardfacing layer further comprising a second region interior to the first region, the second region comprising a second iron-based material, the second iron-based material further comprises:

boron carbide, and wherein at least a portion of the second iron-based material comprises martensite and retained austenite, wherein the hardness in the second region is from 40 to 55 Rockwell C (HRC) and wherein the martensite in the second region comprises low-carbon, lath martensite; and such that high-carbon martensite and retained austenite is observed near a surface of the hardfacing layer, and lath martensite with retained austenite is observed at a junction of the hardfacing layer and the metal surface.

16. The hardfacing layer of claim 15, wherein an average amount of boron in the first and second iron-based materials is from 2 wt % to 10 wt %.

17. The hardfacing layer of claim 15, wherein the first region comprises less than 10 vol % undissolved $B_4C$ particles.

18. The hardfacing layer of claim 15, wherein each of the first and second iron-based materials further includes tungsten carbide.

* * * * *